(12) United States Patent
Mitsuhashi et al.

(10) Patent No.: US 8,634,696 B2
(45) Date of Patent: Jan. 21, 2014

(54) IMAGE REPRODUCTION SYSTEM

(75) Inventors: Setsu Mitsuhashi, Setagawa-ku (JP);
Hirotake Nozaki, Port Washington, NY (US); Kenji Hori, Meguro-ku (JP); Akira Ohmura, Shibuya-ku (JP)

(73) Assignee: Nikon Corporation, Tokyo (JP)

( * ) Notice: Subject to any disclaimer, the term of this patent is extended or adjusted under 35 U.S.C. 154(b) by 1211 days.

(21) Appl. No.: 11/792,817

(22) PCT Filed: Dec. 7, 2005

(86) PCT No.: PCT/JP2005/022435
§ 371 (c)(1),
(2), (4) Date: Dec. 4, 2007

(87) PCT Pub. No.: WO2006/064696
PCT Pub. Date: Jun. 22, 2006

(65) Prior Publication Data
US 2008/0309795 A1 Dec. 18, 2008

(30) Foreign Application Priority Data

Dec. 15, 2004 (JP) ................ 2004-362430
Dec. 15, 2004 (JP) ................ 2004-362431
Dec. 15, 2004 (JP) ................ 2004-362441
Dec. 15, 2004 (JP) ................ 2004-362443

(51) Int. Cl.
*H04N 5/932* (2006.01)
(52) U.S. Cl.
USPC ......................................... 386/219
(58) Field of Classification Search
USPC .................................. 386/46, 219
See application file for complete search history.

(56) References Cited

U.S. PATENT DOCUMENTS

| | | |
|---|---|---|
| 2001/0022621 A1 | 9/2001 | Squibbs |
| 2003/0011680 A1 | 1/2003 | Tanaka et al. |
| 2004/0044725 A1 | 3/2004 | Bell et al. |
| 2004/0168118 A1* | 8/2004 | Wong et al. ............ 715/500.1 |
| 2004/0179124 A1 | 9/2004 | Morimoto et al. |
| 2004/0201774 A1* | 10/2004 | Gennetten .............. 348/375 |
| 2005/0226593 A1* | 10/2005 | Glassman et al. ......... 386/46 |

FOREIGN PATENT DOCUMENTS

| | | |
|---|---|---|
| JP | A 05-128166 | 5/1993 |
| JP | A 06-062465 | 3/1994 |
| JP | A 10-327380 | 12/1998 |
| JP | A-2000-041208 | 2/2000 |
| JP | A-2000-217022 | 8/2000 |
| JP | A 2000-341614 | 12/2000 |

(Continued)

OTHER PUBLICATIONS

Aug. 2, 2011 European Search Report issued in European Application No. 111699952.6.

(Continued)

*Primary Examiner* — Jason Gee
(74) *Attorney, Agent, or Firm* — Oliff & Berridge, PLC

(57) ABSTRACT

An image reproducing apparatus includes: an image storage device that stores image data having been read into the image reproducing apparatus; an image output device that outputs the image data stored in the image storage device to a display device; an image selection device that selects an image from the image data; and an image extraction device that extracts from the image data a plurality of images satisfying a condition equivalent to a condition of the image having been selected by the image selection device.

7 Claims, 41 Drawing Sheets

(56) References Cited

FOREIGN PATENT DOCUMENTS

Figure 1:
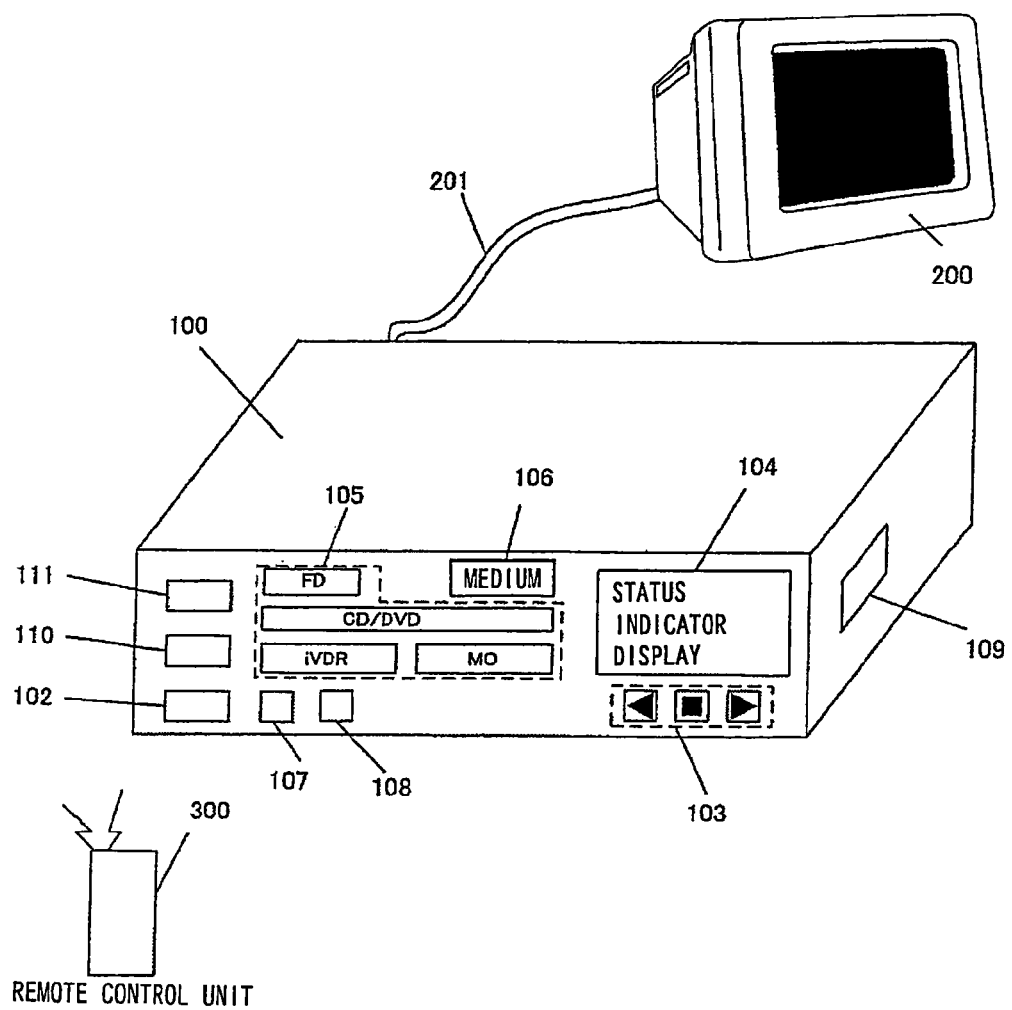

| | | |
|---|---|---|
| JP | A-2001-036782 | 2/2001 |
| JP | A 2001-195415 | 7/2001 |
| JP | A-2001-285689 | 10/2001 |
| JP | A-2001-309287 | 11/2001 |
| JP | A-2002-078042 | 3/2002 |
| JP | A-2002-125198 | 4/2002 |
| JP | A-2002-135627 | 5/2002 |
| JP | A 2002-189753 | 7/2002 |
| JP | A 2002-252887 | 9/2002 |
| JP | A 2003-037820 | 2/2003 |
| JP | A 2003-333486 | 11/2003 |
| JP | A 2003-338998 | 11/2003 |
| JP | A 2004-094765 | 3/2004 |
| JP | A 2004-274502 | 9/2004 |
| JP | A-2004-325937 | 11/2004 |
| JP | A-2004-350186 | 12/2004 |

OTHER PUBLICATIONS

Japanese Office Action issued in Japanese Patent Application No. 2004-362443 dated Nov. 9, 2010 (with translation).
Japanese Office Action issued in Japanese Patent Application No. 2004-362441 dated Nov. 9, 2010 (with translation).
Japanese Office Action issued in Japanese Patent Application No. 2004-362431 dated Nov. 9, 2010 (with translation).
Jul. 5, 2011 Office Action issued in corresponding Japanese Patent Application No. 2004-362441.

* cited by examiner

FIG.3
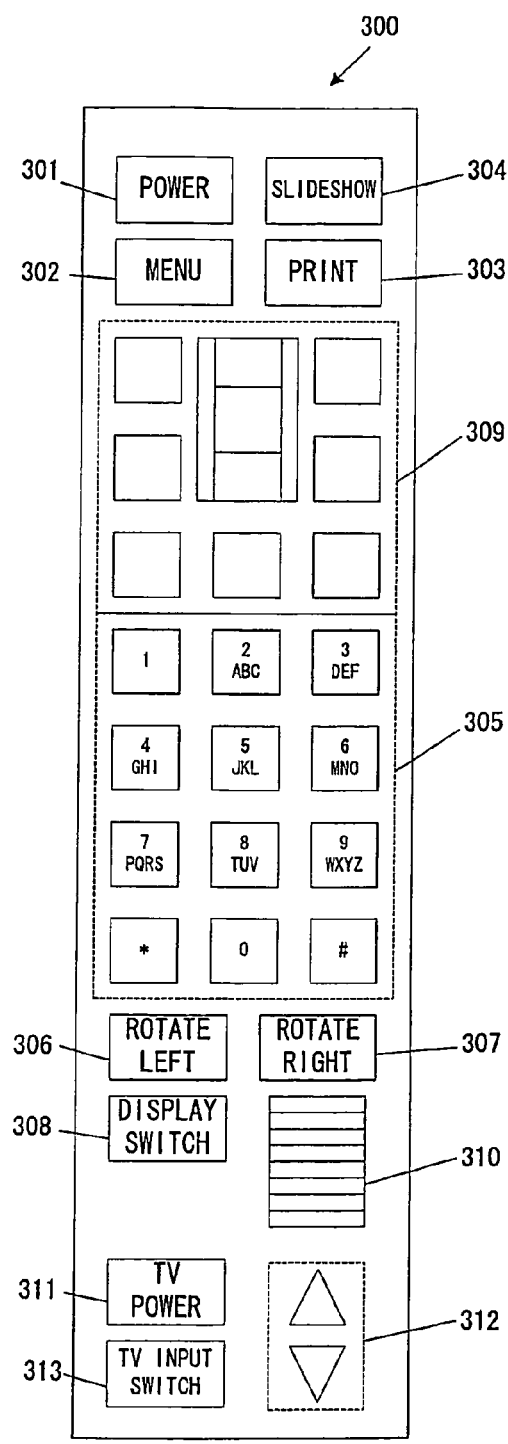
(a)
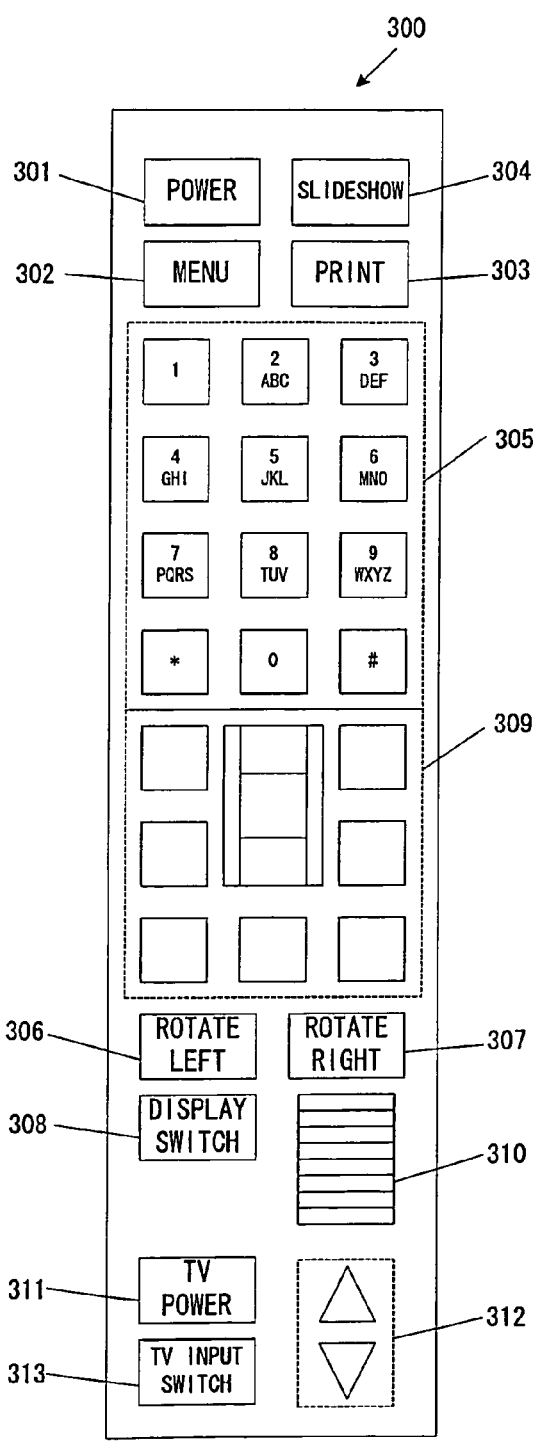
(b)

FIG. 17

```
┌─────────────────────────────────────────────┐
│ SET PORTABLE TELEPHONE MODEL                │
├─────────────────────────────────────────────┤
│                                             │
│   COMMUNICATION SERVICE PROVIDER            │
│   ┌───────────────────────────┐ ┌───┐       │
│   │ O×TELECOMMUNICATIONS INC. │ │ ▽ │       │
│   └───────────────────────────┘ └───┘       │
│                                             │
│   MODEL NAME                                │
│   ┌───────────────────────────┐ ┌───┐       │
│   │ A B C                     │ │ ▽ │       │
│   └───────────────────────────┘ └───┘       │
│                                             │
│                      ┌─────────┐ ┌────────┐ │
│                      │ CONFIRM │ │ CANCEL │ │
│                      └─────────┘ └────────┘ │
└─────────────────────────────────────────────┘
```

(a)

```
┌─────────────────────────────────────────────┐
│ SET PORTABLE TELEPHONE MODEL                │
├─────────────────────────────────────────────┤
│                                             │
│                                             │
│   MODEL NAME                                │
│   ┌───────────────────────────┐             │
│   │ A B C                     │             │
│   └───────────────────────────┘             │
│                                             │
│                      ┌─────────┐ ┌────────┐ │
│                      │ CONFIRM │ │ CANCEL │ │
│                      └─────────┘ └────────┘ │
│                                             │
└─────────────────────────────────────────────┘
```

(b)

FIG. 19

| IMAGE TITLE/COMMENTS INPUT SCREEN |
|---|

TITLE

COMMENTS

KEYWORD

CONFIRM  CANCEL

FIG.21
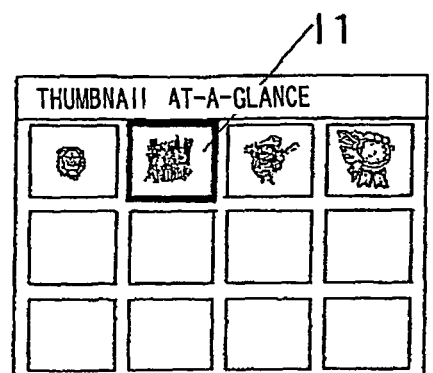
(a)
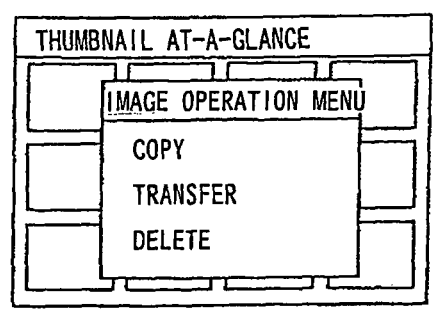
(b)
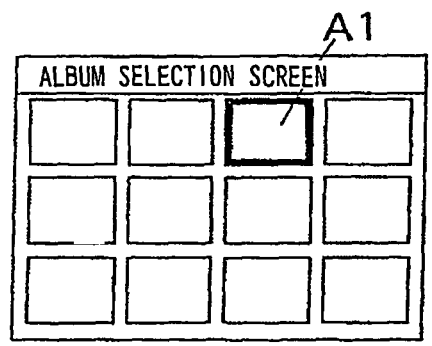
(c)

FIG.22
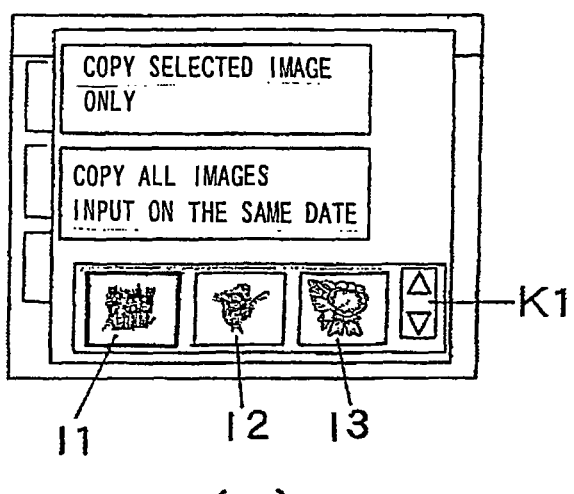
(a)
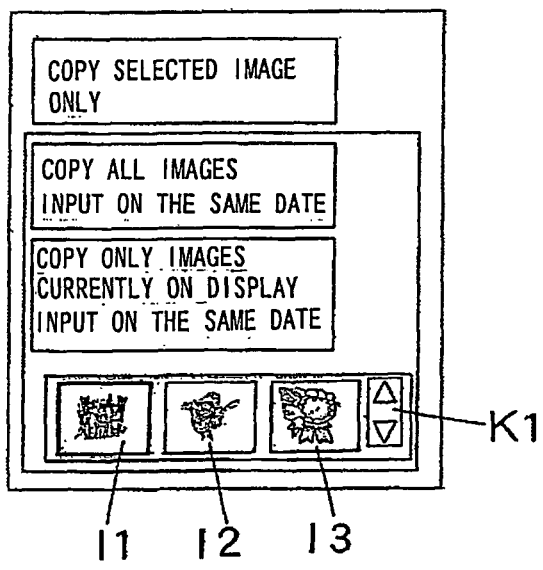
(b)

FIG.24
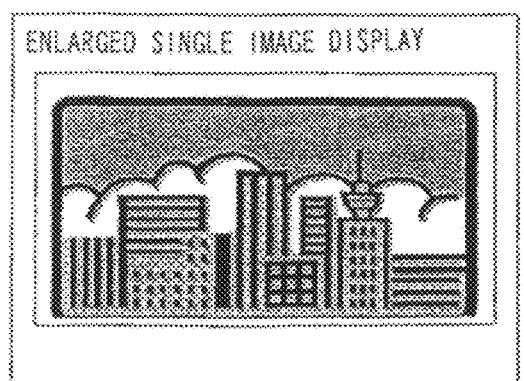
(a)
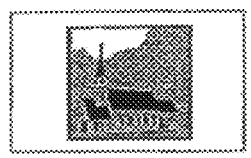
(b)
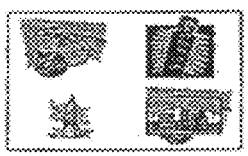
(c)

FIG.32
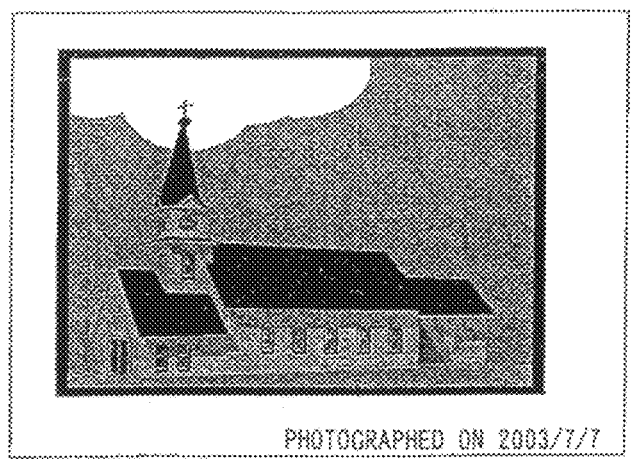
(a)
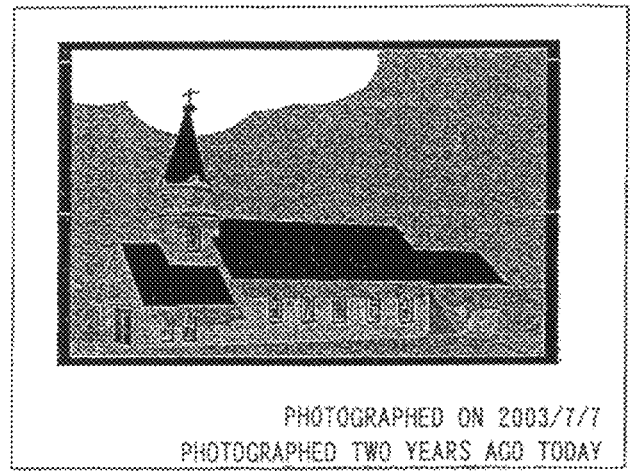
(b)

FIG.35
(a)
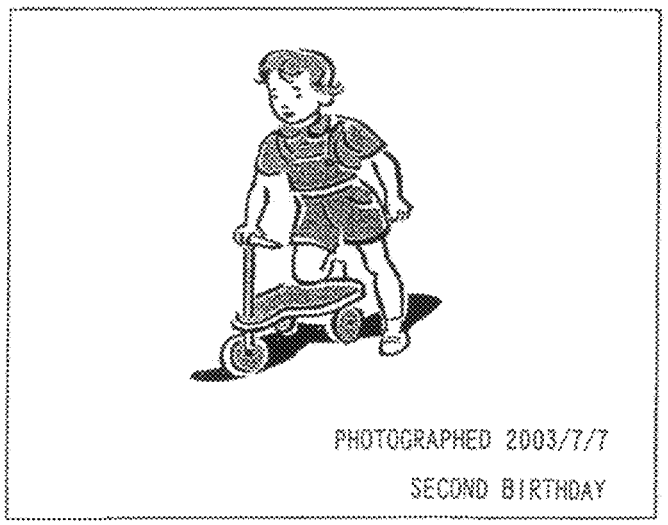
(b)

IMAGE REPRODUCTION SYSTEM

TECHNICAL FIELD

The present invention relates to an image reproducing system that stores images photographed with a digital camera or the like and reproduces the stored images.

BACKGROUND ART

There is an image reproducing system known in the related art that stores images photographed with a digital camera into a large capacity storage device and outputs the stored images to a television monitor for viewing (see patent reference literature 1). In this system, the images originating from the digital camera and stored into the storage device are displayed at the television monitor by using a television remote control unit.
Patent reference literature 1: Japanese Laid Open Patent Publication No. 2000-341614

DISCLOSURE OF THE INVENTION

Problems to be Solved by the Invention

A system such as that described above, which stores and reproduces numerous images, needs to assure superior system operability and allow an attractive image among the stored images to be provided to the user.

Means for Solving the Problems

An image reproducing apparatus according to a 1st aspect of the present invention includes: an image storage device that stores image data having been read into the image reproducing apparatus; an image output device that outputs the image data stored in the image storage device to a display device; an image selection device that selects an image from the image data; and an image extraction device that extracts from the image data a plurality of images satisfying a condition equivalent to a condition of the image having been selected by the image selection device. It is preferable that at least one condition among; " input dates on which the image data were read into the image reproducing apparatus, photographing dates on which the image data were obtained through photographing operations, location information indicating locations at which the image data were photographed, information indicating a photographing apparatus used to capture the image data and image data size, is used as the condition in reference to which the plurality of images are extracted by the image extraction device. It is preferable that the image having been selected by the image selection device and the plurality of images having been extracted by the image extraction device undergo; (a) processing for copying or transferring the selected image and the extracted images within the image storage device or (b) processing for deleting the selected image and the extracted images from the image storage device. It is preferable for the image reproducing apparatus according to the 1st aspect to further include a signal reception device that receives a signal corresponding to a remote control operation, and that the image selection device selects the image in correspondence to a signal originating from the remote control unit, which is received at the signal reception device.

An image reproducing system according to a 2nd aspect of the present invention includes: an image reproducing apparatus; the display device; and a remote control unit that outputs a signal corresponding to a switch operation. The image reproducing apparatus further includes a signal reception device that receives the signal corresponding to the switch operation, which originates from the remote control unit, and the image selection device selects the image in correspondence to the signal from the remote control unit received at the signal reception device.

An image reproducing apparatus according to a 3rd aspect of the present invention includes: an image storage device that stores image data; a reference date setting device that sets past reference dates over predetermined cycles in reference to a current date designated as a start point; an image selection device that selects from the image data stored in the image storage device a plurality of sets of image data having been captured or read on dates substantially matching the past reference dates; and a slideshow display control device that executes control so as to bring up a slideshow display at a display device based upon the plurality of sets of image data having been selected by the image selection device. It is preferable for the image reproducing apparatus according to the 3rd aspect to further include: a display priority level setting device that sets display priority levels for the image data based upon the current date and the past reference dates, and that the slideshow display control device executes control such that the plurality of sets of image data are brought up in the slideshow display in an order with which an image with a higher display priority is displayed earlier. It is preferable that the display priority level setting device sets a higher display priority for image data having been captured or read on a date matching one of the past reference dates than a display priority set for image data having been captured or read on a date that does not match a past reference date. The display priority level setting device may set a higher display priority for image data having been captured or read on a date with a greater time difference relative to the current date. The image reproducing apparatus according to the 3rd aspect may further include an anniversary registering device that registers an anniversary date for a user, and the slideshow display control device may execute control so as to provide the slideshow display based upon the plurality of sets of image data having been selected by the image selection device only if the anniversary date registered at the anniversary registering device matches the current date. It is preferable that the image selection device does not select image data having been captured or read on a date preceding a past date marking a start point for the anniversary date.

An image reproducing system according to a 4th aspect of the present invention includes: an image reproducing apparatus; the display device and a remote control unit that outputs a start instruction signal for starting the slideshow display to the image reproducing apparatus.

A computer-readable computer program product having stored therein an image reproducing program according to a 5th aspect of the present invention, includes: reference date setting processing for setting past reference dates over predetermined cycles relative to a current date designated as a start point; image selection processing for selecting a plurality of sets of image data having been captured or read on dates substantially matching the past reference dates; and slideshow display control processing for engaging a display device in a slideshow display based upon the plurality of sets of image data. It is preferable that the computer program product is a recording medium on which the image reproducing program is recorded.

An image reproducing apparatus according to a 6th aspect of the present invention includes: an image storage device that stores image data; a reference date setting device that sets past reference dates over predetermined cycles in reference to a current date designated as a start point; an image selection device that selects from the image data stored in the image storage device a plurality of sets of image data having been captured or read on dates substantially matching the past reference dates; and a display control device that engages a display device to display the plurality of sets of image data having been selected by the image selection device.

An image reproducing device according to a 7th aspect of the present invention includes: an image storage device that stores image data; an image output device that outputs the image data stored in the image storage device to a display device; a signal reception device that receives a signal corresponding to a switch operation from a remote control unit that comprises a plurality of switches; a command recognition device that recognizes an operation command issued based upon the signal corresponding to the switch operation and having been received at the signal reception device from the remote control unit; a control device that executes an operation in conformance to the operation command having been recognized by the command recognition device; and a command altering device that alters the operation command issued based upon the signal corresponding to the switch operation and originating from the remote control unit, so as to match the operation command with an operation command output in response to a switch operation performed at a portable telephone. It is preferable for the image reproducing apparatus according to the 7th aspect to further include a model recognition device that recognizes a specific model of the portable telephone, and that the command altering device alters the operation command in correspondence to the model of the portable telephone, having been recognized by the model recognition means.

An image reproducing system according to a 8th aspect of the present invention includes: an image reproducing apparatus; the display device; and the remote control unit, and the plurality of switches at the remote control unit are set at positions corresponding to positions of a plurality of switches used for text input at the portable telephone.

An image reproducing apparatus according to a 9th aspect of the present invention includes: an image storage device that stores image data; an image reading device that reads out the image data from the image storage device; a slideshow start instruction member that outputs a slideshow display start instruction; and a slideshow display control device that executes control so as to provide a slideshow display at a display device based upon a plurality of sets of image data read out by the image reading device, in response to the slideshow display start instruction output from the slideshow start instruction member. The image reproducing apparatus according to the 9th aspect may further include: a slideshow display processing device that executes one of; (a) processing for restarting the slideshow display from the beginning, (b) processing for displaying a title of an album saved in the image storage device, which includes the plurality of sets of image data having been selected for the slideshow display, and (c) processing for changing a mode selected for the slideshow display, as the slideshow start instruction member is operated while the slideshow display is in progress under control executed by the slideshow display control device. The image reproducing apparatus according to the 9th aspect may further include: a switch instruction member that outputs an instruction for switching from an album saved in the image storage device which includes the plurality of sets of image data having been selected for the slideshow display currently in progress under the control executed by the slideshow display control device, to another album.

An image reproducing apparatus according to a 10th aspect of the present invention includes: an image storage device that stores image data; an image reading device that reads out the image data from the image storage device; a display control device that engages a display device to display an image based upon the image data having been read out by the image reading device; and a switch instruction member that outputs an instruction for switching from an album saved in the image storage device, which contains image data corresponding to the image displayed at the display device, to another album. It is preferable that in response to a switch instruction output from the switch instruction member, the display control device brings up at the display device a thumbnail at-a-glance display of image data in a newly selected album.

An image reproducing system according to a 11th aspect of the present invention includes: a display device; a remote control unit that comprises a slideshow start instruction member that outputs a slideshow display start instruction for starting a slideshow display; and an image reproducing device that comprises an image storage device that stores image data, an image reading device that reads out the image data from the image storage device, a signal reception device that receives a signal corresponding to an operation performed at the remote control unit and a slideshow display control device that executes control so as to engage the display device in a slideshow display based upon the image data having been read out by the image reading device in response to the slideshow start instruction output from the slideshow start instruction member and received at the signal reception device. It is preferable that the image reproducing device further includes a slideshow display processing device that executes one of; (a) processing for restarting the slideshow display from the beginning, (b) processing for displaying a title of an album saved in the image storage device, which includes the plurality of sets of image data having been selected for the slideshow, and (c) processing for changing a mode selected for the slideshow display, as the signal reception device receives a signal from the slideshow start instruction member while the slideshow display is in progress under the control executed by the slideshow display control device. The remote control unit may further include a switch instruction member that outputs an instruction for switching from an album saved in the image storage device that includes the plurality of sets of image data having been selected for the slideshow display currently in progress under the control executed by the slideshow display control device to another album.

An image reproducing system according to a 12th aspect of the present invention includes: a display device; a remote control unit; and an image reproducing device that comprises an image storage device that stores image data, an image reading device that reads out the image data from the image storage device, a signal reception device that receives a signal corresponding to an operation performed at the remote control unit and a display control device that engages the display device to display an image based upon the image data having been read out by the image reading device, and the remote control unit comprises a switch instruction member that outputs an instruction for switching an album saved in the image storage device and containing image data of the image displayed at the display device to another album. It is preferable that in response to the switch instruction output from the switch instruction member, the display control device in the display reproducing apparatus brings up a thumbnail at-a-glance display of image data in a newly selected album at the display device.

An image reproducing apparatus according to a 13th aspect of the present invention includes: an image storage device that stores image data; an image reading device that reads out the image data from the image storage device; a slideshow display control device that executes control so as to engage a display device in a slideshow display based upon the image data having been read out by the image reading device; an image saving device that saves image data up on display at the display device when the slideshow display is interrupted; and a slideshow display resuming device that enables the slideshow display control device to resume the slideshow, starting with the image data having been saved at the image saving device.

An image reproducing apparatus according to a 14th aspect of the present invention includes: an image storage device that stores image data; an image reading device that reads out the image data from the image storage device; a slideshow display control device that executes control so as to engage a display device in a slideshow display based upon the image data having been read out by the image reading device; an album saving device that saves an album in the image storage device that contains image data up on display at the display device when the slideshow display is interrupted; and a slideshow display resuming device that enables the slideshow display control device to resume the slideshow starting with a first set of image data in the album having been saved in the album saving device.

An image reproducing system according to a 15th aspect of the present invention includes: an image reproducing apparatus; the display device; and a remote control unit that comprises a start instruction member that outputs a start instruction for starting the slideshow display to the image reproducing apparatus.

It is to be noted that the image storage device, the image output device, the image selection device, the image extraction device, the signal reception device, and the remote control unit may be replaced with an image storage means, an image output means, an image selection means, an image extraction means, a signal reception device, and a remote control means, respectively. The reference date setting device, the slideshow display control device, the display priority level setting device, the anniversary registering device, and the display control device may be replaced with a reference date setting means, a slideshow display control means, a display priority level setting means, an anniversary registering means, and a display control means, respectively. Moreover, the command recognition device, the control device, the command altering device, and the model recognition device may be replaced with a command recognition means, a control means, a command altering means, and a model recognition means. The image reading device, the slideshow start instruction member, the slideshow display control device, the slideshow display processing device, the switch instruction member, the image saving device, the slideshow display resuming device, and the album saving device may be replaced with an image reading means, a slideshow start instruction means, a slideshow display control means, a slideshow display processing means, a switch instruction means, an image saving means, a slideshow display resuming means, and an album saving device.

BRIEF DESCRIPTION OF THE DRAWINGS (FIG. 1) An external view of an image reproducing system achieved in an embodiment of the present invention (FIG. 2) A block diagram of the image reproducing system shown in FIG. 1

(FIG. 3) Structures that may be adopted in a remote control unit, shown in (a) and (b)

Figure 4:
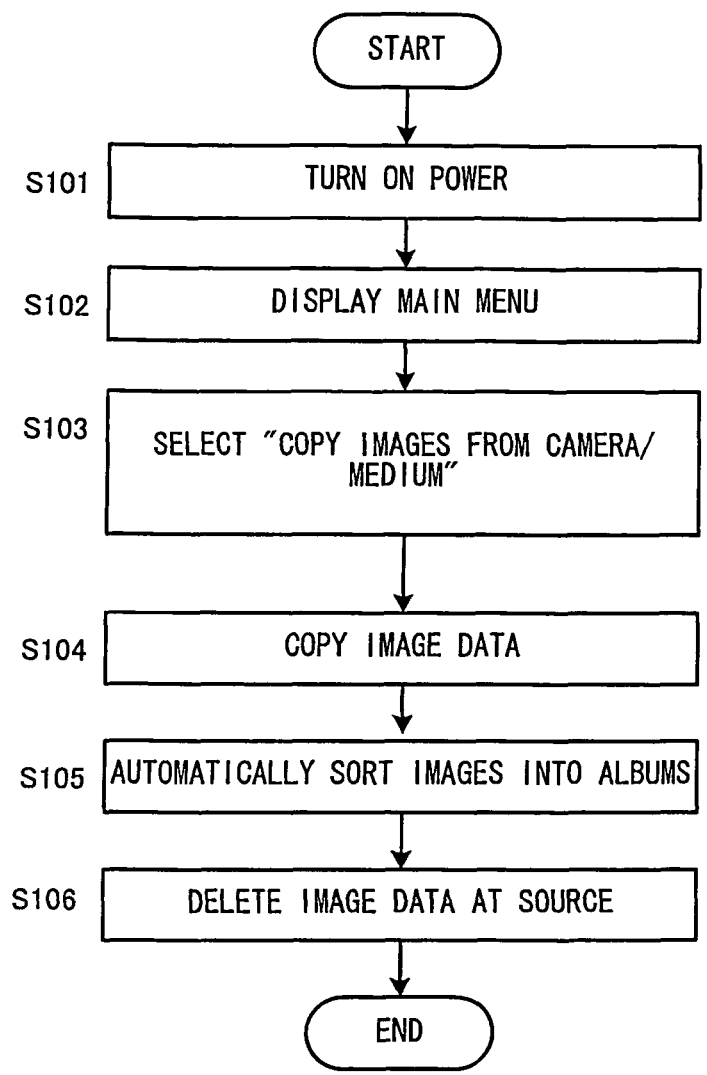
Figure 7:
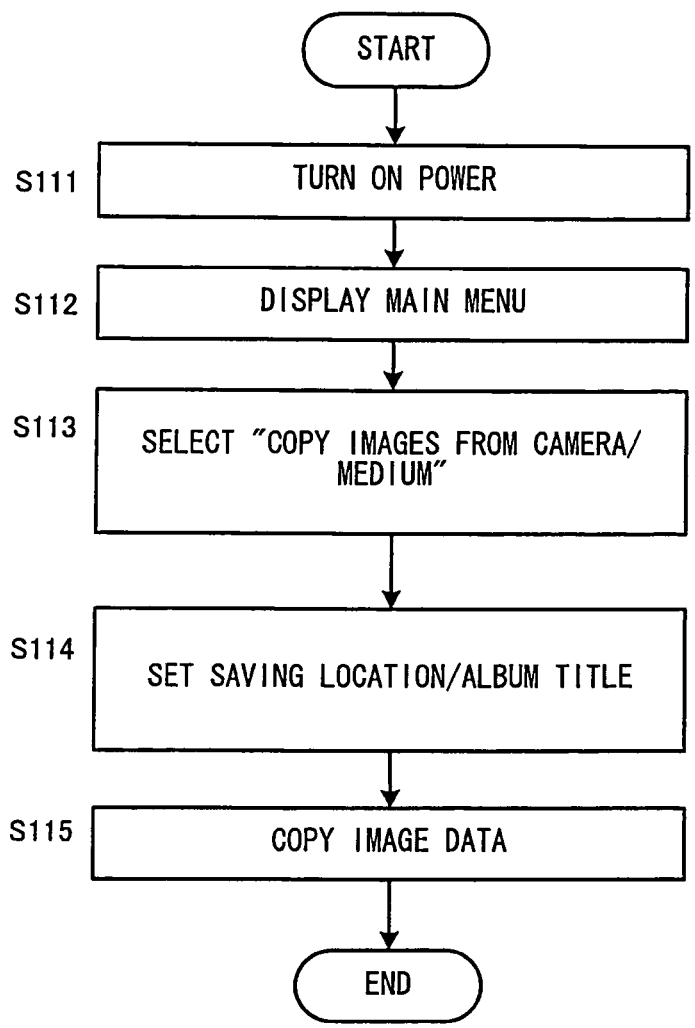
Figure 8:
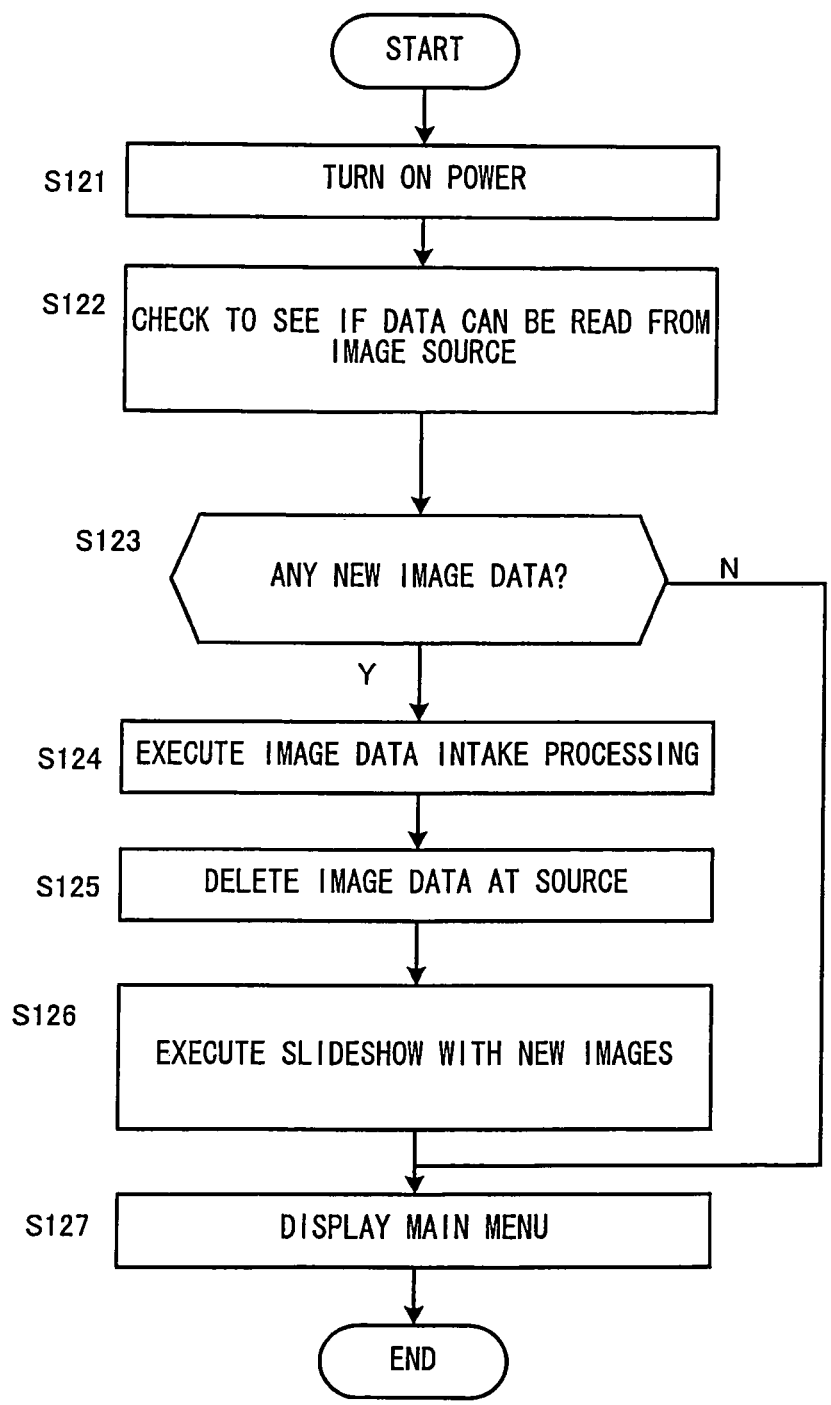
Figure 10:
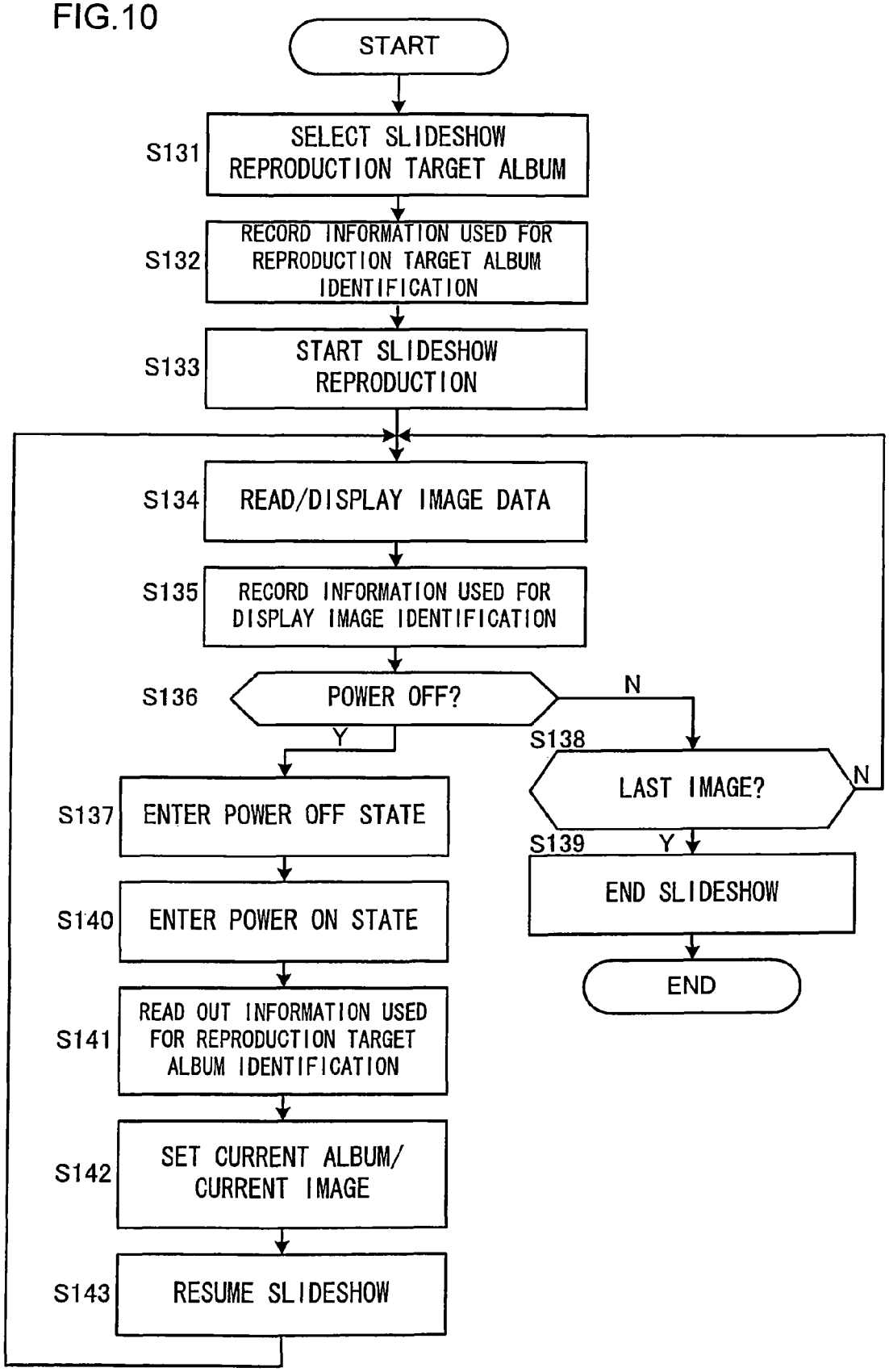
Figure 11:
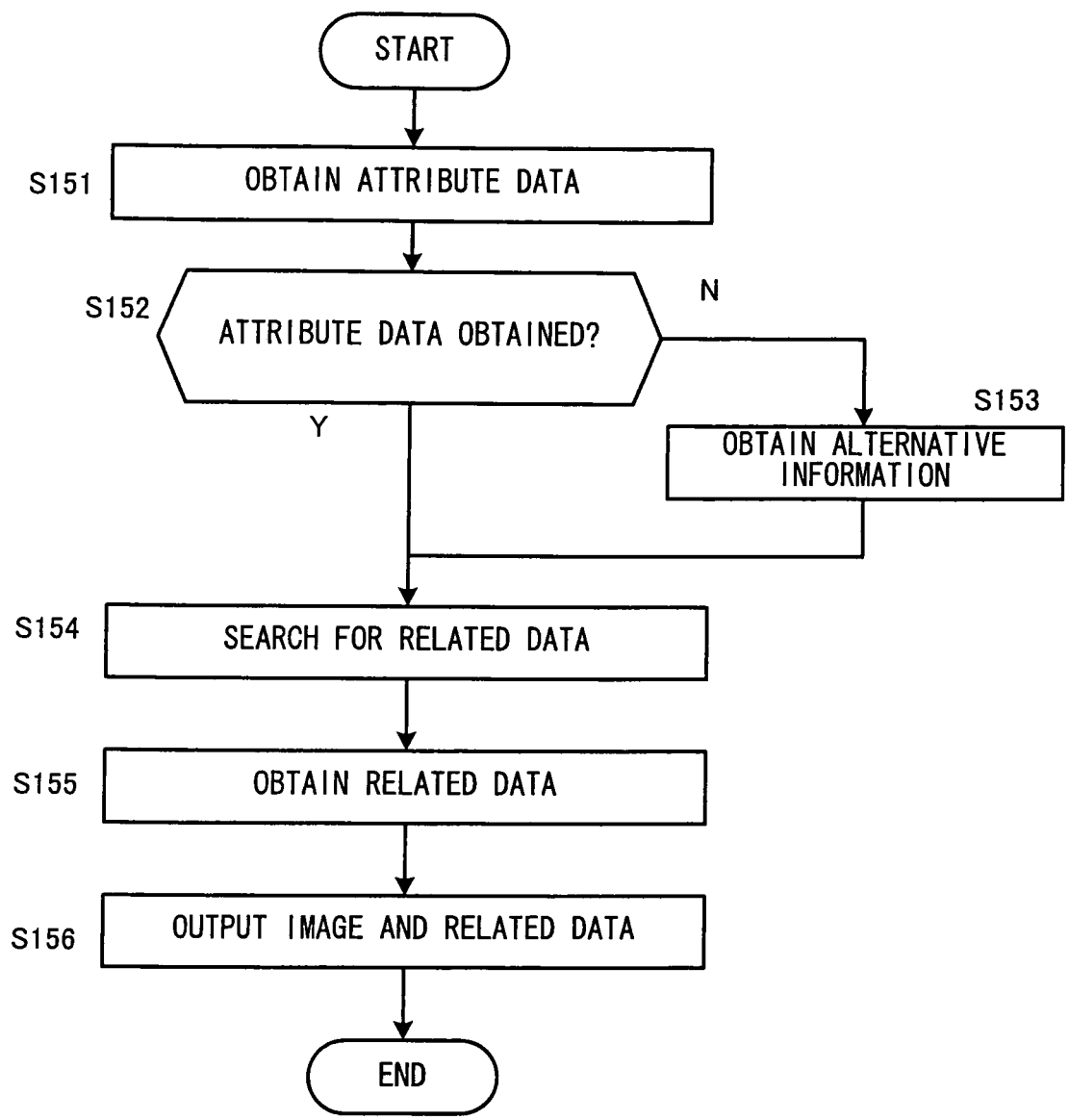

(FIG. 4) A flowchart of the processing procedure for taking image data into an image reproducing apparatus (FIG. 5) An example of a main menu display (FIG. 6) The tree format structure adopted in conjunction with albums (FIG. 7) A flowchart of the processing procedure for taking image data into a saving location specified by the user (FIG. 8) A flowchart of the processing procedure for automatically taking in new image data at a power-up (FIG. 9) An example of an album selection screen display (FIG. 10) A flowchart of the slideshow resume function (FIG. 11) A flowchart of the processing procedure for obtaining related data to be output together with the images during a slideshow (FIG. 12) An external view of an image reproducing apparatus that includes an image display unit and an image storage unit provided as an integrated unit (FIG. 13) An external view of a portable image reproducing apparatus (FIG. 14) An external view of a portable image reproducing apparatus (FIG. 15) A flowchart of the procedure for registering the model name of a portable telephone (FIG. 16) An example of a setting menu display screen (FIG. 17) Examples of portable telephone model setting screens, presented in (a) and (b)

(FIG. 18) A flowchart of the operations executed at the remote control unit and the image reproducing apparatus after the portable telephone model name registration (FIG. 19) An example of an image title/comment input screen (FIG. 20) A flowchart of the procedure for copying an image in an album into another album (FIG. 21) An example of a thumbnail at-a-glance display screen shown in (a), an example of an image operation menu display screen shown in (b) and an example of an album selection screen shown in (c)

(FIG. 22) An example of a selected image processing inquiry screen shown in (a) and another example of a selected image processing inquiry screen shown in (b)

Figure 23:
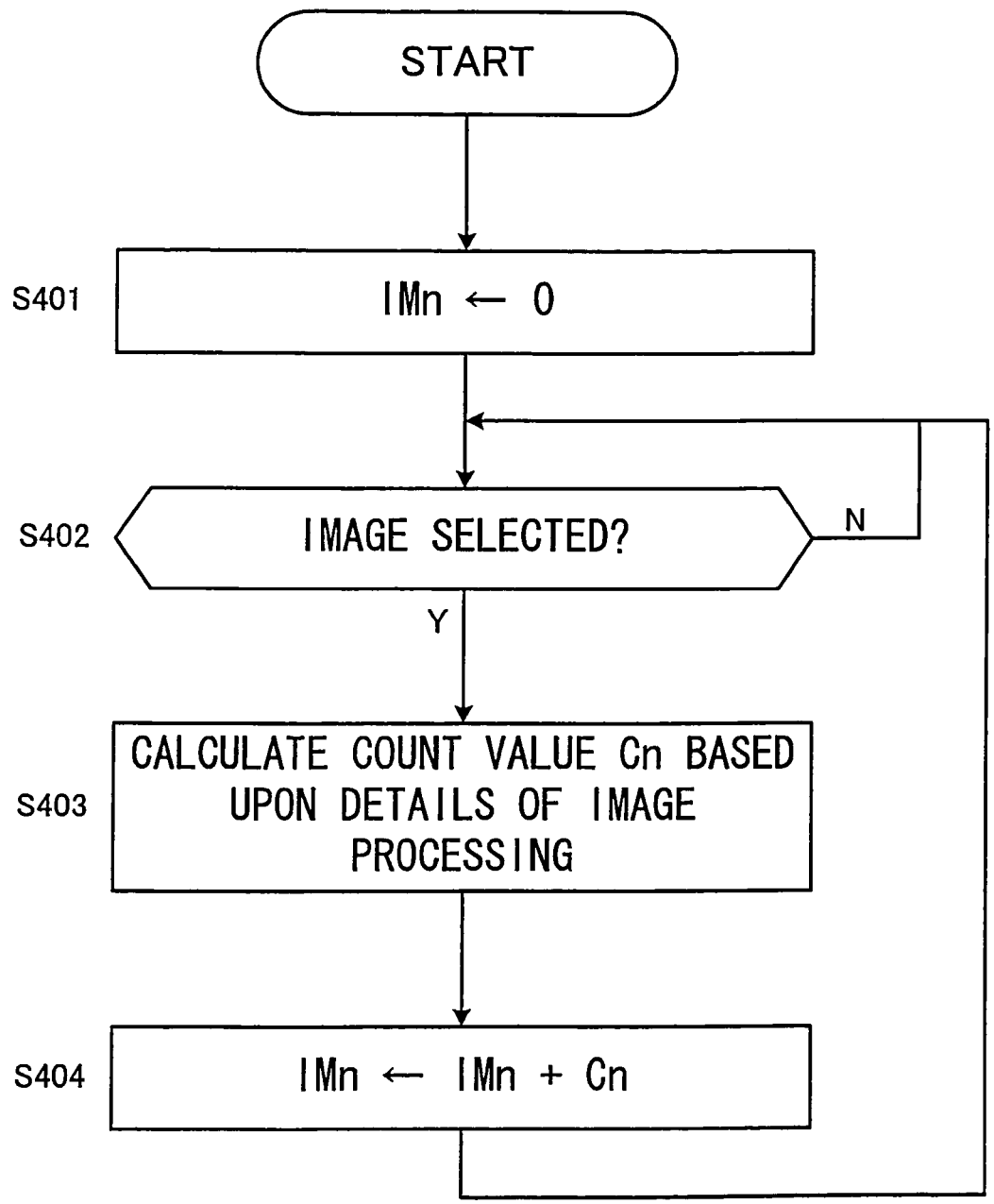

(FIG. 23) A flowchart of the procedure for setting the counter values for the individual images (FIG. 24) An example of an enlarged single image display shown in (a), an example of a single image display brought up during a slideshow shown in (b) and an example of a multiple image display brought up during a slideshow shown in (c)

(FIG. 25) An example of an album selection screen display that includes an "infrequently-viewed images" album (FIG. 26) A flowchart of an operational procedure for displaying "Infrequently Viewed Images" in a slideshow (FIG. 27) A flowchart of another operational procedure for displaying "Infrequently Viewed Images" in a slideshow (FIG. 28) A method for sorting images based upon the photographing dates and the counter values (FIG. 29) Various examples of the relationship between the photographing date and the display priority, shown in (a)~(d)

(FIG. 30) A flowchart of the processing procedure for executing a slideshow display based upon the display priority (FIG. 31) An example of an album selection screen display (FIG. 32) An example of an enlarged single image display brought up during a display priority-based slideshow shown in (a) and another example of an enlarged single image display brought up during a display priority-based slideshow shown in (b)

Figure 33:
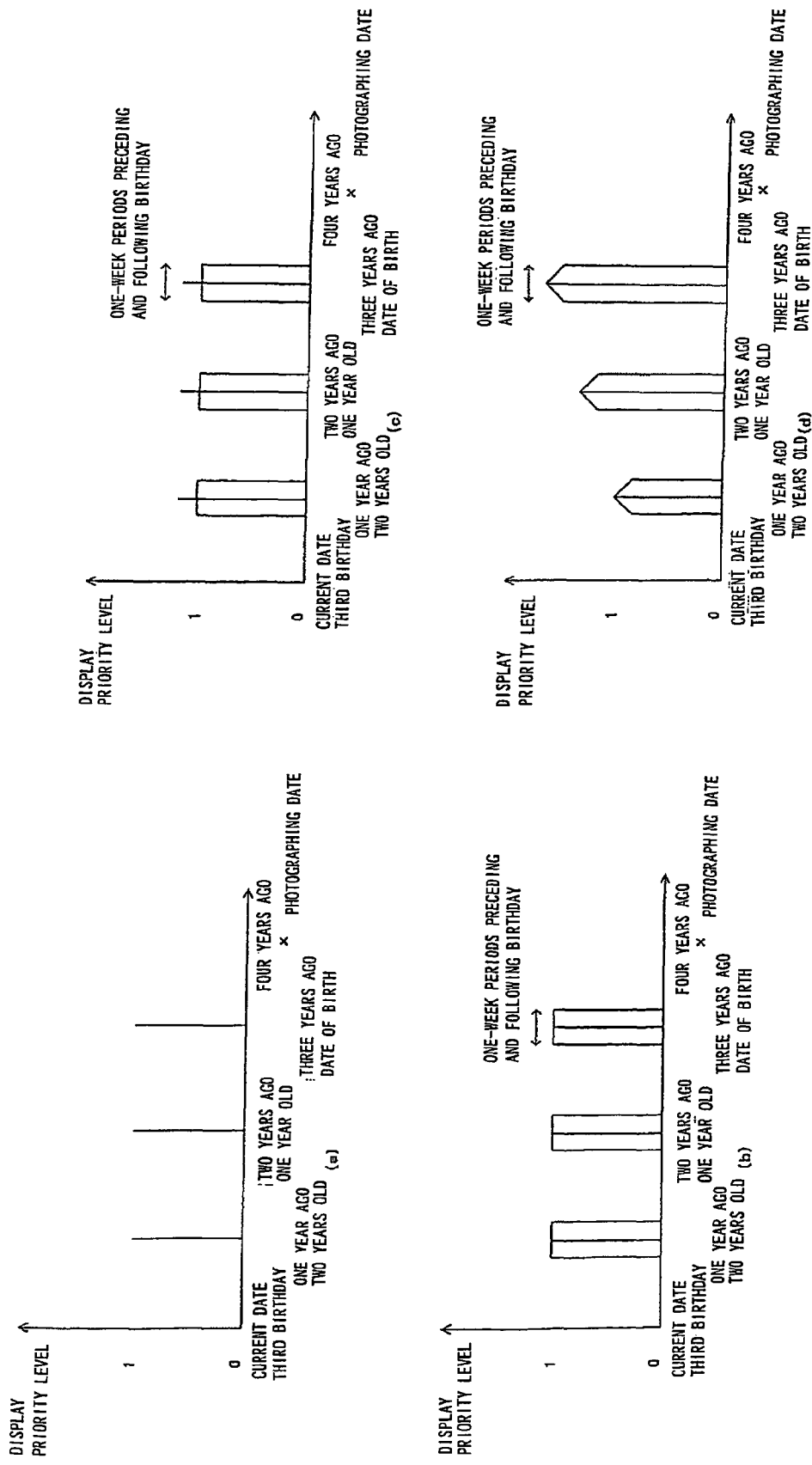

(FIG. 33) Various examples of the relationship between the photographing date and the display priority, shown in (a)~(d)

(FIG. 34) A flowchart of the processing procedure for setting the display priority level based upon the photographing date (FIG. 35) An example of an enlarged single image display brought up during a display priority-based slideshow shown in (a) and an another example of an enlarged single image display brought up during a display priority-based slideshow shown in (b)

(FIG. 36) An example of the relationship between the photographing date and the display priority (FIG. 37) Structures that may be adopted in the remote control unit, which includes album switch buttons, shown in (a) and (b)

(FIG. 38) A flowchart of the operational procedure for executing a slideshow display by using the slideshow button and the album switch buttons (FIG. 39) Structures that may be adopted in the remote control unit, which includes slideshow play and stop buttons, shown in (a) and (b)

(FIG. 40) A structure that may be adopted in the remote control unit, which includes a directional button (FIG. 41) An external view of an image reproducing system with the slideshow button and the album switch buttons disposed at the image reproducing apparatus

BEST MODE FOR CARRYING OUT THE INVENTION

Figure 2:
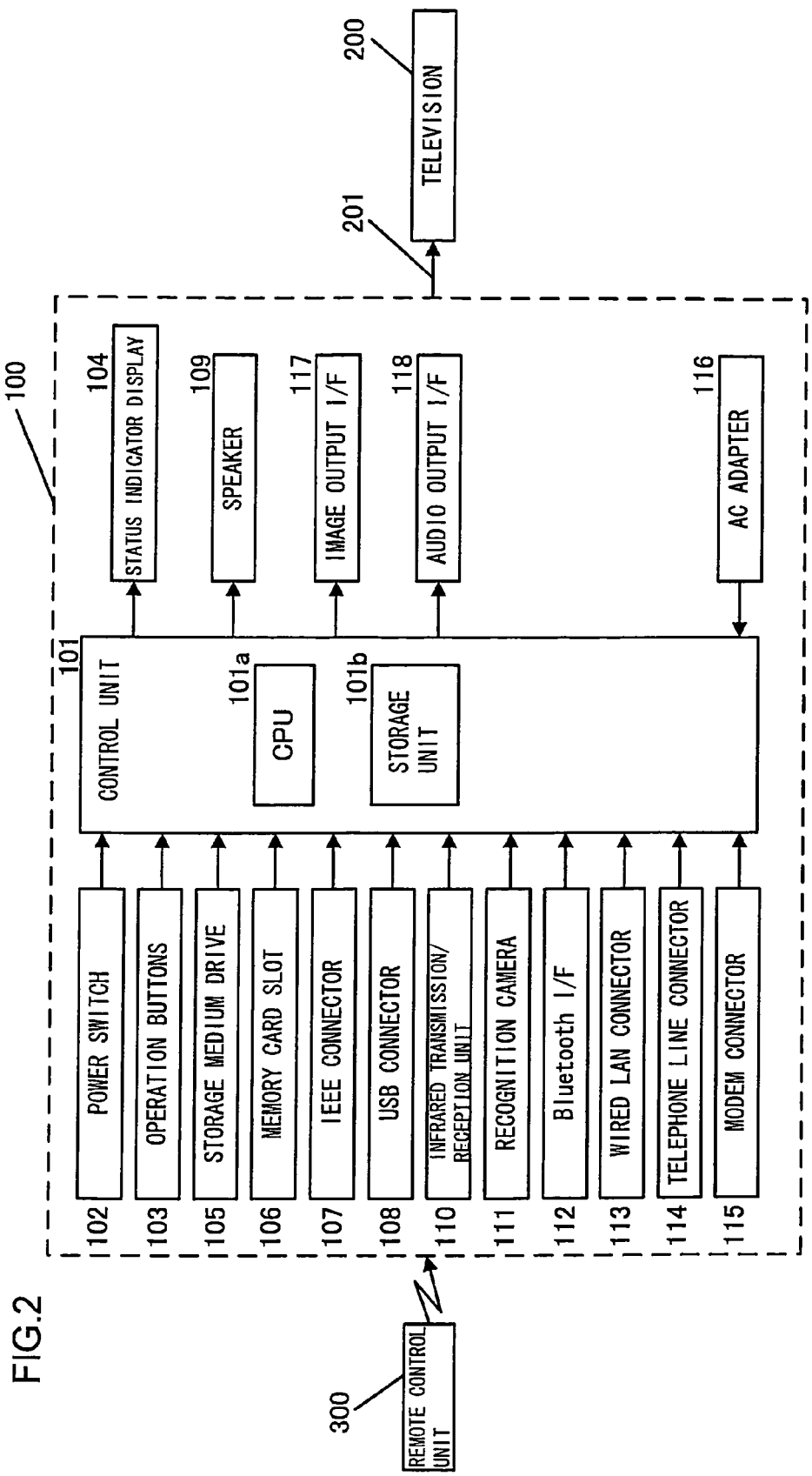

In reference to drawings, the image reproducing system achieved in an embodiment of the present invention is explained. FIG. 1 is an external view of the image reproducing system and FIG. 2 presents a system block diagram. As shown in FIG. 1, the image reproducing system achieved in a first embodiment of the present invention includes an image reproducing apparatus 100, a display device 200 and a remote control unit 300. The image reproducing apparatus 100 includes a control unit 101 constituted with a CPU 101a, a storage unit 101b with a large capacity such as a hard disk drive (HDD) and the like.

The image reproducing apparatus 100, connected with the display device 200 via a cable 201, outputs an image stored in the storage unit 101b to the display device 200 together with the audio data. It is to be noted that the display device 200, which may be, for instance, a television image receiver, is capable of outputting image signals and audio signals having been transmitted from the image reproducing apparatus 100, as well as outputting regular television broadcasts. It is to be noted that while FIG. 1 shows a television image receiver 200 equipped with a CRT, the present invention is not limited to this example and it may be adopted in conjunction with other types of display devices with an audio output function, such as a liquid crystal monitor and a plasma display unit.

The image reproducing apparatus 100 includes a power switch 102 operated to turn on/off the power to the image reproducing apparatus 100, operation buttons 103 operated to issue instructions for reproducing images, stopping image reproduction and the like, a status indicator display 104 at which information related to images and content control statuses (reproduce, fast-forward, rewind, remaining time, etc.) with regard to the reproduced contents is displayed, drives 105 for floppy (registered trademark) disks (FDs), CDs/DVDs, MOs, iVDR (removable hard disks) and the like, a memory card slot 106 compatible with various types of media, an IEEE 1394 connector 107, a USB connector 108, a speaker 109, an infrared transmission/reception unit 110 and a small camera 111 such as a CCD or CMOS used for user recognition. It further includes a Bluetooth (trademark) interface 112 for wirelessly connecting the image reproducing apparatus 100 with a portable telephone or a digital camera, a wired LAN connector 113, a telephone line connector 114, a modem connector 115, an AC adapter 116, an image output interface 117 via which image signals are transmitted to the television image receiver 200, an audio output interface 118 via which audio signals are transmitted to the television image receiver 200 and the like. It may also include a wireless LAN interface (not shown). In addition, it is not crucial that the image reproducing apparatus include all the components shown in the figure.

The CPU 101a in the control unit 101 controls the overall operations of the image reproducing apparatus 100 and the image and audio data output to the television image receiver 200. Although not shown, a memory to be used as ROM and RAM is connected to the CPU 101a. Various programs based upon which the image reproducing apparatus 100 executes operations and image data read via the various drives 105 and the memory card slot 106 are stored into the storage unit 101b. It is to be noted that an additional hard disk may be installed so as to increase the capacity of the storage unit 101b.

As the power switch 102 is operated while power is supplied via the AC adapter 116, the power to the image reproducing apparatus 100 is turned on. The operation buttons 103 are operated by the user to issue instructions for reproducing images stored in the storage unit 101b, for stopping the image reproduction and the like. At the status indicator display 104 constituted with, for instance, a liquid crystal display unit, image-related information such as the frame number of the image currently on display at the television image receiver 200 and the operating status of the image reproducing apparatus 100, e.g., "reproduce", "stop" or the like, are displayed.

Data stored in a recording medium such as a DVD, a CD, an FD, an MO, an iVDR or the like, are provided to the control unit 101 via the corresponding drive 105 and are stored into the storage unit 101b. Thus, image data of images photographed with a digital camera or the like can be saved into the image reproducing apparatus 100 or an operating program for the CPU 101a can be updated, by using a recording medium that may be a DVD, a CD, an FD, an MO, an iVDR or the like. Image data recorded in a medium (e.g., a CompactFlash (registered trademark) or a Smart Media (trademark)) loaded in the memory card slot 106, are provided to the control unit 101 to be stored into the storage unit 101b.

The IEEE 1394 connector 107 is used to connect a digital camera via a cable (not shown) conforming to the IEEE 1394 standard when transferring images photographed with the digital camera into the image reproducing apparatus 100. The USB connector 108 is used to connect the image reproducing apparatus 100 with a peripheral device via a USB cable. The USB connector 108 may be used for, for instance, the following purposes.

To connect the image reproducing apparatus with a digital camera in order to transfer images photographed with the digital camera into the image reproducing apparatus 100.

To connect the image reproducing apparatus with a printer in order to print out an image stored in the storage unit To connect the image reproducing apparatus with a keyboard in order to enter a title or comments for an image to be stored into the storage unit 101b or enter a title for a folder (album) containing the image.

To connect the image reproducing apparatus with a wireless LAN adapter in compliance with the USB protocol.

The infrared transmission/reception unit 110 receives an infrared signal from the remote control unit 300 and transmits the received infrared signal to the CPU 101a. It is also used to exchange image data, image-related information data and the like between the image reproducing apparatus 100 and a digital camera, a portable telephone equipped with a camera, a PDA terminal or the like. Via the Bluetooth (trademark) interface 112, images photographed with a Bluetooth (trademark) compliant digital camera can be transferred into the image reproducing apparatus 100 and image data can be transmitted to a Bluetooth (trademark) compliant printer.

It is to be noted that the image reproducing apparatus 100 can be connected with the Internet via a wired LAN, a wireless LAN, a telephone line or the like.

FIG. 3(a) shows the remote control unit 300 in detail. The remote control unit 300 is a remote control device that outputs various operational commands for the image reproducing apparatus 100. The remote control unit 300 includes a power button 301 operated to turn on/off the power to the image reproducing apparatus 100, a menu button 302 operated to display an operation menu for the image reproducing apparatus 100 at the monitor of the television image receiver 200, a print button 303 operated to print out an image stored in the image reproducing apparatus 100, a slideshow button 304 operated to start a slideshow reproduction of images, numeric keys (keypad keys) 305, left/right rotate buttons 306 and 307 operated to rotate an image, a display switch button 308, various operation buttons 309 and a wheel 310 operated to scroll a screen such as a thumbnail image screen displayed at the television image receiver 200. It also includes a television power button 311 operated to turn on/off power to the television image receiver 200, a volume buttons 312 operated to adjust the volume and an input switch button 313 operated to switch the display at the television image receiver 200 from television broadcast display to display of images from the image reproducing apparatus 100 and vice versa. It is to be noted that these buttons are switches or operating members that output corresponding operation signals as they are depressed.

The numeric keys 305 include 12 keys, i.e., "0"~"9", "*" and "#". In addition to the corresponding numeral, 3~4 alphabet letters are assigned to each of the keys "2"~"0", so as to allow titles for image files and albums to be entered by operating the numeric keys 305. For instance, letters A, B and C are assigned to the "2" key, letters D, E and F are assigned to the "3" key, letters G, H and I are assigned to the "4" key, letters J, K and L are assigned to the "5" key, letters M, N and O are assigned to the "6" key, letters P, Q, R and S are assigned to the "7" key, letters Y, U and V are assigned to the "8" key, and letters W, X, Y and Z are assigned to the "9" key. It is to be noted that depending upon the country or region where the image reproducing apparatus 100 is operated, letters other than alphabet letters may be assigned to the numeric keys 305. The operation buttons 309 are operated to select and confirm letters having been input via the numeric keys 305, select an image file or an album and the like. More specifically, as do the operation buttons in a standard portable telephone, these operation buttons 309 include arrow buttons pointing upward, downward, to the left and to the right, a setting button, a delete button and a character conversion button. It is to be noted that although not shown, a mark indicating the corresponding operation/processing is indicated on each operation button 309.

The plurality of buttons at the remote control unit 300, i.e., the numeric keys 305 and the operation buttons 309, are set at positions corresponding to the positions of the plurality of buttons used for character input in a regular portable telephone. It is to be noted that the numeric keys 305 and the operation buttons 309 may adopt an alternative positional arrangement such as that shown in FIG. 3(b).

The remote control unit 300 includes an infrared interface or a Bluetooth (trademark) interface for transmitting signals to the image reproducing apparatus 100. If the image reproducing apparatus 100 is connected in a wireless LAN, signals may be transmitted to the image reproducing apparatus 100 through the wireless LAN instead. Power is supplied to the remote control unit 300 from a battery (not shown). It is to be noted that as the power button 301 at the remote control unit 300 is operated while the image reproducing apparatus 100 is in a standby state with a very small current supplied thereto, the main power to the image reproducing apparatus 100 is turned on.

The operations executed in the image reproducing apparatus 100 are now explained.

(1) User Authentication

The image reproducing apparatus 100 is able to authenticate a user by photographing the face of the user with the camera 111 as the power is turned on and then referencing pre-registered user faces to find a match with the photographed user's face. Alternatively, user authentication may be executed by displaying a user authentication screen prompting the user to enter his user name and password at the monitor of the television image receiver 200, or by checking the ID assigned to the digital camera or the portable telephone connected to the image reproducing apparatus 100.

(2) Copying Images (2-1) Automatic Image Copying

Upon obtaining image data from a recording medium via the drive 105 or the memory card slot 106, the image reproducing apparatus 100 stores the image data into the storage unit 101b. Upon obtaining images photographed with a digital camera via a wired LAN or a wireless LAN, too, the obtained image data are stored into the storage unit 101b. This processing is now explained in reference to the flowchart presented in FIG. 4.

Figure 5:
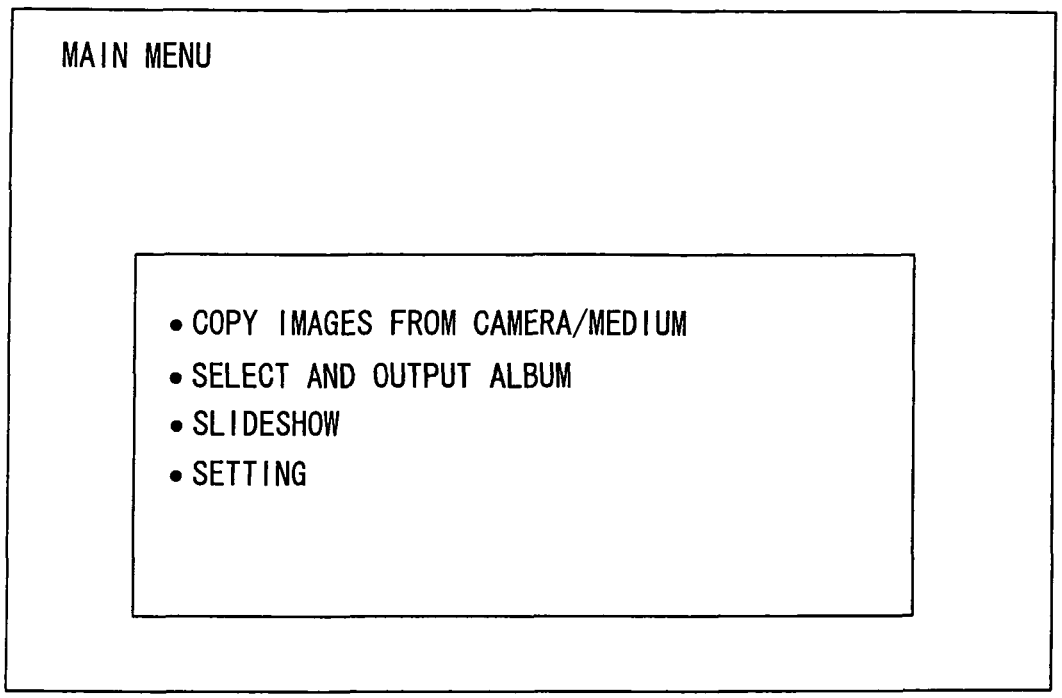

As the power to the image reproducing apparatus 100 is turned on in response to an operation of the power switch 102 at the image reproducing apparatus 100 or the power button 301 at the remote control unit 300 in step S101, a main menu screen such as that shown in FIG. 5 is brought up on display on the monitor of the television image receiver 200 in step S102. The main menu screen may include, for instance, the following options.

copy Images From Camera/Medium
Select and Output Album
Slideshow
Setting

As the option "Copy Images From Camera/Medium" is selected (step S103) by operating an operation button 309 at the remote control unit 300, images from a digital camera or the like are taken in via the USB connector 108, a wireless LAN, the drive 105 or the memory card slot 106, and the images having been taken in are copied into the storage unit 101b in step S104. While the images are being copied into the storage unit 101b, the copy processing may be interrupted. For instance, the copy processing progress status and a copy processing cancel key may be displayed at the monitor of the television image receiver 200 while the copy processing is in progress. In such a case, the user is able to stop copying the image data into the storage unit 101b by selecting the copy processing cancellation through the operation of an operation button 309 at the remote control unit 300.

In addition, when, for instance, image data in a digital camera are taken in via the USB connector 108, the current time indicated at the digital camera is compared with the current time indicated at the image reproducing apparatus 100. If the current time indicated at the digital camera and the current time indicated at the image reproducing apparatus 100 do not match, the image data are copied into the storage unit 101b by correcting the photographing times for the image data in the digital camera based upon the current time indicated at the image reproducing apparatus 100. If the internal clock (not shown) in the image reproducing apparatus 100 is a high-accuracy clock that automatically corrects the time based upon a radio signal or the like, the image reproducing apparatus 100 may automatically reset the time at the digital camera after copying the image data.

Figure 6:
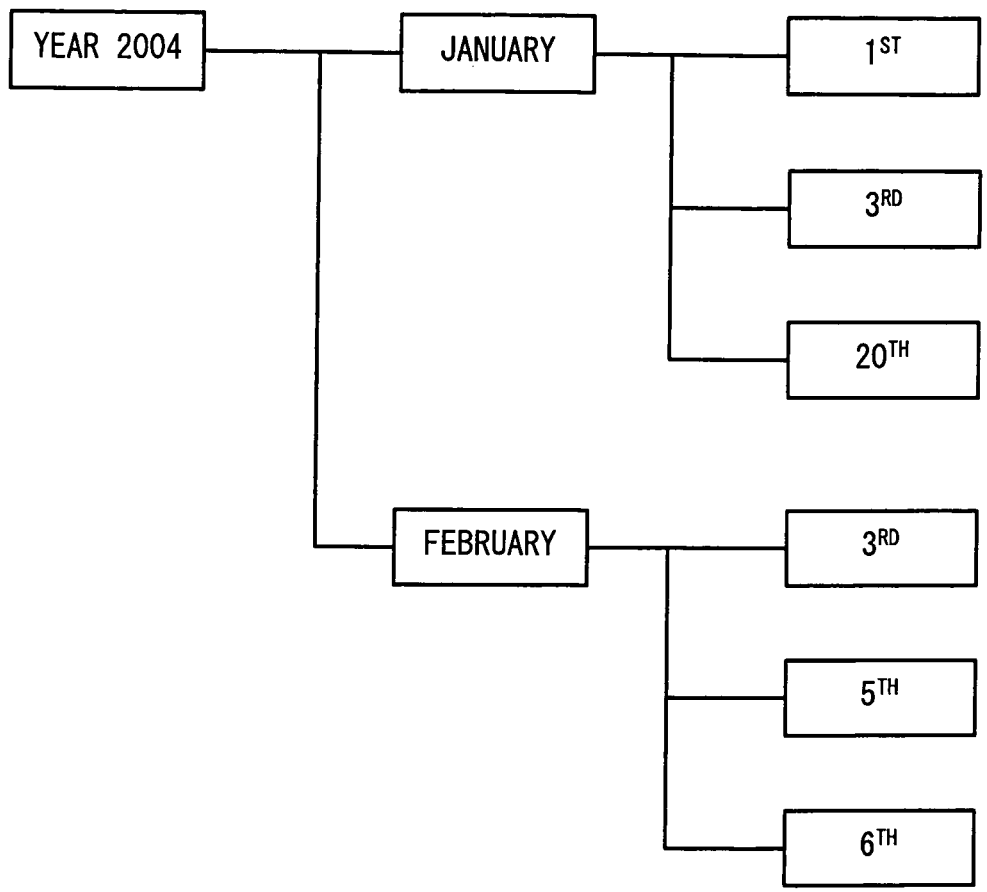

In step S105, the image data having been copied are automatically sorted into albums and saved. For instance, an image photographed on Jan. 20, 2004 is sorted into an album marked as "Jan. 20, 2004". It is to be noted that the albums in which image data are saved assume a hierarchical tree structure with hierarchical layers such as "year", "month" and "date". More specifically, a "January" album is created under a "2004" album layer and a "20$^{th}$" album is created under the "January" album layer, as shown in FIG. 6. Thus, an image photographed on Jan. 20, 2004 belongs to the "2004" album corresponding to the photographing year and the "January 2004" album corresponding to the photographing month as well.

However, the image data are actually saved in the "Jan. 20, 2004" album at the lowermost layer, with management information, indicating that the image data also belong in the "2004" album and the "January 2004" album, attached to the image data. The album assignment of image data to a specific album within the storage unit 101b is managed by a database. It is to be noted that image data may be saved into albums sorted in correspondence to, for instance, intake dates, i.e., the dates on which the image data are read into the image reproducing apparatus 100, instead of the photographing dates.

After the image data are copied into the storage unit 101b successfully, the corresponding image data and folder in the digital camera or the medium are deleted in step S106. It is to be noted that instead of automatically deleting the corresponding data, an inquiry message asking the user whether or not he wishes to delete the image data may be brought up on display. In such a case, the corresponding image data are deleted only if the user chooses to delete the image data in the digital camera or the medium. As a further alternative, management information indicating that the image data have been copied into the storage unit 101b may be appended to the corresponding image data or folder, instead of deleting them. Furthermore, information indicating the results of copy processing having been executed to copy the corresponding image data and folder into the storage unit 101b, e.g., a copy results quick list, may be written at the digital camera or the medium. The image copy processing then ends. In addition, upon completing the processing for deleting the corresponding image data and folder, the operation may shift into a slideshow to be detailed later.

It is to be noted that instead of sorting images copied into the storage unit 101b into albums each corresponding to a specific photographing date or a specific intake date (reading date), images may be first stored into the storage unit 101b in an unsorted state and then they may be sorted into albums as necessary when they are displayed at the monitor of the television image receiver 200. When copying image data in correspondence to which no photographing date is recorded, the intake date on which the image data are read into the image reproducing apparatus 100 may be set as the photographing date or such image data may be saved into an album among those sorted in correspondence to intake dates.

The image data having been copied into the storage unit 101b are saved in folders each corresponding to a specific photographing date or a specific intake date as described above, so as to enable image data management in reference to the photographing dates or the intake dates. This means that image data can be sorted based upon how far back in the past relative to the current time, e.g., how many years ago, how many months ago or how many days ago, they were photographed or copied into the storage unit 101b. This feature can be utilized effectively when executing the image slideshow display to be detailed later.

If there are a plurality of sets of image data having been captured at time points close to one another among the image data being copied into the storage unit 101b, these image data may be displayed as thumbnail images (in an at-a-glance thumbnail display) at the monitor of the television image receiver 200 before they are actually stored into the storage unit 101b. When a plurality of images are photographed at time points close to one another, a given scene may have been photographed with identical photographic compositions over a plurality of frames, which means that there may be images that do not need to be saved into the image reproducing apparatus 100. Accordingly, the image data, which may include images that do not need to be saved, are displayed before the image data are copied into the storage unit 101b so as to allow the user to choose the image data he wishes to save.

If the image reproducing apparatus 100 has an OCR (optical character recognition) function, characters indicating the name of a tourist spot or characters used in a sign or the like, included in the image data having been copied into the storage unit 101b, can be automatically taken in. In this case, the character data extracted by engaging the OCR function can be saved to a clipboard in the memory of the control unit 101 or stored in the storage unit 101b, to be subsequently used as image attribute data. Alternatively, image data with a recognizable tourist spot name or the like and image data having been captured on the same date may be saved into an album assigned with the tourist spot name as the title thereof.

(2-2) Copying Images into an Album Set by the User

Images copied into the storage unit 101b may be saved into an album created by the user according to a theme of his own choosing. This processing is now explained in reference to the flowchart presented in FIG. 7.

As the power to the image reproducing apparatus 100 is turned on in step S111, a main menu screen such as that shown in FIG. 5 is brought up on display at the monitor of the television image receiver 200 in step S112. As the option "Copy Images From Camera/Medium" is selected in the main menu (step S113), the operation proceeds to step S114, in which a specific imaged at a saving location is set. In this situation, the image data may be either added into an existing album or they may be saved into a new album created by the user by assigning a desired album title. The user is able to enter the album title by operating the numeric keys 305 at the remote control unit 300. It is to be noted that at this point, the user may specify an album corresponding to a specific photographing date or a specific intake date as the image data saving location.

In step S115, the image data are copied into the album having been specified in step S114. It is to be noted that the corresponding image data in the digital camera or the medium can be automatically deleted after the image data are copied into the storage unit 101b as explained earlier. Alternatively, upon completing the copy processing, an inquiry message asking the user whether or not he wishes to delete the corresponding image data in the digital camera or the medium may be brought up on display at the monitor of the television image receiver 200 so as to allow the user to indicate his preference. In addition, upon completing the processing for deleting the corresponding image data and folder, the operation may shift into a slideshow to be detailed later.

(2-3) Automatically Copying Images at Power-Up

If the image reproducing apparatus 100, just having been turned on is already in a new image data read-enabled state, the operation can shift automatically into image copy processing immediately after the power-up. This processing is explained in reference to the flowchart presented in FIG. 8.

As the power to the image reproducing apparatus 100 is turned on in response to an operation of the power switch 102 at the image reproducing apparatus 100 or the power button 301 at the remote control unit 300 in step S121, the CPU 101*a* in the image reproducing apparatus 100 makes a decision in step S122 as to whether or not image data can be taken in from an image data source.

If a recording medium having images saved therein, such as a CD/DVD, an FD or an iVDR, is inserted in the drive 105, a memory card having images saved therein is inserted in the memory card slot 106, images are saved in a digital camera, in a folder in a personal computer or a Web server connected via a network, a USB connector or an IEEE 1394 connector or an e-mail with an image attachment has been received, it is decided that the image reproducing apparatus is in the image data intake-enabled state. It is to be noted that from the viewpoint of security, the image reproducing apparatus having received an e-mail with an image attachment should be judged to be in the image data intake-enabled state and the subsequent copy processing should be enabled only if the trustworthiness of the file can be verified.

In step S123, to which the operation proceeds after determining in step S122 that the image reproducing apparatus is in the image data intake-enabled state, a decision is made as to whether or not there is any image present in the image data source that is yet to be taken into the image reproducing apparatus 100. This decision is made by comparing the file names, the file sizes and the file creation/update dates and the like of the images in the source with those of the images in the storage unit 101. If it is decided that there are new image data in the image data source, the operation proceeds to step S124 to automatically copy the image data. If, on the other hand, it is decided that there are no new image data in the image data source, automatic image data copy processing is not executed.

In step S124, processing for copying the new image data, having been judged to be present in the image data source in step S123, into the image reproducing apparatus 100 is executed. In this step, the image data may be saved into an album corresponding to a specific photographing date or into an album created by the user.

Upon completing the copy processing for copying the image data into the storage unit 101*b*, the corresponding image data in the digital camera or the medium are deleted in step S125. It is to be noted that as explained earlier, an inquiry message asking the user whether or not he wishes to delete the corresponding image data may be brought up on display, or management information data indicating that the copy processing has been completed may be attached to the image data in the digital camera or the medium. In step S126, the images having been copied into the storage unit 101*b* in step S124 are displayed in a slideshow. The term "Slideshow" refers to a display mode in which a plurality of images are automatically brought up on display in sequence. The slideshow is to be explained in detail later.

In the following step S127, the main menu such as that shown in FIG. 5 is brought up on display at the monitor of the television image receiver 200 and the current processing session thus ends.

It is to be noted that after the power to the image reproducing apparatus 100 is turned on in step S121, a preset opening screen may be brought up on display at the monitor of the television image receiver 200. In addition, the user may be allowed to select a setting indicating whether or not the opening screen should be displayed.

The main menu is automatically brought up on display at the monitor of the television image receiver 200 as the power to the image reproducing apparatus 100 is turned on in the explanation given above. The main menu in FIG. 5 is also brought up on display at the monitor of the television image receiver 200 as the user operates the menu button 302 at the remote control unit 300 while the image reproducing apparatus 100 is in the power ON state. Accordingly, by bringing up the main menu on display through an operation of the remote control unit 300 and selecting the option "Copy Images From Camera/Medium", the user is able to copy images whenever he wishes.

(3) Album Selection

Images having been copied into the storage unit 101*b* in the image reproducing apparatus 100 may be displayed one at a time at the monitor of the television image receiver 200, may be displayed in a thumbnail at-a-glance display or may be displayed in a slideshow as described later. In addition, the image currently on display at the monitor of the television image receiver 200 can be edited so as to adjust its color, brightness and the like. A method that may be adopted when selecting a specific album and a specific image contained in the album is now explained.

Figure 9:
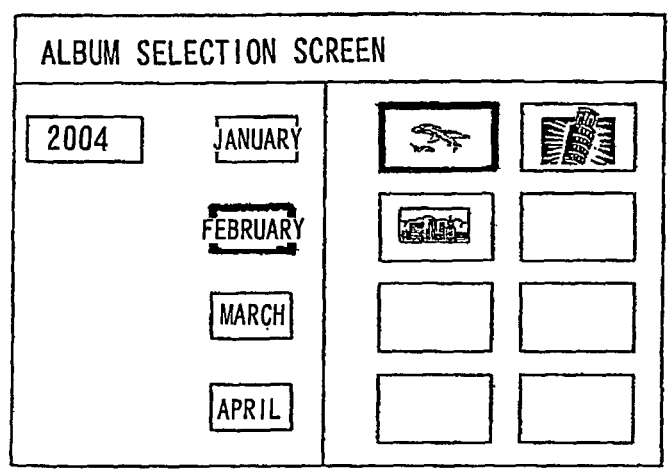

As the option "Select and Output Album" in the main menu (see FIG. 5) on display at the monitor of the television image receiver 200 is selected, an album selection screen, such as that shown in FIG. 9, is brought up on display at the monitor of the television image receiver 200. FIG. 9 shows a plurality of images, which are saved in the "February 2004" album selected by operating the operation buttons 309 at the remote control unit 300, are displayed as thumbnail images. The user then operates the operation buttons 309 at the remote control unit 300 to select a specific image among the images in the thumbnail display. Subsequently, the selected image is brought up on display at the monitor of the television image receiver 200. It is to be noted that images that cannot be contained in the display screen of the television image receiver 200 can be scrolled into the display screen by operating the wheel 310 at the remote control unit 300.

As the user operates the display switch button 308 at the remote control unit 300 while the images contained in the "February 2004" album are displayed as thumbnail images, as shown in FIG. 9, detailed text information indicating the image file names, the photographing dates on which the individual images were photographed and the photographing conditions (the aperture setting, the shutter speed, etc.) is brought up on display. Namely, the thumbnail at-a-glance display mode can be switched to the detail mode and vice versa by operating the display switch button 308.

As explained earlier, the user is able to select and display a specific image saved in an album by selecting the album title displayed at the monitor of the television image receiver 200. This album/image selection operation may be automatically executed by the image reproducing apparatus 100, instead.

More specifically, image selection conditions may be set, a group of images satisfying the conditions may be extracted from the image data stored in the storage unit 101*b* and the images thus extracted may then be displayed at the monitor of the television image receiver 200. In this case, the user is able to select a desired image among the images displayed at the monitor to execute a specific type of processing such as editing the selected image.

For instance, records of past operations having been executed on the individual images after the image data were initially taken into the image reproducing apparatus 100 may be kept and a specific group of images may be extracted based upon the records of the past operations. The past operation records may each indicate the number of times the corresponding image has been printed out, the number of times the image has been brought up on display, the length of time the image has been up on display, the number of times the image has been edited, the number of times the image has been rotated, whether or not a keyword has been set for the image and the like since the initial image data were taken into the image reproducing apparatus 100. If a given image has been printed out, has been brought up on display, has been edited or has been rotated numerous times, a keyword has been set for the image or it has been on display for a significant length of time, the image can be safely assumed to be a favorite image of the user, since the user has shown a great deal of interest in the image and has spent a significant amount of time on the image. Accordingly, the images satisfying these conditions should be extracted as "Favorite Images".

The images having been extracted as "Favorite Images" may be automatically brought up in a thumbnail at-a-glance display, or an option "Favorite Images" may be added in the display screen shown in FIG. 9 so as to allow the user to select the option "Favorite Images" by operating the operation buttons 309 at the remote control unit 300 and enable the image reproducing apparatus 100 to automatically display the extracted images as thumbnails in response.

The extraction conditions based upon which "Favorite Images" are extracted are not limited to the records of past operations having been executed on the stored images. For instance, instead of records of past operations, the extent of blurring or the frequency with which images were photographed per unit time may be used as conditions for the extraction of "Favorite Images". By setting such extraction conditions, sharp, blur-free images can be extracted or images photographed with significant photographing frequency per unit time can be extracted. Images photographed with significant photographing frequency per unit time may be, for instance, multiple images of a race in an athletic meet, photographed in rapid succession.

When displaying thumbnails of the images contained in the selected album, the thumbnails may be sorted and displayed in correspondence to the names of the subjects in the individual images. More specifically, the faces and the names of people should be preregistered in the image reproducing apparatus 100. Then, the image of a person's face in an image stored in the storage unit 101*b* is analyzed and the individual is identified by referencing the preregistered face data by adopting a face recognition technology. In the case of a group picture with a plurality of photographic subjects, a subject whose face takes up the greatest area in the image or a subject who is in focus is identified as the main subject. The specific subject in the image on whom the focus is adjusted can be determined based upon the photographing information attached to the image data.

Once the subjects in the individual images contained in the album are identified, the image data are displayed sequentially, in groups each corresponding to the name of a given subject. The image data may be displayed in the order of, for instance, the ages of the identified subjects (in the order of their birthdays).

(4) Deleting Images

The user is able to delete an image having been selected as described above or an image currently on display at the monitor of the television image receiver 200 by operating the remote control unit 300. For instance, the user can issue a delete image instruction by selecting the option "Setting" in the main menu screen in FIG. 5 and operating the remote control unit 300 in the "Setting" screen (not shown) brought up on display in response.

There may be an image belonging to an album corresponding to a specific photographing date and also to an album assigned with a specific tourist spot name, i.e., there may be an image belonging to a plurality of albums in the data classification system although the image is stored as a single image in the storage unit 101*b*. In such a case, the user having issued an image delete instruction should then be provided with a warning message brought up on display at the monitor of the television image receiver 200, indicating that the corresponding image also belongs to another album.

At this time, a message inquiring whether the user wishes to delete the image only from a specific album or delete the image from all the albums to which it belongs, should be displayed together with a warning message. The user then operates the remote control unit 300 to select either delete option and to delete the specified image. If the image is to be deleted only from a specific album, the image management information is updated, whereas if the image is to be deleted from all the albums, the image is completely deleted from the storage unit 101*b*.

If the image specified by the user for deletion is the representative image of an album, a warning message indicating to the user that the specified image is a representative image is brought up on display. Together with the warning message, options "Cancel", "Delete and Set First Image in Album as New Representative Image" and "Delete and Shift to New Representative Image Selection Screen" are displayed at the monitor of the television image receiver 200. The user is thus able to select the desired processing by operating the remote control unit 300.

It is to be noted that images stored in the storage unit 101*b* can be protected against accidental erasure. As long as a given image remains protected, the image cannot be erased. By setting the protect characteristics in correspondence to each image, accidental erasure of a favorite image can be prevented.

(5) Copying Images from One Album to Another

Images having been copied into the storage unit 101*b* can be transferred or copied into another album. For instance, as the user operates an operation button 309 at the remote control unit 300 while the plurality of images saved in the "February 2004" album having been selected are displayed as thumbnails, as shown in FIG. 9, a specific transfer location or copy location can be selected for the subject album, i.e., the "February 2004" album. It goes without saying that the image data in the "February 2004" album can be transferred or copied in units of individual images.

(6) Album Management

When the image reproducing apparatus 100 is shared among, for instance, family members, album management information can be set for each user. As a given user is authenticated as explained earlier, the authenticated user is able to view the albums belonging to the user or edit the contents of the albums. It is to be noted that an image in an album can be selected as the representative image for that particular album.

The album representative image is stored in correspondence to the album title and when a plurality of albums are displayed at the monitor of the television image receiver 200, the representative images corresponding to the individual albums are displayed together with the album titles. If no representative image is selected, the first image in the album is set as the default representative image.

(7) Slideshow Display

The images in the album having been selected as described above can be automatically displayed in sequence in a slideshow at the monitor of the television image receiver 200. The slideshow starts as the user, having selected the album, operates the slideshow button 304 at the remote control unit 300. A slideshow of a desired album can also be started by selecting the option "Slideshow" in the main menu shown in FIG. 5. In addition, a slideshow can be started automatically when new image data are taken into the image reproducing apparatus 100, as described earlier.

It is to be noted that a single album or a plurality of albums can be selected for the slideshow display. In addition, the images contained in all the albums stored in the storage unit 101b may be displayed in a slideshow.

(7-1) Display/Audio Effects During Slideshow

When changing over from an image currently on display to a new image, an attractive image changeover effect, e.g., the image currently on display fades out while the next image fades in, can be selected for the slideshow. In addition, the slideshow may include background music (BGM). A plurality of image changeover effects and a plurality of BGM selections are available at the image reproducing apparatus 100 which automatically sets a specific image changeover effect and a specific BGM selection in response to a slideshow start instruction. Alternatively, the user may be allowed to select an image changeover effect and BGM.

The image reproducing apparatus 100 automatically selects the image changeover effect and the BGM based upon the image photographing dates or the image intake dates. For instance, a hit song that was on the hit chart when the images were photographed may be selected as the BGM for the images. Alternatively, if the image attribute data include GPS information, music matching the image photographing location may be selected as the BGM. For instance, if the GPS information indicates that the imaged were photographed during a trip to Paris, chanson may be selected as the BGM.

The image changeover effect or the BGM may be switched during a given slideshow. In this situation, the image reproducing apparatus 100 is allowed to randomly select another changeover effect or BGM. Alternatively, the user may be allowed to select an image changeover effect group offering a plurality of changeover effects and a BGM group offering a plurality of musical selections.

It is to be noted that a plurality of images may be displayed together in a single screen during a slideshow. In addition, the display image size, the display time length or the display layout may be switched for individual images either randomly or in conformance to a specific rule. The image size or the display time length may be switched under control executed based upon, for instance, the record of past image operations described earlier. For instance, an image having been printed out numerous times and thus assumed to be a favorite image of the user may be displayed in a large display size or over a greater length of time. Alternatively, the display time length or the display size for each image may be selected by referencing the time lag between the preceding/succeeding image photographing dates, the GPS information for the image, the model name of the digital camera with which the image was photographed, the photographing frequency per unit time, the keyword set for the image or the like.

If the selected album contains an image in a smaller size relative to the number of pixels present in the image display area on the monitor of the television image receiver 200, the user should be allowed to choose either to enlarge the image or not to enlarge the image. In addition, the user is allowed to select an option from the following five options.

(1) Display an enlarged/reduced image (without retaining the aspect ratio of the original image) so that the image will perfectly fit the display area on the monitor of the television image receiver 200

(2) Display the image in its original size (3) Display an enlarged/reduced image so as to best fit the image into the display area on the monitor of the television image receiver 200 while maintaining the initial aspect ratio (4) Display an enlarged/reduced image so as to avoid blank space along the horizontal direction over the image display area on the monitor of the television image receiver 200

(5) Display an enlarged/reduced image so as to avoid blank space along the vertical direction over the image display area on the monitor of the television image receiver 200

Furthermore, the images displayed during the slideshow can be made to move, enlarged or reduced (zoom in/zoom out) so as to display them as a simulated motion picture. During the slideshow, the background may change.

(7-2) Messages Displayed During Slideshow (7-2-1) Displaying Fixed Messages

While displaying images in a slideshow, text information such as the image file name, the image photographing date, a caption, the schedule data, the keyword, the image photographic information (aperture setting, shutter speed, etc.) or a counter value can be displayed together with each image. The user is able to select a specific type of text information to be displayed during the slideshow by operating an operation button 309 at the remote control unit 300. It is to be noted that the text information may be displayed at a fixed position in the display screen of the television image receiver 200 or it may be displayed at varying positions. For instance, it may roll from right to left across the screen.

(7-2-2) Displaying Dynamic Messages

While displaying images in a slideshow, dynamically generated messages can also be displayed. While the fixed messages described above are useful in the sense that they provide information regarding the images themselves, they are not particularly entertaining. Accordingly, a message may be generated based upon information such as the photographing date on which each image was photographed, so as to provide the user with useful and entertaining messages by displaying different messages for the individual images.

For instance, the CPU 101a may calculate the difference between the photographing date on which the subject image was photographed and the current date and a message (text data) "xx years, xx months ago" may be displayed together with the image. In addition, anniversary data with regard to wedding anniversaries, birthdays and the like may be set in advance at the image reproducing apparatus 100, and the anniversary data and the current date may be referenced together so as to display messages such as "xx$^{th}$ wedding anniversary" and "Happy xx$^{th}$ birthday to yy". These messages may the superimposed over the images displayed in the slideshow or they may be displayed off the images, i.e., in the background area. Alternatively, a message alone may be displayed as a single slide.

(7-3) Resuming Slideshow

A slideshow, having been interrupted or stopped as the power to the image reproducing apparatus 100 was turned off while the slideshow was in progress, is resumed by showing the image that was on display when the interruption/stoppage occurred. The resume processing is now explained in reference to the flow chart presented in FIG. 10.

In step S131, a reproduction target album for a slideshow is selected. The user selects the reproduction target album by manually operating the remote control unit 300. If, on the other hand, new image data have been taken in, the image reproducing apparatus 100 automatically selects the reproduction target album. It is to be noted that a plurality of albums may be selected as the slideshow reproduction target.

In step S132, information that enables identification of the slideshow reproduction target album having been selected in step S131, e.g., the album title, the album management number or the like, is recorded into the memory. It is to be noted that instead of an entire album, individual images may be selected as the slide show reproduction target. In such a case, information that enables identification of the individual images having been selected, e.g., the image file names, the image management numbers or the like, is recorded into the memory. At this point, the order in which the plurality of images have been selected may be recorded.

In step S133, a slideshow of the album or the images having been selected in step S131 starts. An image in the selected album or one of the individual images having been selected is then read out from the storage device 101*b* and displayed at the monitor of the television image receiver 200 in step S134. In step S135, the information such as the filename, which enables identification of the image currently on display at the monitor of the television image receiver 200, is recorded into the storage unit 101*b*.

In step S136, a decision is made as to whether or not the power to the image reproducing apparatus 100 has been turned off. If the main power of the image reproducing apparatus 100 has been turned off through an operation of the power switch 102 or the image reproducing apparatus 100 has shifted into a standby state in response to an operation of the power button 301 at the remote control unit 300, the operation proceeds to step S137, in which the image reproducing apparatus 100 enters a power OFF state. If, on the other hand, a negative decision is made in step S136, the operation proceeds to step S138 to make a decision as to whether or not the image currently on display is the last image in the selected album or the last image among the plurality of selected images.

If it is decided in step S138 that the image currently on display is not the last image, the operation returns to step S134 to display the next image at the monitor of the television image receiver 200. If, on the other hand, the image currently on display is judged to be the last image, the operation proceeds to step S139. In step S139, the slideshow ends, thereby ending the processing itself. Once the slideshow ends, the main menu such as that shown in FIG. 5 is brought up on display at the monitor of the television image receiver 200 and the image reproducing apparatus waits in standby for a subsequent instruction from the user.

As the power is turned on again and the main power at the image reproducing apparatus 100, having been in the power OFF state, is turned on in step S140, the operation proceeds to step S141. In step S141, information on the slideshow that was in progress before the image reproducing apparatus 100 shifted into the power OFF state is read out from the memory. The information that is read out at this point is the album title or the album management number of the slideshow reproduction target album and the file name or the file management number assigned to the image that had been on display as a reproduced image when the image reproducing apparatus shifted into the power OFF state. It is to be noted that if a plurality of albums or a plurality of images were selected as the reproduction target, information corresponding to each album or each image should be read out.

In step S142, the current album and the current image having been on display during the slideshow when the power was cut off and the slideshow was interrupted, are set based upon the album information and the image information having been read out in step S141. In step S143, the slideshow is automatically resumed by referencing the current image in the current album having been set in step S142. The slideshow may resume by adopting one of the following display methods.

The slideshow display resumes, starting with the first image in the current album, i.e., the reproduction target album having been on display in the slideshow before the power was turned off The slideshow is resumed starting with the current image, i.e., the image having been on display when the power was turned off The slideshow is resumed starting with the image following the current image having been on display when the power was turned off The user may be allowed to choose one of the methods described above to be adopted in the slideshow resumption, or the slideshow may be resumed by adopting a preselected resumption method among them.

It is to be noted that while the slideshow is resumed automatically as the image reproducing apparatus 100 shifts back into the power ON state in the processing described above, the slideshow may instead be resumed in response to a slideshow start instruction issued by the user by operating the remote control unit 300 or the like. In addition, the processing described above can be executed after a slideshow has been interrupted in response to a slideshow interrupt instruction issued by operating the operation button 103 at the image reproducing apparatus 100 or an operation button 309 at the remote control unit 300, or after a slideshow has been interrupted by the user by operating the menu button 302 at the remote control unit 300 in order to start another processing. The processing described above may also be executed equally effectively when resuming an interrupted display of individual images which are brought up in sequence one at a time at the monitor of the television image receiver 200 instead of an interrupted slideshow during which images are automatically brought up on display in sequence.

The image reproducing apparatus 100 has a resume function similar to the image display resume function described above, for the BGM played during the slideshow. The BGM may be resumed by adopting any of the following methods.

The set of music data selected for the slideshow BGM and the data for the tune (current music) that was being played when the slideshow was interrupted are recorded into the memory and the BGM is resumed starting at the beginning of the current music as the slideshow resumes.

The set of music data selected for the slideshow BGM and the data for the tune (current music) that was being played when the slideshow was interrupted are recorded into the memory. As the slideshow resumes the current music starts at the point at which it was interrupted. It is to be noted that the current music may start to play with its volume at zero and the volume may gradually rise to the preselected volume setting (fade in) so as to ensure a smooth resumption of the BGM.

The set of music data selected for the slideshow BGM and the data for the tune (current music) that was being played when the slideshow was interrupted are recorded into the memory and the BGM resumes starting with the tune following the current music as the slideshow resumes.

If the BGM is automatically selected by the image reproducing apparatus 100 based upon various conditions, as has been explained in section (7-1) above, the image reproducing apparatus reselects tunes for the BGM when resuming the slideshow.

The specific method to be adopted when resuming the BGM may be selected by the user or the BGM may be resumed through a preselected resumption method among the methods described above.

(8) Editing Images

An image having been selected as described above may be edited by rotating it, cropping it, correcting its color, applying a filter to it or the like. Edit processing may be executed by directly editing the original image stored in the storage unit 101*b* or by creating a new file and saving the edit results without altering the original image. The user is able to edit the image brought up on display at the monitor of the television image receiver 200, by using the remote control unit 300 or a mouse (not shown) connected to the image reproducing apparatus 100 via the USB connector 108.

(9) Printing Images

An image having been selected as described above can be output to and printed out at a printer (not shown) connected to the image reproducing apparatus 100 via a wired LAN, Bluetooth (trademark) or the like. When printing out the image, the user is able to select a specific layout, e.g., how the image should be set on the printing sheet. In addition, the user is able to set character strings such as a caption or comments for the image to be printed out. Furthermore, the user is allowed to choose whether or not to print out information such as the comments, the image title, the photographing date or the photographic information together with the image itself and the user is also allowed to choose the layout of the information on the printing sheet.

(10) Writing Image Data to a CD/DVD/MO/FD

The selected image can be written into a recording medium loaded into a specific drive 105, e.g., a CD, a DVD, a MO or an FD. The image data can also be written into a medium loaded in the memory card slot 106. The CPU 101*a* is capable of generating data enabling a slideshow display of the images in a selected album and the slideshow data thus generated can then be written into a recording medium. The program, based upon which the slideshow reproduction is executed can be recorded into the recording medium at the same time as necessary.

(11) Updating Software

Software programs that enable the various operations of the image reproducing apparatus 100 described above are stored in the control unit 101 of the image reproducing apparatus 100. The CPU 101*a* executes the software programs stored in the control unit when controlling the operations of the image reproducing apparatus 100. A software program stored in the control unit may be updated by adopting any of the following methods.

The software program in the control unit 101 is updated to the latest version saved in a server by connecting with the server via a telephone network via the telephone line connection interface 114.

The software program in the control unit 101 is updated to the latest version saved in a web server by connecting with the Web server via a wired LAN, a wireless LAN or the like.

The software program in the control unit 101 is updated by inserting a medium such as a CD-ROM having stored therein the latest version of the software into the corresponding drive 105.

(12) Downloading Music Data and the Like

The entertainment value of an image display or a slideshow can be further enhanced by downloading music information and the like and playing the downloaded music information as the image display BGM. For instance, a specific type of information such as music, news or weather information may be downloaded based upon the attribute data for an image to be displayed. The information thus downloaded may then be provided to the user together with the image. This processing is now explained in reference to FIG. 11.

In step S151, the attribute data written within the file of the selected image are obtained. The attribute data may indicate the photographing date, the intake date on which the image was taken into the image reproducing apparatus 100, the GPS information, the name of the photographer and the like. Such attribute data may be obtained from a database that manages images stored in the storage unit 101*b*. The database may be an internal database located within the image reproducing apparatus 100 or it may be a database on a network.

If a plurality of images have been selected as the reproduction target as in a slideshow, the attribute data representing the plurality of images are obtained by adopting one of the following methods (a)~(d).

(a) An average value obtained by averaging the values indicated in the attribute data of all the images selected as the reproduction target is used as the representative attribute data. For instance, the average value obtained by averaging the photographing dates of the individual images may be used as the representative attribute data.

(b) A plurality of images having been selected as the reproduction target are divided into groups, each made up of at least one image, and an attribute data average value is calculated for each group. The attribute data average values having been calculated in correspondence to the individual groups are then used as attribute data.

(c) The attribute data of the first image to be reproduced, among the plurality of images having been selected as the reproduction target, are used as the representative attribute data.

(d) Attribute data are individually obtained for each of the plurality of images having been selected as the reproduction target.

It is to be noted that when calculating an average value of the attribute data for a plurality of images, the photographing dates average value should be obtained as the representative attribute data, since an average value cannot be calculated based upon the GPS information or the photographer information.

In step S152, a decision is made as to whether or not the attribute data have been obtained in step S151. If the attribute data have been obtained, the operation proceeds to step S154, whereas if the attribute data have not been obtained, the operation proceeds to step S153 to obtain alternative information. For instance, if the photographing date information is not available in the image file or the database and thus the photographing date information has not been obtained, the date on which the image was taken into the image reproducing apparatus 100 or the date on which the image file was updated in the image reproducing apparatus 100 is obtained as alternative attribute data.

In step S154, data related to the attribute data having been obtained in step S151 or step S153 are searched in the database. The database may be an internal database located within the image reproducing apparatus 100 or it may be a database on a network. By using a database on a network, data matching the attribute data can be retrieved from a huge volume of information.

In this step, a hit song released on the date when the reproduction target image was photographed or a news item reported on the photographing date, for instance, is retrieved from the database as the data related to the attribute data. The news item can be retrieved by searching various categories including financial, political, sports and entertainment, based upon specific user preference. For instance, the information may be automatically filtered at the image reproducing apparatus 100 so as to retrieve sports news or entertainment news only if the user wishes to provide enjoyable news while displaying the image on the monitor of the television image receiver 200.

In addition, if a plurality of types of attribute data are obtained in step S151, the related data may be searched based upon a combination of these attribute data. For instance, based upon the image photographing date and the GPS information, a news item originating from a specific region on a specific date may be retrieved. It is to be noted that if no hit song was released on the image photographing date, a search for a hit song may be executed by setting the release date range over, for instance, one month periods preceding and following the photographing date. In other words, the search conditions can be set with an appropriate degree of flexibility as necessary.

It is to be noted that a record of previously obtained related data may be saved in the image reproducing apparatus 100 so that the same data are not obtained repeatedly. Namely, if the same song or news item accompanies an image every time it is brought up on display, the user may eventually become bored with the whole presentation. Accordingly, the information on the previously obtained related data may be saved as record information so that a song or a news item not indicated in the record information is selected when new related data are searched based upon the attribute data.

In step S155, related data, i.e., a song or a news item resulting from the search, are downloaded from the database based upon the results of the search having been executed in step S154. If the related data are downloaded through a network via a telephone line or the like, the data format may be modified in correspondence to the line condition. For instance, if sufficient network bandwidth can be secured, uncompressed high-quality audio data may be obtained. If only a narrower network frequency band can be secured, compressed audio data may be obtained and if the network frequency band is even narrower, MIDI data may be obtained. In this situation, the image reproducing apparatus 100 may automatically select the specific type of audio data to be obtained in correspondence to the network frequency band conditions or the user may select the audio data type.

In addition, identical data may be stored in advance at a plurality of servers on the network and a specific line may be selected in correspondence to the conditions of the load on the network when the related data are to be downloaded.

In step S156, the reproduction target image is displayed at the monitor of the television image receiver 200 and also the related data having been obtained in step S155 are output. It is to be noted that if audio news has been obtained as the related data, the audio news is reproduced, whereas if text news has been obtained as the related data, the text is displayed together with the image at the monitor of the television image receiver 200.

The related data having been obtained may be directly reproduced and displayed, or they may be first processed and then reproduced/displayed. The related data may be processed as described below, for instance.

A song may be abridged so that its play time fits the length of time over which the corresponding image is displayed in the slideshow.
  The volume at which the song is played may be gradually raised from 0 and gradually lowered to 0 so as to start/end the song smoothly by taking advantage of the fade in/fade out effect.
  When displaying text news, the number of characters is adjusted in correspondence to the size of the display screen of the television image receiver 200. For instance, only the headline of the news item may be displayed or the headline and a synopsis of the news item may be displayed. Alternatively, a second half of the news report may be cut off so as to adjust the number of characters in the news item.
  Based upon the latitude/longitude information detected in the GPS information, the geographical name of the photographing location or a landmark in the area where the image was photographed may be determined and displayed.
  The length of image display time may be adjusted in correspondence to the length of the song obtained as the related data. In the case of a slideshow in particular, the display time may be adjusted so as to finish reproducing all the images while a single tune is played.

The related data are output together with the image as described above and then the processing ends.

It is to be noted that attribute data with regard to music data having been obtained may be detected in step S151. More specifically, attribute data such as the date on which the song was composed, the name of the composer, the name of the musician/singer, the performance date (recording date), the duration of the song and the specific period of time during which the song was popular may be obtained in correspondence to the music data having been obtained in step S155 during the previous processing cycle. Then, a news item or a song corresponding to the attribute data may be searched (step S154) and output together with the image. In addition, by obtaining the attribute data of the music data, the time point at which the music currently being played ends can be calculated. Accordingly, the image that will be on display at the time point at which the music ends can be predicted and attribute data can be obtained in correspondence to the predicted display image. As a result, the processing for searching for and obtaining music data related to the image that will be on display at the current music play end can be completed before the music currently being played ends and a song matching the display image can start playing without delay.

In the image reproducing system described above, the television image receiver 200 is connected to the image reproducing apparatus 100 so as to reproduce and display image data stored in the image reproducing apparatus 100, at the monitor of the television image receiver 200. However, the present invention is not limited to this example and it may be adopted in a system in which the image reproducing apparatus 100 and the television image receiver 200 are provided as an integrated unit.

Figure 12:
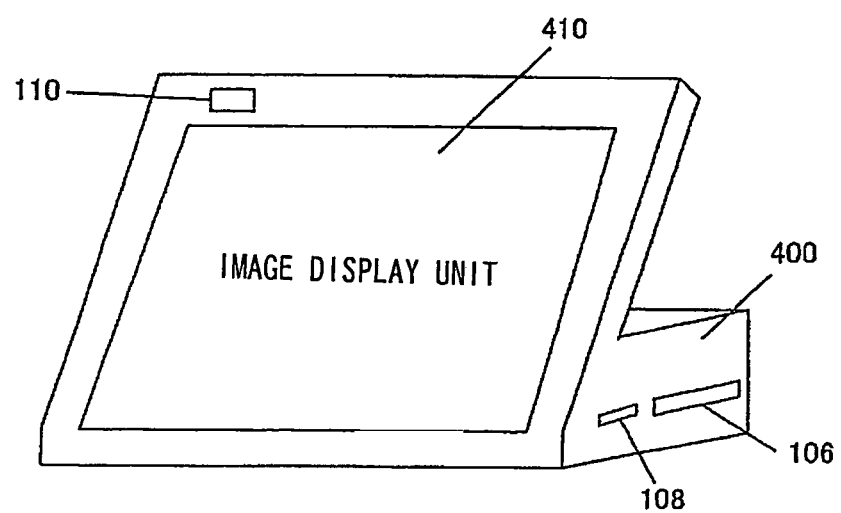

For instance, the image reproducing apparatus may be an integrated unit that includes an image storage unit 400 and an image display unit 410, as shown in FIG. 12. The image display unit 410 may be, for instance, a liquid crystal monitor. The image storage unit 400 includes a control unit and the like as does the image reproducing apparatus 100 explained earlier. An infrared transmission/reception unit 110 that receives an infrared signal originating from a remote control unit or the like (not shown) is disposed above the image display unit 410. An integrated display-type image reproducing apparatus such as that shown in FIG. 12 can be utilized as a photo frame as well.

The image reproduction system shown in FIG. 1 and the image reproducing apparatus shown in FIG. 12 are each designed to be installed at a fixed location such as a living room where the user is able to view images in a relaxed environment. However, the present invention may be adopted in a portable-type image reproducing system or a portable-type image reproducing apparatus, as shown in FIGS. 13 and 14.

Figure 13:
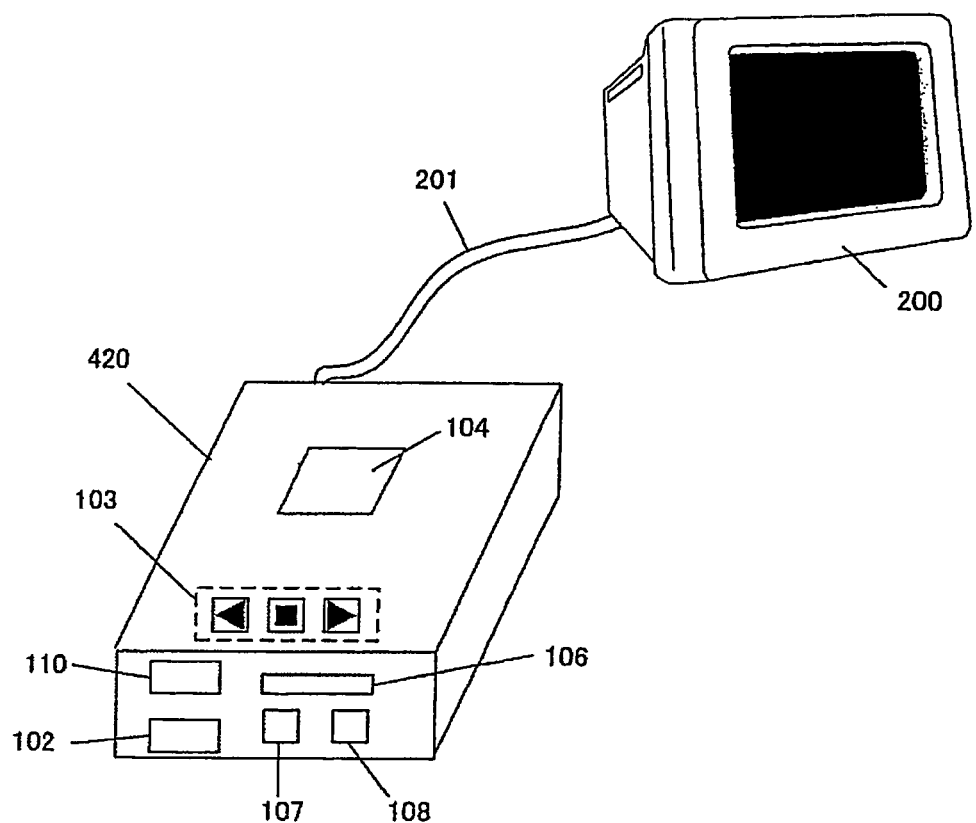

FIG. 13 shows a portable image reproducing apparatus 420 connected to the television image receiver 200 via a cable 201. The image reproducing apparatus 420, the television image receiver 200 and a remote control (not shown) together constitute an image reproducing system. The image reproducing apparatus 420 assumes a structure similar to that of the image reproducing apparatus 100 shown in FIG. 1. However, FIG. 13 does not include an illustration of the drives 105 and the like to simplify the drawing. FIG. 14 shows a portable image reproducing apparatus 430. In the image reproducing apparatus 430, an image storage unit 440 and a display unit 450 are provided as an integrated unit. An image stored in the image storage unit 440 and the image display state, are displayed at the display unit 450.

Figure 14:
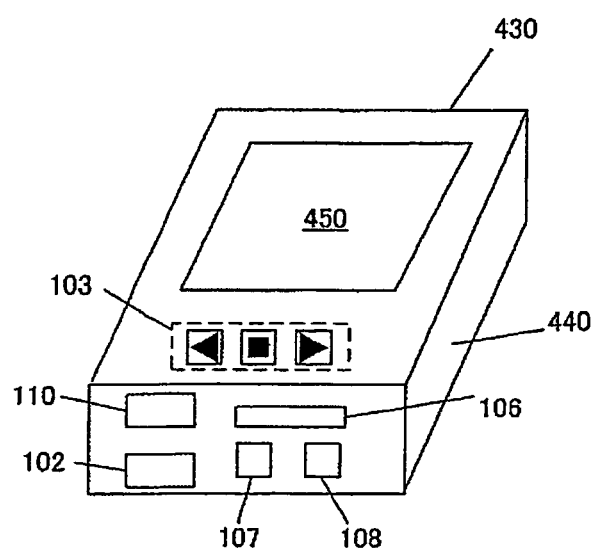
Figure 15:
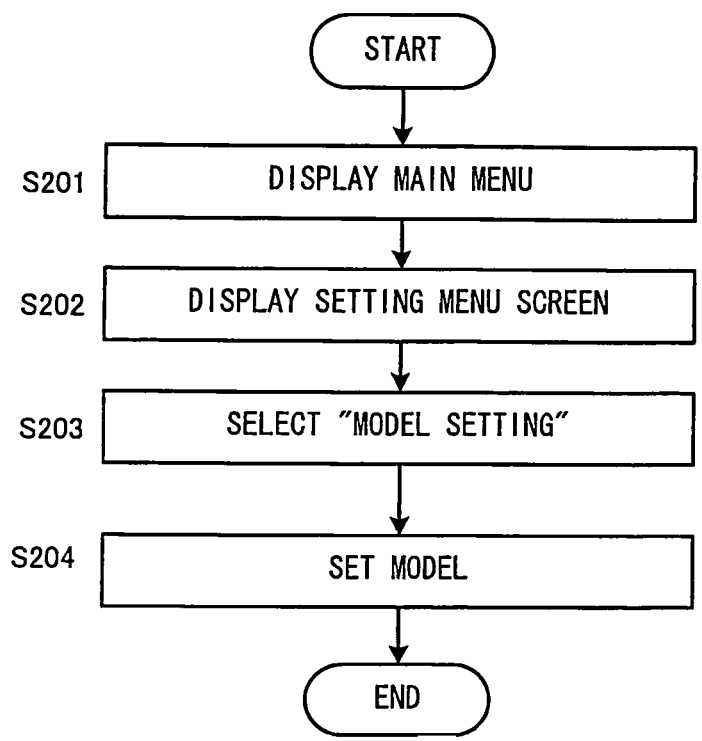

Portable image reproducing apparatuses/systems such as those shown in FIGS. 13 and 14 are designed as more compact, lighter-weight apparatuses/systems compared to a permanent installation-type apparatus/system, so that they can be mobile. Since a portable apparatus may be operated by the user as a handheld unit, it may adopt a structure that allows text input and the like to be executed at the apparatus 420 or 430. In such a case, the image reproducing system does not need to include a remote control unit.

The structure of, and the operations executed in the image reproducing system achieved in an embodiment of the present invention have been explained in detail. Next, functions that characterize the image reproducing system in the embodiment are explained.

As mentioned earlier, text such as an album title is entered in the image reproducing system in the embodiment by using the numeric keys 305 at the remote control unit 300 in a manner similar to that with which text is input at a portable telephone. While a majority of users are familiar with text input via the numeric keys of a portable telephone, the operating procedures, including the positions of the setting buttons, the method with which the alphabet letter mode is switched to the numeral mode and vice versa and the character conversion order, varies among various models of portable telephones.

For instance, as the "#" key of the numeric keypad is operated in portable telephone model A, characters may be selected in the order of ".", "'", """, "/", ":", ";", "+", "−", "=" and "#" for character conversion. In another model B, characters may be selected in the order of "#", "?", "!", "$", "%", "&", ",", and "." for character conversion in response to operations of the "#" key. In addition, while the character input mode may be switched in model C in the order of; uppercase alphabet letter→lowercase alphabet letter→numeral, the character input mode may be switched in model D in the order of; full space alphabet letter→half space alphabet letter→numeral.

Accordingly, the character input method to be adopted at the remote control unit 300 is set in correspondence to the specific model of the portable telephone used by the user. More specifically, operational commands output in response to operation of the numeric keys 305 at the remote control unit 300, i.e., the character input commands, are adjusted in correspondence to the portable telephone model. As a result, the user is able to input text with ease by operating the remote control buttons exactly as when he input text at his portable telephone. The following is an explanation of the method adopted when registering the portable telephone model given in reference to the flowchart presented in FIG. 15. This processing is executed while the main power to the image reproducing apparatus 100 is in an ON state.

Figure 16:
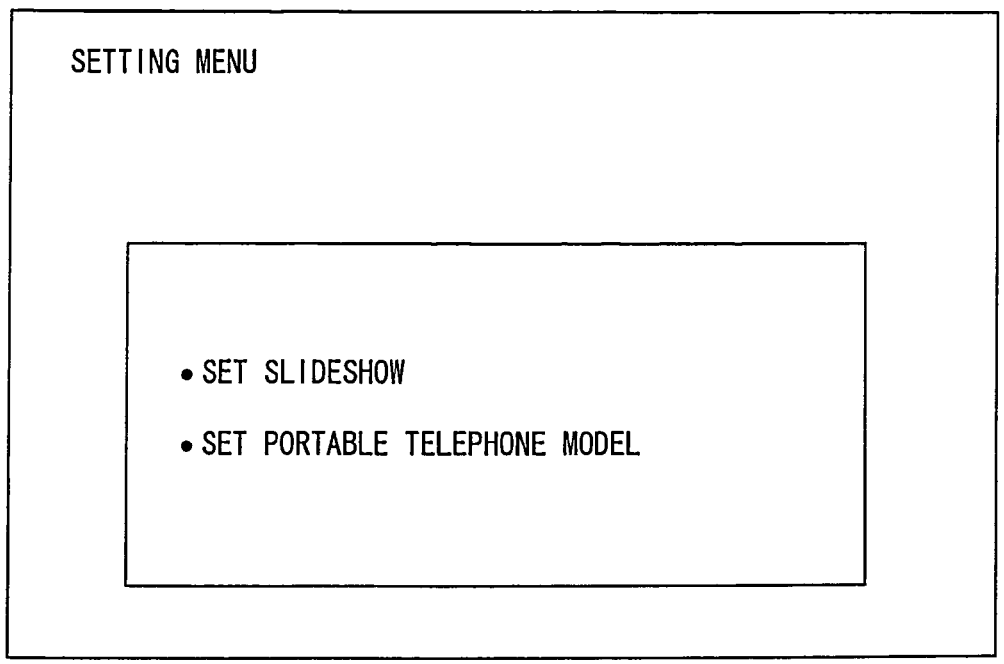

In step S201, a main menu screen such as that shown in FIG. 5 is brought up on display at the monitor of the television image receiver 200 by operating, for instance, the menu button 302 at the remote control unit 300. As the option "Setting" in the main menu screen is selected, a setting menu screen such as that shown in FIG. 16 is brought up on display (step S202). As the option "Set Portable Telephone Model" is selected in the setting menu screen on display by operating an operation button 309 at the remote control unit 300, a portable telephone model setting screen such as that shown in FIG. 17(*a*) is brought up on display (step S203).

The user is able to select a specific communication service provider name and a specific model name from pulldown menus in the portable telephone model setting screen, as shown in FIG. 17(*a*). The user selects the name of the service provider and the model name corresponding to his portable telephone by operating the operation buttons 309 at the remote control unit 300 and then operates the confirm key (step S204). As a result, the model name of the user's portable telephone becomes registered in the image reproducing apparatus 100.

It is to be noted that while the communication service provider name and the model name are selected from pulldown menus in this example, the model name may be directly input in a portable telephone model setting screen such as that shown in FIG. 17(*b*) by operating the remote control unit 300. Alternatively, the portable telephone and the image reproducing apparatus 100 may be connected with each other via a USB cable so as to enable the image reproducing apparatus 100 to automatically recognize the portable telephone model name.

Figure 18:
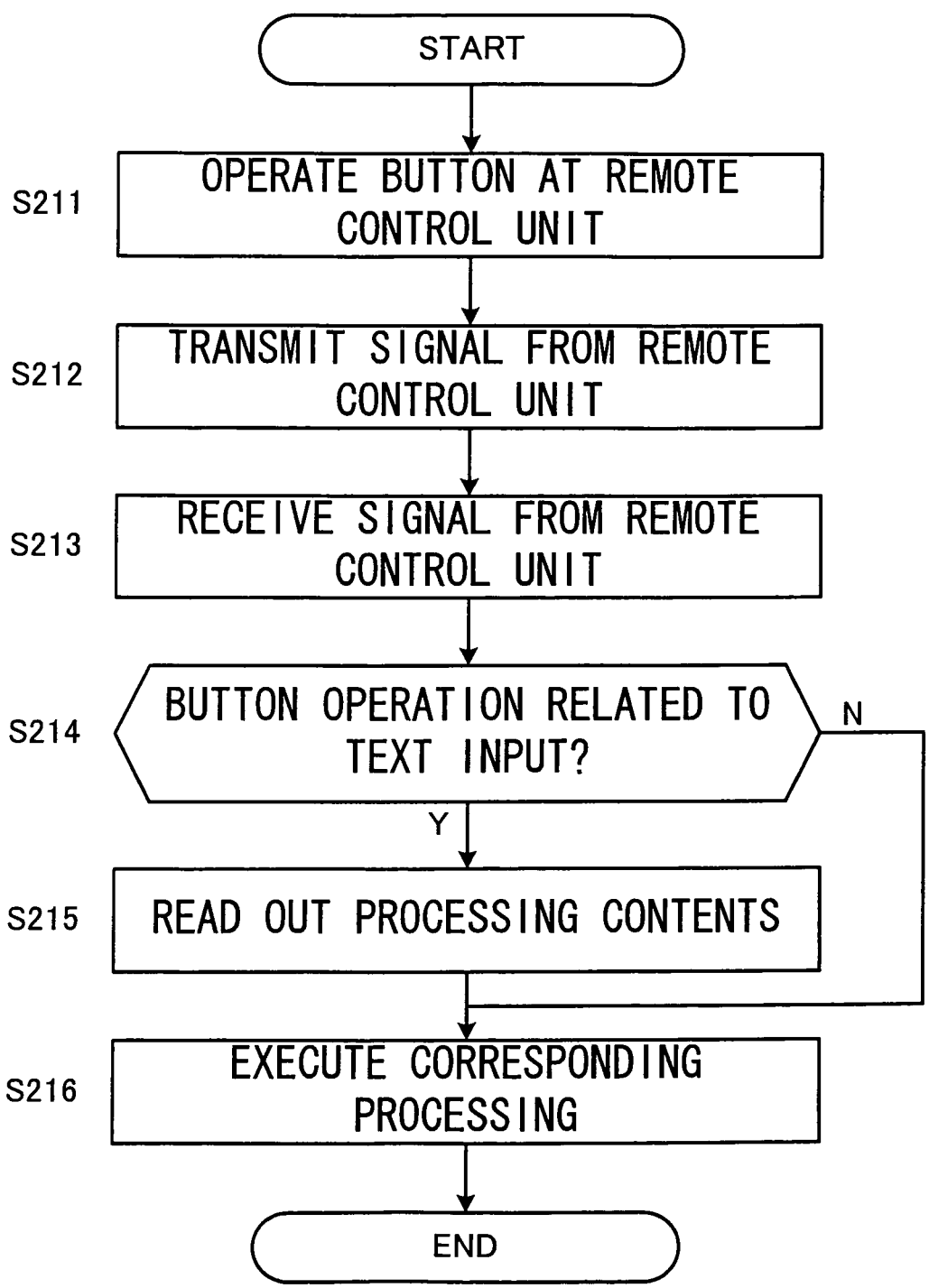

The operations at the remote control unit 300 and the operations executed in the image reproducing apparatus 100 when inputting text via the remote control unit 300 after registering the portable telephone model name are now explained in reference to the flowchart presented in FIG. 18.

As a button at the remote control unit 300 is operated (step S211), the remote control unit 300 transmits a code corresponding to the operated button to the image reproducing apparatus 100 in the form of, for instance, an infrared signal (step S212). The image reproducing apparatus 100 receives the code signal originating from the remote control unit 300 via its infrared transmission/reception unit 110 (step S213).

In step S214, a decision is made as to whether or not the code signal having been received relates to text input. If the received signal is a signal related to text input, i.e., if a numeric key 305 has been operated or an operation button 309 has been operated after operating a numeric key 305, the operation proceeds to step S215. In step S215, the registered portable telephone model name is referenced and the processing content corresponding to the received code signal are read out from the memory in the control unit 101. In the following step S216, the processing with the content having been read out in step S215 is executed. If, on the other hand, it is decided in step S214 that the received signal is not related to text input, the operation proceeds to step S216 to execute regular processing corresponding to the code signal. The current processing session then ends.

It is to be noted that the portable telephone model name registered as described above remains valid until another portable telephone model name is registered. In addition, the model name may be registered in correspondence to each user.

The user may input text via the remote control unit 300 under the following circumstances.

To set the album title for an album in which images are to be saved.

To add information such as the title, comments, a keyword, a specific date and the like to an image file.

To enter a username and a password to be used for user authentication.

Miscellaneous (various setting selections)

FIG. 19 presents an example of a screen in which a title, comments and a keyword for an image file may be input. While the input screen in FIG. 19 is up on display, the user operates the remote control unit 300 to enter appropriate text in each field. It is to be noted that the keyword attached to the image file is used when, for instance, searching for the image file.

In this example, specific button operations corresponding to each portable telephone model are stored in advance in the image reproducing apparatus 100 and the processing corresponding to a button operation for the registered portable telephone model is executed. However, the present invention is not limited to this example and a database correlating portable telephone models with their button operations may be saved in, for instance, a server on the network and the corresponding information may be taken in from the database once a specific portable telephone model name is registered.

In addition, the processing described above may be executed in a system other than that shown in FIG. 1. For instance, a portable telephone model name may be registered in the systems and apparatuses shown in FIGS. 12~14 to allow text to be input as at the portable telephone, as long as the text is input through remote control operation.

It is to be noted that the user inputs text or operates the image reproducing system via the remote control unit 300 while viewing the screen brought up on display at the monitor of the television image receiver 200 in the embodiment described above. However, the present invention is not limited to this example and it may be adopted in conjunction with a remote control unit 300 having mounted thereat a small liquid crystal display unit. In such a case, the user is able to input text while verifying the input content at the remote control unit 300 in his hand.

In addition, the operational commands for the image reproducing system may be altered in correspondence to a registered portable telephone model by storing the functions corresponding to the button operations of various types of portable telephones in the remote control unit 300. In such a case, the user may input text by verifying the individual post-conversion characters on the display at the remote control unit 300.

As described above, a specific image file is selected by operating the remote control unit 300 after an album selection screen such as that shown in FIG. 9 is brought up on display in the image reproducing system achieved in the embodiment. However, if a plurality of image files to be transferred or copied into another album need to be individually selected one at a time via the remote control unit 300, the operability is compromised. Accordingly, the present invention enables batch processing of a plurality of images to be transferred or copied from one album to another. The following is an explanation of the processing executed when copying images into another album.

Figure 20:
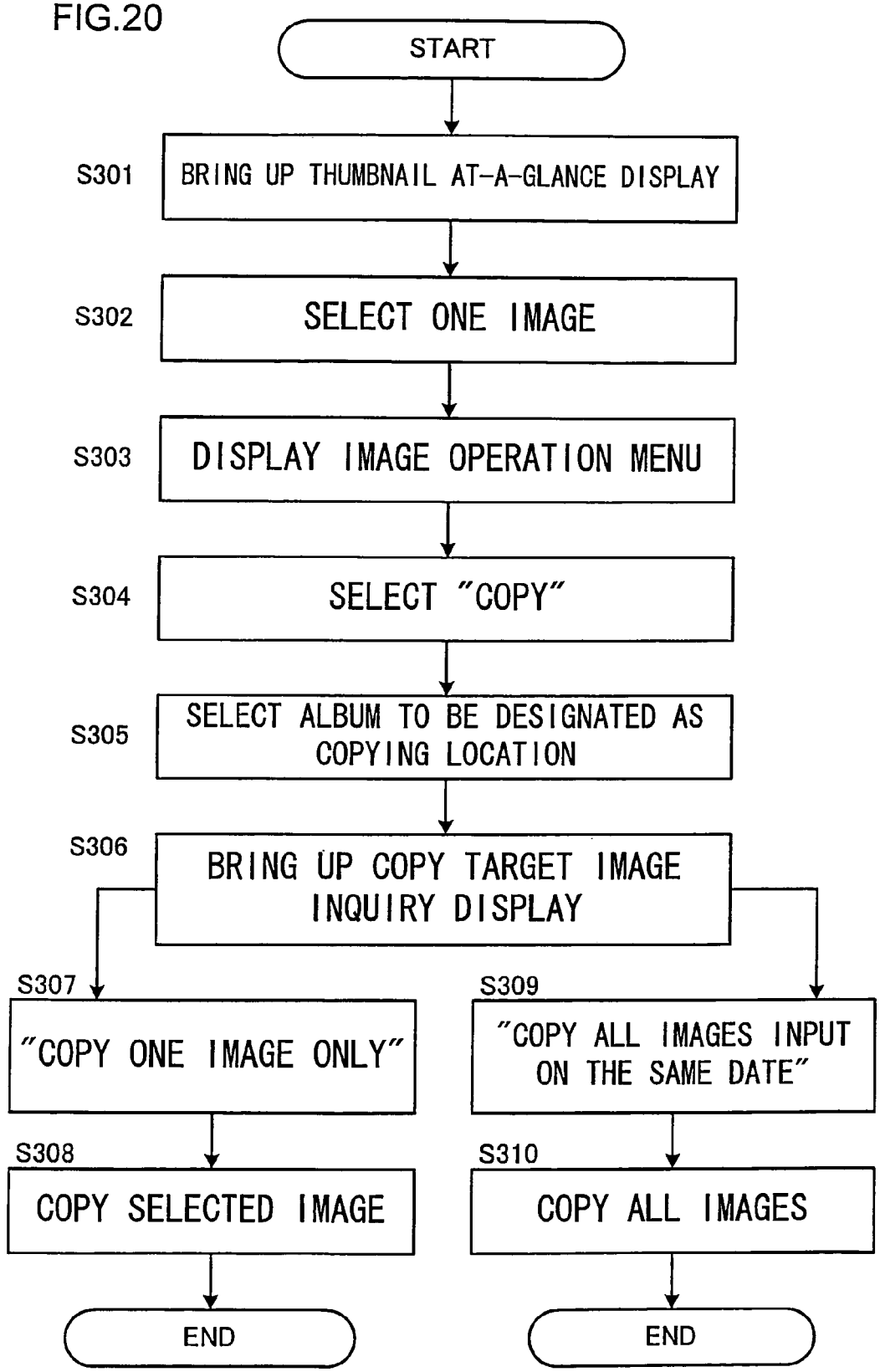

FIG. 20 presents a flowchart of the operational procedure for copying images from one album to another. First, an album is selected in the album selection screen shown in FIG. 9 and the images in the selected album are displayed at the monitor of the television image receiver 200 in the thumbnail at-a-glance display mode, as shown in FIG. 21(a) (step S301). The user then operates an operation button 309 at the remote control unit 300 to select a single image to be copied from the plurality of images displayed as thumbnails (step S302). FIG. 21(a) indicates an image I1 in the bold-line frame as the selected image.

As the selected image is confirmed by operating an operation button 309 at the remote control unit 300, an image operation menu such as that shown in FIG. 21(b) is brought up as a pop-up display in step S303. In the image operation menu, processing options "Copy", "Transfer" and "Delete" for the selected image are displayed. As the user selects the option "Copy" and confirms his selection by operating the operation button 309 at the remote control unit 300 (step S304), the operation proceeds to step S305 to display an album selection screen such as that shown in FIG. 21(c). The user then selects a specific album as a copying location by operating the remote control unit 300. FIG. 21(c) indicates an album A1 in the bold-line frame as the selected album. It is to be noted that instead of selecting an existing album, a new album to be designated as the copying location may be created.

After the album designated as the copying location is confirmed by operating an operation button 309 at the remote control unit 300, an inquiry screen with regard to the copy target image, such as that shown in FIG. 22(a) is brought up on display in step S306. The inquiry screen provides the user with options "Copy Selected Image Only" and "Copy All Images Input on the Same Date". Under these messages, the image I1 having been selected in step S302 and images I2 and I3 having been input on the same date are displayed as thumbnails. It is to be noted that the user is able to bring up more images input on the same date, which are not currently on display in the inquiry screen, by operating an arrow key K1 displayed next to the images via the remote control unit 300.

If the user selects and confirms the option "Copy Selected Image Only" by operating the remote control unit 300 (step S307), the operation proceeds to step S308 to copy the image I1 having been selected in step S302 into the album having been selected as the copying location. If, on the other hand, the user selects and confirms the option "Copy All Images Input on the Same Date" by operating the remote control unit 300 (step S309), the operation proceeds to step S310 to copy all the images having been input to the image reproducing apparatus 100 on the same date as the date when the image I1 having been selected in step S302 was input, into the album selected as the copying location. The current processing session then ends.

The term "input date" in this context refers to the date on which the image data were taken into the image reproducing apparatus 100 from the digital camera, medium or the like. Images photographed in a single event such as an athletic meet, a trip or the like are likely to be taken into the image reproducing apparatus 100 at the same time after the event ends. For instance, images photographed on a trip to Hawaii are likely to be recorded into the image reproducing apparatus 100 all at once upon returning home, resulting in all the images from the trip to Hawaii taken into the image reproducing apparatus 100 being appended with input date data indicating the same date.

Accordingly, after all the images from the Hawaii trip are taken into the image reproducing apparatus 100, all the images photographed on the trip can be copied in a batch into an album entitled "Hawaii trip" without having to select the individual images from the trip one at a time, by executing the processing described above.

It is to be noted that images having been input on the same date as the selected image are automatically extracted and that the selected image and the images having been input on the same date are designated as a copy target in the example described above. However, copy target images may each be extracted based upon a condition other than the input date. Alternative extraction conditions include the following.

Image photographing date
Location information (e.g., GPS information) indicating the location where the image was photographed
Information (e.g., the camera model name) related to the camera with which the image was photographed
Image size The location information can be an effective extraction condition for extracting, for instance, images photographed on a single trip. By setting the image size as an extraction condition, images having been processed for e-mail transmission or for uploading to a web server, which were photographed with a single camera or were initially selected for their high quality, can be extracted. Images may be selected based upon any of the conditions listed above or images may be selected by using a combination of these conditions as extraction criteria. As images to undergo processing are extracted in conformance to a specific condition having been set as described above, the need for individually selecting the processing target images one at a time by operating the remote control unit 300 is eliminated to assure better operability.

Images may be searched by setting a more flexible image extraction condition. For instance, images having been taken into the image reproducing apparatus 100 during a 72-hour period, the 24 hours preceding the input date on which the selected image was input and the 24 hours following the selected image input date, may be extracted as processing target images.

In addition, while the processing executed when copying images from one album to another has been explained above, images may be transferred into another album or images may be deleted through similar processing. For instance, the selected image and all the images input on the same date as the selected image can be transferred into another album or they may all be deleted in a batch. In addition, the processing can be adopted when selecting images to be displayed in a slideshow.

It is to be noted that if there are more images than can be contained in the inquiry screen brought up on display in step S306 in the flowchart presented in FIG. 20 prompting the user to choose to either "Copy Selected Image Only" or "Copy All Images Input on the Same Date", the inquiry screen may include an inquiry asking the user whether or not to copy the images currently on display alone. FIG. 22(*b*) presents another example of a copy target image inquiry screen. This inquiry screen is brought up as a pop-up display over the album selection screen shown in FIG. 21(*c*).

As shown in FIG. 22(*b*), inquiry messages "Copy Selected Image Only", "Copy All Images Input on the Same Date" and "Copy Only Images Currently on Display Input on the Same Date" are displayed in the inquiry screen. Under these messages, the selected image I1 and two images I2 and I3 having been input on the same date as the image I1 are displayed as thumbnails.

If the user selects and confirms the option "Copy Only Images Currently on Display Input on the Same Date", the three images I1~I3 are copied into the album having been selected as the copying location. After the images I1~I3 are copied, thumbnails of the images having been input on the same date, other than the images I1~I3, are brought up on display together with an inquiry "Continue With Processing?". Thus, the user is able to copy images satisfying the same condition as the selected image in a batch while verifying the specific images being copied.

The batch copy/transfer processing through which a plurality of images are copied/transferred in a batch as described above may be executed when image data are taken into the image reproducing apparatus 100 from a digital camera or a medium as well.

For instance, as thumbnails of images recorded in a digital camera or a medium are displayed at the monitor of the television image receiver 200 and the user selects a specific image, an inquiry as to whether or not images photographed on the same date as the selected image, too, should be stored into the image reproducing apparatus 100 may be issued.

As explained earlier, the images having been selected by the user are displayed one at a time in an enlarged display or in a slideshow display in the image reproducing system achieved in the embodiment. However, if images having been recently viewed and are still fresh in the user's memory are brought upon display again, the user may find the images boring. Accordingly, the image reproducing apparatus 100 automatically extracts and displays images that have not been viewed for a while since the last display through the following processing.

Namely, the specific type of processing executed on a given image read out from the storage unit 101*b* where it is saved, is determined and a weighting count value is calculated in correspondence to the contents of the processing executed on the image. Then, based upon the count values thus calculated, images that have not been viewed for a while are extracted. The following is an explanation of the method adopted when calculating the count values for the individual images, given in reference to the flowchart presented in FIG. 23. The processing is executed for each of the images saved in the storage unit 101*b*. The following explanation is given on an example in which the count value for an image I1 is calculated.

First, in step S401, a counter value IMn for the image I1 is set to 0 for initialization. In step S402, a decision is made as to whether or not the image I1 has been selected. If the image I1 has not been selected, the processing in step S402 is repeatedly executed. If, on the other hand, the image I1 has been selected, the operation proceeds to step S403. In step S403, a count value Cn corresponding to the contents of the processing executed on the selected image I1 having been read out from the storage unit 101*b*, is calculated.

The processing that the selected image may undergo includes, for instance, the following.

Displayed in an enlarged single image display
Displayed as a thumbnail in a thumbnail at-a-glance display
Displayed in a slideshow
Printed If the selected image I1 has been displayed in an enlarged single image display at the monitor of the television image receiver 200 as shown in FIG. 24(*a*), the count value Cn is set to c1 (e.g., c1=1.0). At this time, the length of time that the image I1 has been up on display in an enlarged display is measured and if, for instance, the length of display time is equal to or less than 10 seconds, the count value Cn is set to c1 but the count value Cn is increased once the length of display time exceeds 10 seconds. For instance, the count value Cn may be set in proportion to the length of display time over which the image I1 stays up in the enlarged display, and when the length of display time reaches 20 seconds, the count value Cn may be set to 2×c1. In addition, if the image I1 was photographed far back in the past, e.g., if the image was photographed one year or more in the past, the count value Cn may be set to 0.8×c1. It is to be noted that if the image I1 has been up on display many times, the user can be assumed to remember the image I1 more vividly. Accordingly, the count value Cn may be increased in correspondence to the number of times the image I1 has been displayed. For instance, the count value Cn may be multiplied by 1.5 if the number of times the image I1 has been displayed exceeds 10 and the count value Cn may be multiplied by 2 when the number of times the image has been displayed exceeds 20.

If the image I1 has been displayed as a thumbnail in a thumbnail at-a-glance display, the count value Cn is set to c2 (<c1, e.g., c2=0.1).

If the image I1 has been displayed by itself as shown in FIG. 24(b) in a slideshow, the count value Cn is set to c3 (e.g., c3=1.0). If, on the other hand, it has been displayed as one of a plurality (n) of images in a single screen as shown in FIG. 24(c), the count value Cn for the image I1 is set to a value smaller than c3. For instance, Cn may be set to c3/n. In addition, if the slideshow has been paused while the image I1 was on display, the count value Cn is increased. For instance, Cn may be set to 1.5×c3 in such a case.

If the image I1 has been printed out by itself, the count value Cn is set to c4 (e.g., c4=5.0). If, on the other hand, an album containing the image I1 has been selected to undergo index sheet print processing for printing out a plurality of images contained in the album onto a single page, the count value Cn for the image I1 is set to c5 (<c4, e.g., c5=0.5).

In the following step S404, the counter value IMn for the image I1 is set by using the count value Cn having been calculated in step S403. Namely, the counter value IMn is set by adding the count value Cn to the previous counter value IMn for the image I1 (IMn←IMn+Cn).

The counter calculation processing described above is executed for each of the images stored in the storage unit 101b. Then, images with small counter values IMn among the plurality of images stored in the storage unit 101b are extracted as "Infrequently Viewed Images". In this case, images with their counter values IMn indicating values smaller than a predetermined value may be extracted as "Infrequently Viewed Images" or a predetermined number of images with their counter values IMn indicating the smallest values may be extracted. By calculating the counter value IMn for each image, the extent of user involvement with the image can be ascertained and accordingly, images that can be assumed to interest the user as detailed later can be extracted.

Figure 25:
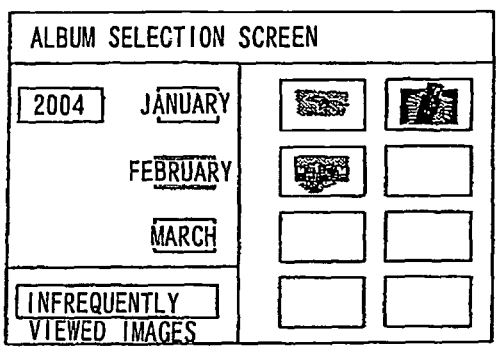

FIG. 25 presents an example of an album selection screen. In the display example presented in FIG. 25, an "infrequently viewed image" album is displayed under the list of album titles each corresponding to a specific month in the album selection screen. It is to be noted that the "February 2004" album has been selected and the images contained in the "February 2004" album are displayed in the thumbnail at-a-glance display in the example in FIG. 25.

The "Infrequently Viewed Images" are displayed by selecting the "infrequently viewed image" album in the album selection screen such as that shown in FIG. 25 via an operation button 309 at the remote control unit 300. After selecting the "Infrequently Viewed Images" album, the user issues a slideshow start instruction by, for instance, operating the slideshow button 304 at the remote control unit 300 to start a slideshow display of the images having been extracted as the "Infrequently Viewed Images".

Figure 26:
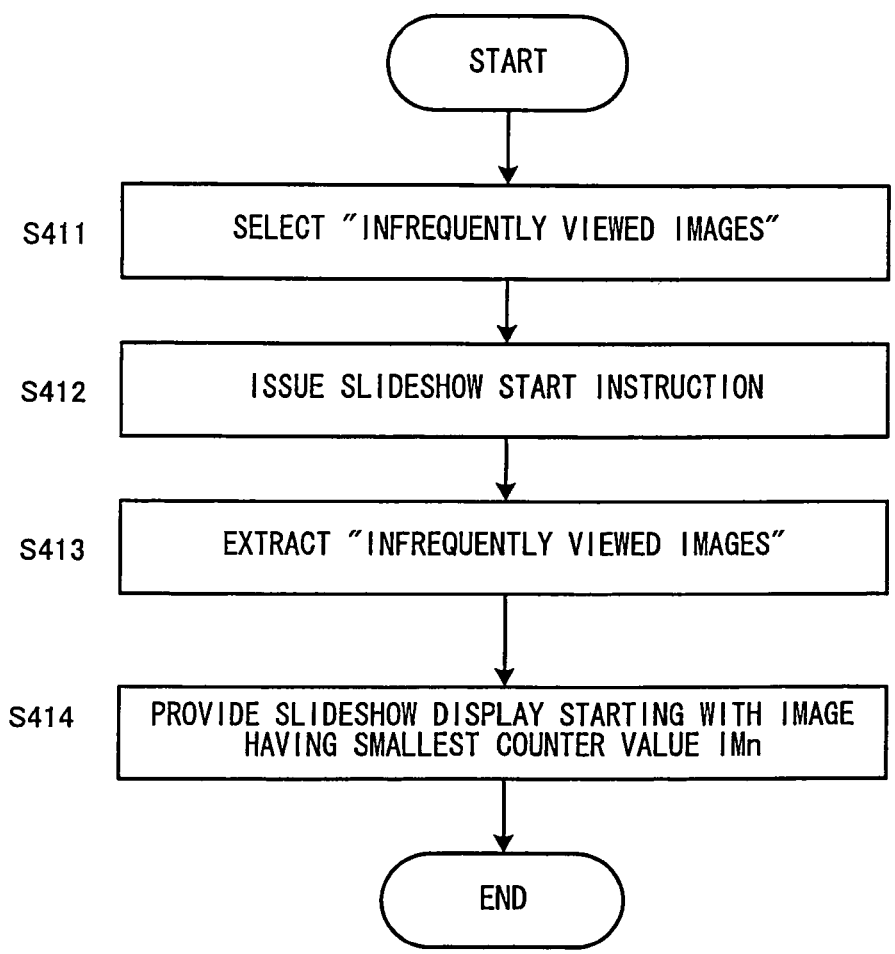
Figure 27:
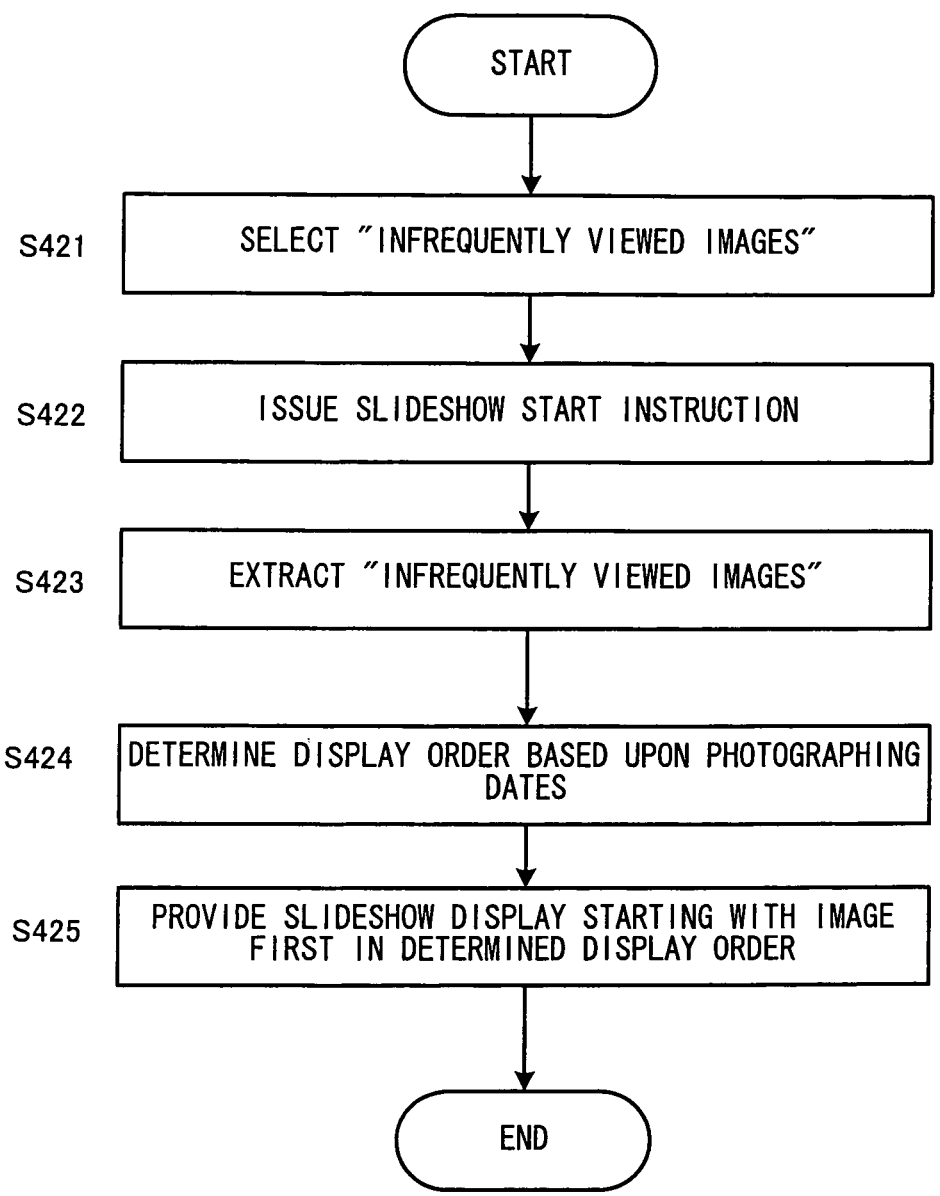

The operational procedure for bringing up a slideshow display of the "Infrequently Viewed Images" is now explained in reference to the flowchart presented in FIG. 26.

In step S411, the "Infrequently Viewed Images" album is selected in the album selection screen such as that shown in FIG. 25. In step S412, the option "Slideshow" is selected by operating the slideshow button 304 at the remote control unit 300 or in the main menu screen shown in FIG. 5. In step S413, "Infrequently Viewed Images" are extracted based upon the counter value IMn having been calculated for the individual images through the processing explained in reference to FIG. 23. For instance, 10 images with their counter values IMn indicating the smallest values may be extracted.

In step S414, the plurality of images having been extracted in step S413 are displayed in a slideshow starting with the image with its counter value IMn indicating the smallest value. Once all the images having been extracted as the "Infrequently Viewed Images" are displayed in a slideshow, the current slideshow ends. Thus, a plurality of images assumed to interest the user can be automatically extracted based upon their counter values IMn and displayed in a slideshow.

It is to be noted that the images in the "Infrequently Viewed Images" album displayed in a slideshow may be brought up on display starting with the image with its counter value IMn indicating the greatest value, or they may be brought up on display in a random order regardless of their counters IMn. Alternatively, the display order for the slideshow may be determined by taking into consideration the photographing dates on which the individual images were photographed. This processing is now explained in reference to the flowchart presented in FIG. 27.

After the "Infrequently Viewed Images" album is selected in the album selection screen shown in FIG. 25 (step S421) and a slideshow start instruction is issued (step S422), 10 images with their counter values IMn indicating the smallest values, for instance, are extracted in step S423 as "Infrequently Viewed Images" based upon the counter values IMn having been calculated for the individual images.

In step S424, the slideshow display order is determined based upon the photographing dates on which the images having been extracted in step S423 were photographed. For instance, the display order is set so as to bring up the images in chronological order, starting with the oldest image. In step S425, a slideshow display of the "Infrequently Viewed Images" is executed in the display order determined in step S424.

While an explanation is given above on an example in which 10 images are extracted as the "Infrequently Viewed Images", the present invention is not limited to this example. The number of images to be extracted through this processing may match the number of images saved in the storage unit 101b or the number of images to be extracted may be set freely by the user. In addition, the layout size for the images to be displayed in the "Infrequently Viewed Images" slideshow may be separately specified. A specific setting may be selected so that an image that has not been displayed for a longer time, an older image or an image with its counter value IMn indicating a smaller value is displayed in a larger display size. The length of time over which each image is to stay up on display during the slideshow can be set much in the same way as the display time length setting for a regular album slideshow. Alternatively, a specific setting may be selected so that an image that has not been displayed for a longer time, an older image or an image with its counter value IMn indicating a smaller value is displayed for a longer time.

For the "Infrequently Viewed Images" slideshow, too, settings for displaying the photographic information such as the image photographing date and the file name of each image, for a specific image changeover effect and for a specific BGM effect can be set as explained earlier.

It is to be noted that the display order may be determined in step S424 based upon the most recent image viewing date. For instance, the display order may be determined so that the image with the oldest date recorded as its most recent display date, i.e., the image that was viewed the longest time ago, is viewed first. In addition, the counter value IMn may be set in correspondence to each image by taking into consideration the most recent viewing date. For instance, the counter value IMn may be gradually reduced as a number of days having elapsed since the most recent viewing of the corresponding image increases. In this case, an image that has not been viewed for a longer period of time will have a smaller counter value IMn.

Figure 28:
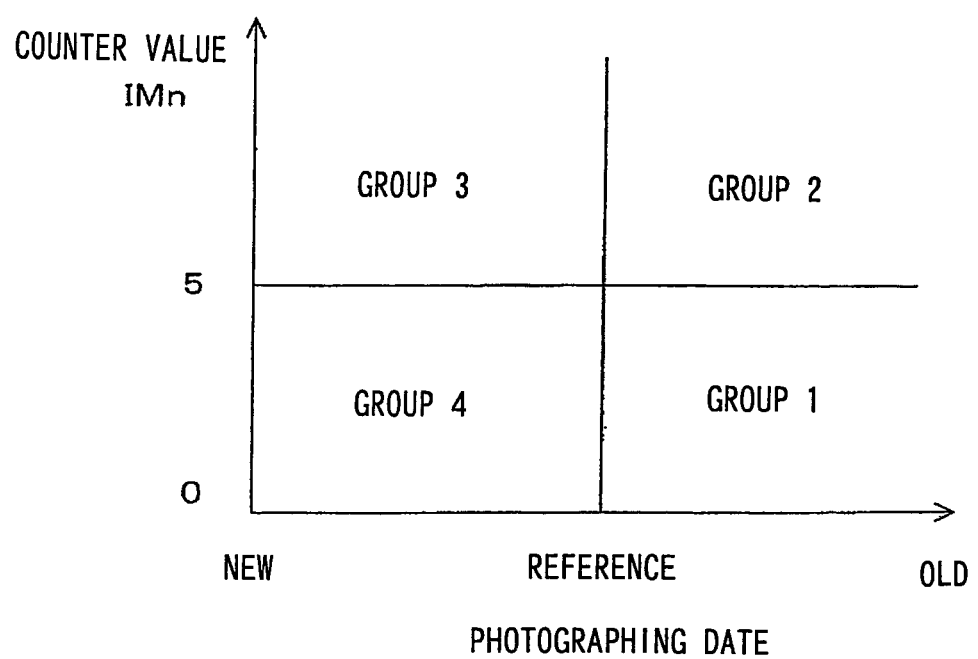
Figure 29:
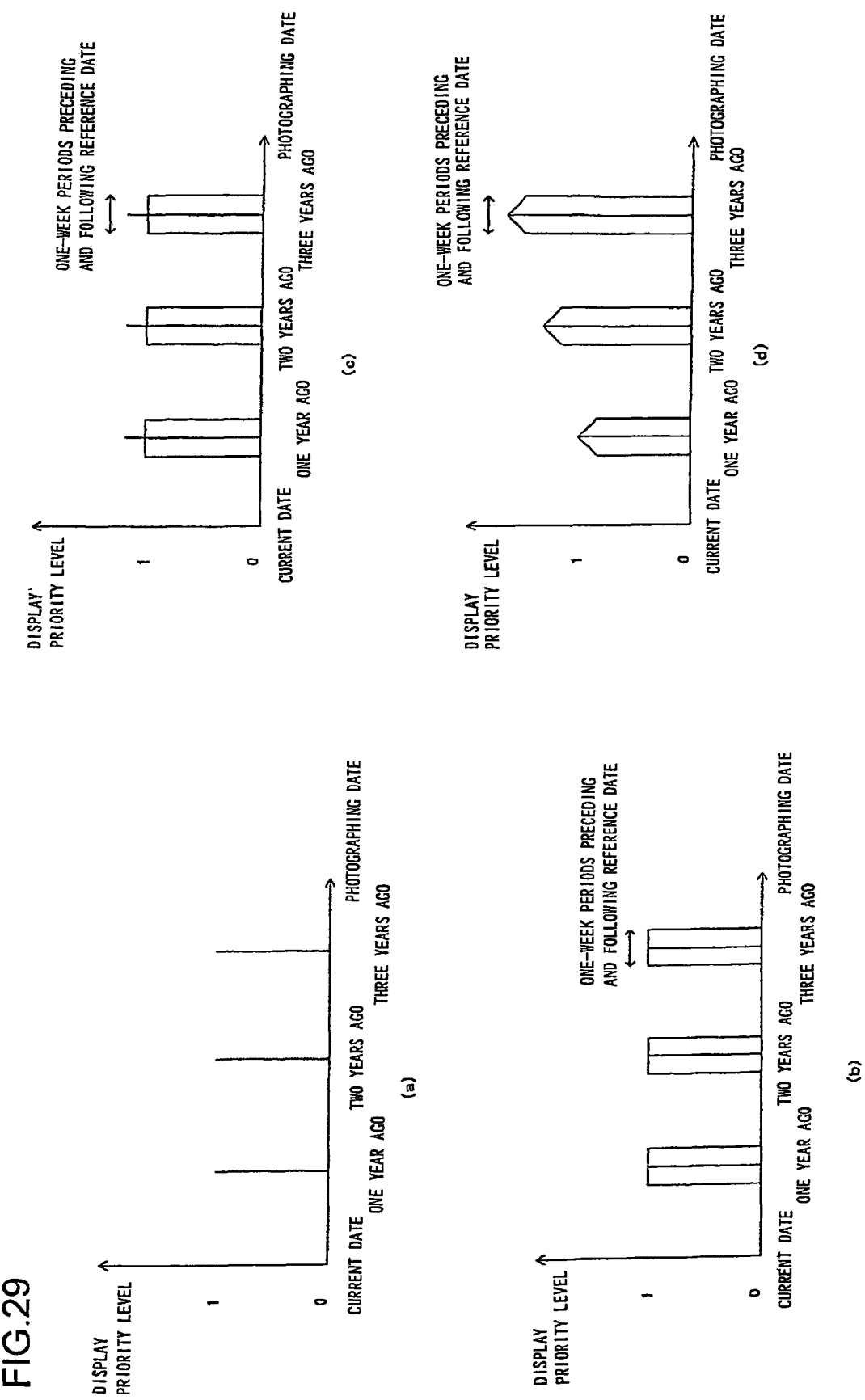

The following is an explanation of another example of a method that may be adopted when extracting images to be displayed in a slide show of "Infrequently Viewed Images". The images are extracted based upon the counter values IMn calculated for the individual images and the photographing dates on which the images were photographed. FIG. 28 shows the relationship between the image photographing date and the counter value IMn. The images saved in the storage unit 101b are divided into four groups as shown in FIG. 28.

Group 1 includes images, each photographed a fairly long time in the past with the photographing date older than a reference value, e.g., images photographed more than a few years ago, and each having a counter value IMn indicating a value smaller than a predetermined value IMn1, e.g. 5. Group 2 is made up of images with photographing dates older than the reference value and counter values IMn indicating values greater than the predetermined value IMn. Group 3 includes images with photographing dates newer than the reference value and counter values IMn indicating values greater than the predetermined value IMn1. Group 4 is made up of images with photographing dates newer than the reference value and counter values IMn indicating values smaller than the predetermined value IMn1.

The images classified into group 1, which have not been read out for display or print out frequently and also have older photographing dates, can be judged to be images that are not fresh in the user's memory. Accordingly, as a slideshow start instruction is output, the images classified into group 1 are extracted as the "Infrequently Viewed Images" for a slideshow display. The slideshow thus brought up on display in which display priority is given to images that have not been viewed by the user for a while and are not likely to be fresh in the user's memory is likely to pique the user's interest.

The display order in which the individual images are displayed during the slideshow may be set in correspondence to the counters IMn, the photographing dates or the like, as explained earlier, or a setting for displaying the images in a random order may be selected. Upon ending the slideshow display of the images classified into group 1, the other images may also be displayed in slideshows in the order of group 2, group 4 and group 3 or in the order of group 4, group 2 and group 3. In short, the display priority order for a slideshow display can be set based upon the image photographing dates and the counters IMn.

Alternatively, the most recent image display dates, instead of the photographing date may be indicated along the horizontal axis in FIG. 28 so as to extract the "Infrequently Viewed Images" and determine the display priority order based upon the relationship between the most recent display date and the counter value IMn.

The images in group 3 with newer photographing dates or their most recent display dates indicating newer dates and with counter values IMn indicating large values, can be assumed to have been displayed, printed out and the like multiple times. In other words, they can be judged to be images having inspired a good deal of user involvement. Accordingly, the images classified into group 3 may be extracted as user's "Favorite Images". For instance, an option "Favorite Images" album may be added in the album selection screen and FIG. 25. In such a case, as the "Favorite Images" album is selected through an operation of the remote control unit 300 or the like and a slideshow start instruction is output, a slideshow of the images classified into group 3, having been extracted as the "Favorite Images" starts in this case.

It is to be noted that "Infrequently Viewed Images" or "Favorite Images" may be extracted based upon the counter values IMn and the photographing dates when the option "Infrequently Viewed Images" album or the option "Favorite Images" album is selected in the album selection screen shown in FIG. 25. In this case, the images extracted by selecting the "Infrequently Viewed Images" or the "Favorite Images" are read out for the thumbnail at-a-glance display.

It is to be noted that a specific count value Cn is set in correspondence to each type of processing that an image may undergo, such as enlarged single image display processing and print processing.

The count value Cn may assume various fixed default values set at the time of shipment or the image reproducing system may adopt a structure that allows individual users to set desirable values for the count value Cn freely.

In the image reproducing system achieved in the embodiment described above, an image selected by the user is brought up on display in an enlarged single image display or images selected by the user are displayed in a slideshow. In the embodiment to be explained next, the image reproducing apparatus 100 automatically selects and displays images likely to interest the user.

More specifically, past reference dates are set over predetermined cycles relative to the current date set as the start point and a display priority level is set for each of the images stored in the storage unit 101b based upon the time difference between the current date and the image photographing date in reference to a past reference date. Then, a plurality of images selected based upon their display priority levels are displayed in a slideshow. Methods that may be adopted when setting display priority levels are explained below.

A: Set a higher display priority level for an image photographed on exactly the same date as the current date in the past (e.g., exactly one year ago, exactly two years ago, exactly three years ago, etc.)

FIG. 29(a) shows the relationship between the image photographing date and the display priority level. As shown in FIG. 29(a), the display priority levels of images photographed on exactly the same date as the current date one year ago, two years ago, three years ago and the like are all set to 1. The display priority levels of the images photographed on any other dates are all set to 0.

It is to be noted that in this example, the past reference dates are set over 1-year cycles. In other words, one year ago today, two years ago today, three years ago today, . . . are each equivalent to a past reference date.

B: Set a higher display priority level for an image photographed on exactly the same date as the current date in the past (e.g., exactly one year ago, exactly two years ago, exactly three years ago, etc.) or photographed during a week preceding or succeeding the date in the past.

FIG. 29(b) indicates the relationship between the image photographing date and the display priority level. As shown in FIG. 29(b), the display priority levels for images photographed on exactly the same date as the current date, and during a one-week period preceding the date and a one-week period succeeding the date one year ago, two years ago and three years ago are all set to 1. The display priority levels of the images photographed on any other dates are all set to 0.

C: Set the highest display priority for an image photographed on exactly the same date as the current state in the past, (e.g., exactly one year ago, exactly two years ago, exactly three years ago, etc.) and set a lower display priority for an image photographed during a one-week period preceding or succeeding the date.

FIG. 29(c) indicates the relationship between the image photographing dates and the display priority level. As shown in FIG. 29(c), the display priority levels of images photographed on exactly the same date as the current date one year ago, two years ago, three years ago and the like are all set to, for instance, 1.2. In addition, the display priority levels for images photographed during a one-week period preceding and a one-week period succeeding the same date as the current date in the past are all set to, for instance, 1. The display priority levels of the images photographed on any other dates are all set to 0. The display priority level P1 of an image photographed on the same date as the current date in the past and the display priority level P2 of an image photographed during a one-week period preceding or succeeding the date have a relationship expressed as P1>P2.

D: Set a highest display priority level for an image photographed on exactly the same date as the current date in the past (e.g., exactly one year ago, exactly two years ago, exactly three years ago or the like) and gradually lower the display priority level for images photographed during one-week periods preceding and succeeding the date.

FIG. 29(d) indicates the relationship between the image photographing date and the display priority level. As FIG. 29(d) shows, higher display priority levels are set for older images among images photographed on exactly the same date as the current date one year ago, two years ago, three years ago and the like. In addition, lower display priority levels are set for images photographed on dates set apart from the same date as the current date by a greater extent among images photographed during the one-week periods preceding and succeeding the same date as the current date in the past. The display priority levels of the images photographed on any other dates are all set to 0.

It is to be noted that instead of setting display priority levels for the images photographed on exactly the same date as the current date and the images photographed during specific periods preceding and succeeding the date, display priority levels may be set for images photographed during a specific period in the past following exactly the same date as the current date. In this case, a higher display priority level may be set for an image photographed on a date in the past closer to the same date as the current date. In addition, when setting display priority levels as shown in FIGS. 29(a)~29(c), higher display priority levels or lower display priority levels may be set for older images. While the past reference dates are set over one-year cycles relative to the current date in the explanation provided above, the present invention is not limited to this example and the past reference dates may be set over two-year cycles or one-month cycles, instead. In addition, the specific periods preceding and succeeding exactly the same date in the past as the current date are one-week periods in the explanation provided above, they may be three-day periods preceding and succeeding the date, 10-day periods preceding and succeeding the date or the like.

Figure 30:
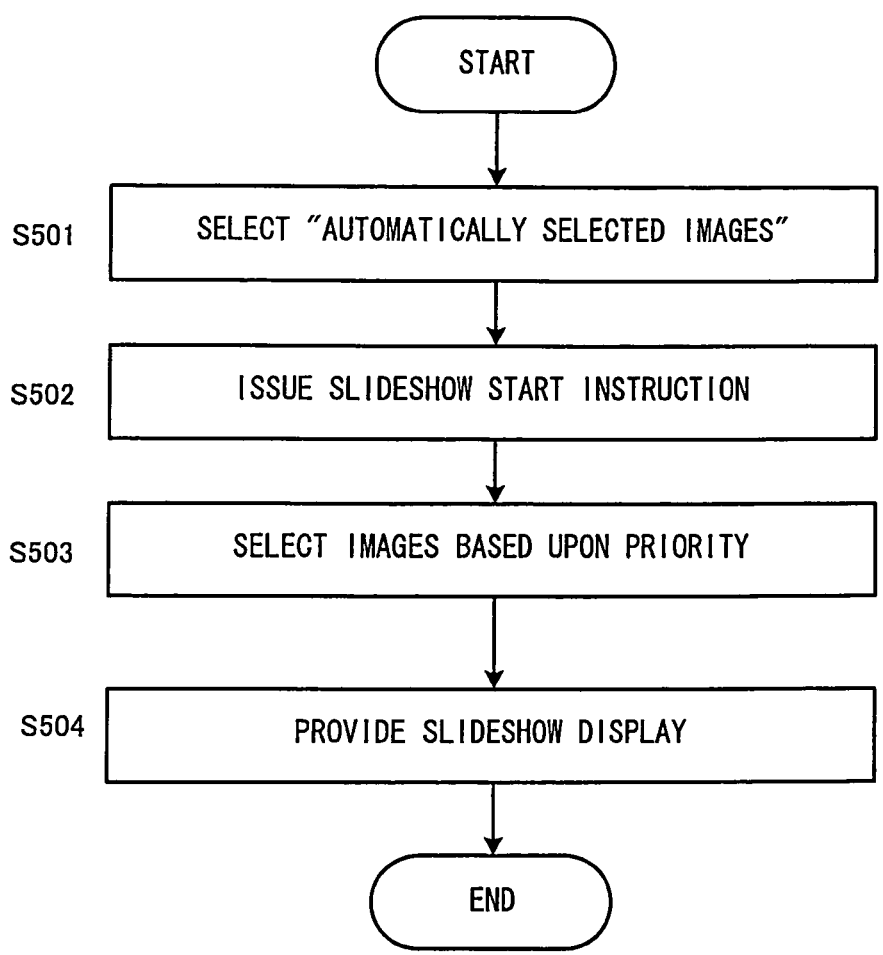

The operation executed when displaying images, selected based upon the display priority levels set as described above, in a slideshow is explained in reference to the flowchart presented in FIG. 30. FIG. 30 presents a flowchart of the processing procedure executed by the CPU 101a based upon an image reproducing program.

Figure 31:
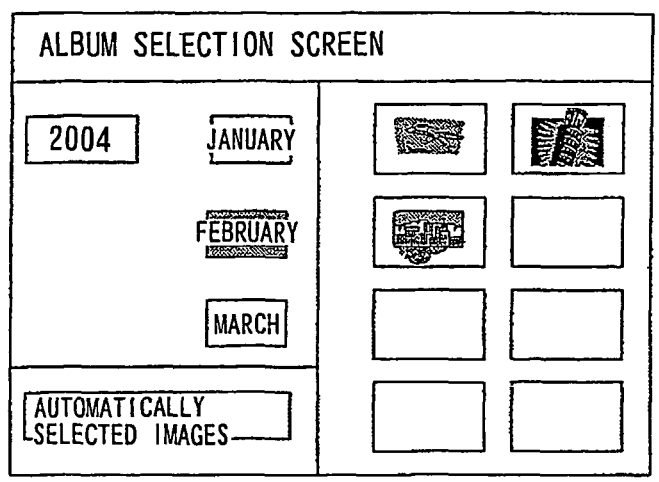

First, in step S501, the user selects an option "Automatically Selected Images" displayed toward the bottom of an album selection screen such as that shown in FIG. 31 by operating in operation button 309 at the remote control unit 300. After the option "Automatically Selected Images" is selected, a slideshow start construction is issued by operating the slideshow button 304 at the remote control unit 300 in step S502. It is to be noted that the slideshow start instruction may be issued in the main menu screen in FIG. 5 instead.

In step S503, images are selected from those stored in the storage unit 101b based upon the display priority levels set for the individual images by adopting any of the methods explained earlier. More specifically, images with their display priority levels higher than 0 are selected. Namely, a plurality of images substantially corresponding to past reference dates, set over predetermined cycles relative to the current date set as the start point, are selected. In step S504, the images are displayed in a slideshow, starting with the image with the highest priority level, based upon the results of the selection made in step S503. Images with their display priority levels set to 0 are not displayed in the slideshow. It is to be noted that if there are a plurality of images with their display priority levels indicating values equal to one another, they should be brought up on display in a specific order, by starting with the image photographed the longest time ago or photographed most recently. Alternatively, the images with their display priority levels indicating values equal to one another may be displayed in a random order.

As described above, display priority levels are set for individual images based upon past reference dates set relative to the current date designated as the start point and a plurality of images are selected based upon their display priority levels to be displayed in a slideshow. As a result, images likely to pique the interest of the user are automatically selected and displayed in the slideshow. Alternatively, a slideshow display may be started by automatically selecting images based upon the current date as the user turns on the power to the image storage apparatus 100.

FIG. 32(a) presents an example of a display screen that may be up while a slideshow is in progress. FIG. 32(a) shows an example of a slideshow display in which each image is brought up on display as an enlarged display at the monitor of the television image receiver 200. In this example, the image photographing date is displayed together with the image. Alternatively, text information indicating exactly how many years ago from the current date the image was photographed may be displayed together with the image photographing date, as shown in FIG. 32(b). In the example presented in FIG. 32(b), text information "photographed two years ago today" is displayed. In addition, for the slideshow, settings for displaying the file name of and the photographic information on each image for a specific image changeover effect and for a specific BGM effect can be selected as explained earlier.

The number of images displayed in this slideshow may be the same as the number of images brought up on display in a slideshow of an album selected by the user. Alternatively, the number of images to be displayed in the "Automatically Selected Images" slideshow may be set specially. In addition, special image layout and image size settings may be selected for the "Automatically Selected Images" slideshow. A specific setting may be selected so as to display an image that has not been displayed over a longer period of time, an image with an older photographing date or an image with a higher display priority in a greater display size. The length of time over which each image is to stay up on display during the slideshow can be set much in the same way as the display time length setting for a regular album slideshow. Alternatively, a specific setting may be selected so that an image with a higher display priority or an older photographing date remains up on display over a longer period of time.

It is to be noted that if the current date falls on a birthday, a wedding anniversary or the like, i.e., an anniversary for the user that occurs with a predetermined frequency, images automatically selected as described above may be displayed in a slideshow. The following is an explanation of a method that may be adopted when setting display priority levels in this application. It is to be noted that the user pre-registers an anniversary at the image storage apparatus 100 via the remote control unit 300.

A: Set a higher display priority level for an image photographed on exactly the same date as the current date in the past (e.g., exactly one year ago, exactly two years ago, exactly three years ago, etc.)

FIG. 33(a) shows the relationship between the image photographing dates and the display priority level. Assuming that the current date marks the third birthday of the user's child, the display priority levels for images photographed one year ago today, i.e., on the second birthday, photographed two years ago today, i.e., on the first birthday, and three years ago today, i.e., on the day the child was born, relative to the current date, are all set to 1. The display priority levels for images photographed prior to the birth of the child (the start point for the anniversaries) and images photographed on any other date are all set to 0.

B: Set a higher display priority level for an image photographed on the same date as the current date in the past (e.g., exactly one year ago, exactly two years ago, exactly three years ago, etc.) or photographed during a week preceding or succeeding the date in the past.

FIG. 33(b) indicates the relationship between the image photographing date and the display priority level. Assuming that the current date falls on the third birthday of the user's child, the display priority levels for images photographed one year ago today, i.e., on the second birthday, images photographed during a one-week period preceding and a one-week period succeeding the second birthday, images photographed two years ago today, i.e., on the first birthday, images photographed during a one-week period preceding and a one-week period succeeding the first birthday, images photographed three years ago today, i.e., on the day the child was born and images photographed during a one-week period preceding and a one-week period succeeding the birth are all set to 1, as shown in FIG. 33(b). The display priority levels for images photographed prior to the start of the one-week period preceding the child's birth (the start point for the anniversaries) and images photographed on any other day are all set to 0.

C: Set the highest display priority for an image photographed on exactly the same date as the current date in the past, (e.g., exactly one year ago, exactly two years ago, exactly three years ago, etc.) and set a lower display priority for an image photographed during a one-week period preceding or succeeding the date.

FIG. 33(c) indicates the relationship between the image photographing date and the display priority level. Assuming that the current date falls on the third birthday of the user's child, the display priority levels of images photographed on exactly the same date as the current date one year ago, i.e., on the second birthday, two years ago, i.e., on the first birthday, three years ago, i.e., on the day the child was born and the like are all set to, for instance, 1.2, as shown in FIG. 33(c). In addition, the display priority levels for images photographed during a one-week period preceding and a one-week period succeeding past birthdays are all set to, for instance, 1. The display priority levels for images photographed prior to the start of the one-week period preceding the child's birth (the start point for the anniversaries) and images photographed on any other day are all set to 0. The display priority level P1 of an image photographed on an anniversary date in the past and the display priority level P2 of an image photographed during the one-week period preceding or succeeding the date have a relationship expressed as P1>P2.

D: Set a highest display priority level for an image photographed on exactly the same date as the current date in the past (e.g., exactly one year ago, exactly two years ago, exactly three years ago or the like) and gradually lower the display priority level for images photographed during one-week periods preceding and succeeding the date.

FIG. 33(d) indicates the relationship between the image photographing date and the display priority level. Assuming that the current date falls on the third birthday of the user's child, higher display priority levels are set for older images among images photographed on exactly the same date as the current date one year ago, i.e., on the second birthday, two years ago, i.e., on the first birthday, three years ago, i.e., on the day the child was born and the like, as FIG. 33(d) shows. In addition, lower display priority levels are set for images photographed on dates set apart from the same date as the current date by a greater extent among images photographed during the one-week periods preceding and succeeding the same date as the birthday in the past. The display priority levels of the images photographed on any other dates are all set to 0. The display priority levels for images photographed prior to the start of the one-week period preceding the child's birth (the start point for the anniversaries) and images photographed on any other day are all set to 0.

Figure 34:
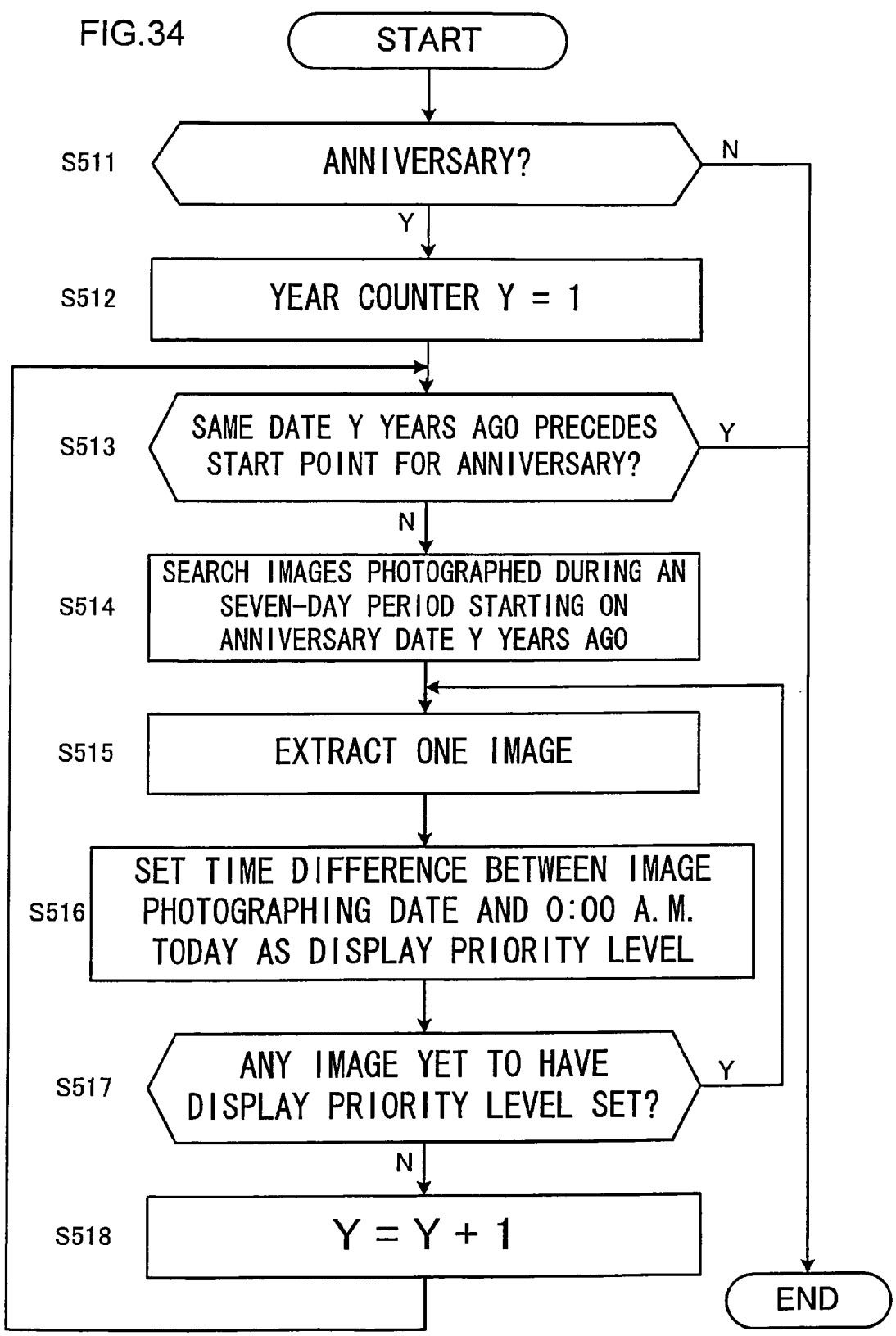

It is to be noted that instead of setting display priority levels for the images photographed on past anniversaries and the images photographed during specific periods preceding and succeeding the anniversaries, display priority levels may be set for images photographed during a specific period in the past following the date of the anniversary. In addition, while the specific periods preceding and succeeding exactly the same date in the past as the current date are one-week periods in the explanation provided above, they may be three-day periods preceding and succeeding the date, ten-day periods preceding and succeeding the date or the like. A method that may be adopted when setting display priority levels in such an application is now explained in reference to the flowchart presented in FIG. 34. FIG. 34 presents a flowchart of the processing procedure executed based upon a display priority level setting program.

In step S511, a decision is made as to whether or not the current date falls on an anniversary registered at the image reproducing apparatus 100. The anniversary may be family member's birthday, a wedding anniversary, Christmas, New Year's Day or the like, likely to be a memorable occasion for the family. If the current date does not fall on an anniversary, the processing ends. If, on the other hand, the current date falls on an anniversary, the operation proceeds to step S512.

An explanation is now given by assuming that the current date falls on the birthday of the user's child.

In step S512, "1" is set at a year counter Y. In step S513, a decision is made as to whether or not the date of Y years ago today precedes the birth date of the child. A negative decision is made in step S513 if the operation has proceeded to step S513 from step S512 and, in this case, the operation proceeds to step S514. In step S514, images photographed Y years ago today, i.e., on the child's last birthday, and images photographed within a seven day period following the last birthday are searched in the storage unit 101b. In step S515, one image is extracted from the results of the search having been executed in step S514.

In step S516, the time difference (in seconds) between numeral 0:00 a.m. on the current date and the photographing date/time of the image having been extracted in step S515 is calculated and this time difference is designated as the display priority level of the image. In other words, among the images photographed on the last birthday and during the seven-day period following the birthday, the images photographed on the last birthday have the highest display priority.

In step S517, a decision is made as to whether or not the images resulting from the search having been executed in step S514 still includes an image for which the display priority is yet to be set. If an affirmative decision is made in step S517, the operation returns to step S515 to execute the processing for setting the display priority for the image among those resulting from the search, for which the display priority level is yet to be set. If, on the other hand, a negative decision is made in step S517, the operation proceeds to step S518. In step S518, the value at the year counter Y is incremented by one. Subsequently, the operation returns to step S513 and the processing in steps S514 through S518 is repeatedly executed until the date of Y years ago today is judged to precede the birth date of the child.

A plurality of images are selected for a slideshow display (see FIG. 30) based upon the display priority levels set based upon the anniversary information registered in the image reproducing apparatus 100, as described above. When automatically selecting images to be displayed in a slideshow based upon the anniversary information, an option "anniversary images" for instance, may be added in the album selection screen such as that shown in FIG. 31. Alternatively, a slideshow display may be started by automatically selecting images based upon the current date as the user turns on the power to the image storage apparatus 100. In any case, the image reproducing apparatus allows the user to view images that are bound to evoke happy memories. An explanation is given above on an example in which a birthday is registered as an anniversary. However, the present invention is not limited to this example and the user is allowed to register any type of anniversary as a special day, which may come once a month, once a week or the like.

FIG. 35(a) shows an example of a slideshow display in which each image is brought up on display as an enlarged display at the monitor of the television image receiver 200. In this example, the image photographing date is displayed together with the image. Alternatively, text information indicating that the image was photographed on a past anniversary may be displayed together with the image photographing date, as shown in FIG. 35(b). In the example presented in FIG. 35(b), text information indicating that the image was photographed on the "Second Birthday" is displayed. In addition, for the slideshow, settings for displaying the photographic information such as the file name of each image for a specific image changeover effect and for a specific BGM effect can be selected as explained earlier.

Figure 36:
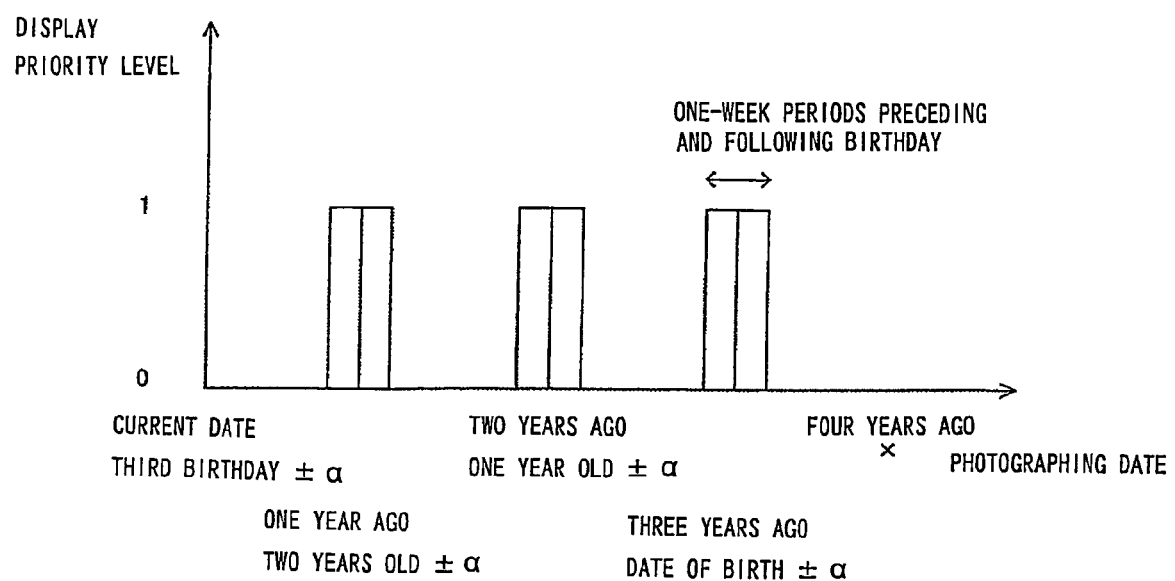

Display priority levels may be set as explained earlier when the current date falls within a range of several days preceding or succeeding the anniversary. FIG. 36 indicates the relationship between the image photographing date and the display priority level. Assuming that the current date falls within a one-week range preceding or succeeding the child's third birthday, the display priority levels for images photographed one year ago today, images photographed during one-week periods preceding and succeeding the date one year ago today, images photographed two years ago today, images photographed during one-week periods preceding and succeeding the date two years ago today, images photographed three years ago today and images photographed during one-week periods preceding and succeeding the date three years ago today are all set to 1. The display priority levels for images photographed on any other days are set to 0.

In addition, display priority levels may be set by combining another factor with the anniversary information as described below.

(a) Set higher display priority levels for images with the child of the user of the image reproducing apparatus 100 and fewer other children photographed therein, among the images having been searched based upon the information on the child's birthday.

(b) Set higher display priority levels for images having audio data of the user's child's voice as related data among the images searched based upon the information on the child's birthday.

A higher display priority level can be set for an image in which an image of the face of a preregistered child can be detected through the face recognition technology explained earlier in method (a). The method described in (b) may be adopted when, for instance, audio memos in the child's voice are appended as attached information to images.

In the embodiment described above, the storage unit 101b is capable of functioning as an image storage means and the CPU 101a is capable of functioning as a reference date setting means, an image selection means, a slideshow display control means, a display priority level setting means and an anniversary registration means. It is to be noted that while an explanation is given above on an example in which a plurality of images are selected based upon display priority levels to be displayed in a slideshow, the present invention may adopt a structure in which the user is allowed to manually issue an image reproduction instruction, instead of displaying images in the slideshow. More specifically, as the option "Automatically Selected Images" is selected in the album selection screen in FIG. 31, a plurality of images with display priority levels higher than 0 are selected based upon the display priority levels set as described earlier. The plurality of images thus selected are then displayed as thumbnails in, for instance, the right side area in FIG. 31. The user selects a specific image among the plurality of images in the thumbnail display to display the selected image at the monitor of the television image receiver 200 by operating an operation button 309 at the remote control unit 300.

An explanation is given above in reference to the embodiment on an example in which a slideshow start instruction is issued by operating the slideshow button 304 at the remote control unit 300. A method that allows a slideshow display to be brought up through a simple operation is now explained in detail.

After selecting a desired album containing a plurality of images to be displayed in a slideshow, at least the following steps, (1) display the main menu screen, (2) select "Slideshow" and (3) confirm "Slideshow", must be executed to start the slideshow display. In addition, the following procedural steps, (1) display the main menu screen display, (2) select/confirm "Select and Output Album", (3) display the album selection screen, (4) select an album and (5) issue a slideshow start instruction, for instance, must be executed in order to switch the album currently displayed in the slideshow to another album.

Figure 37:
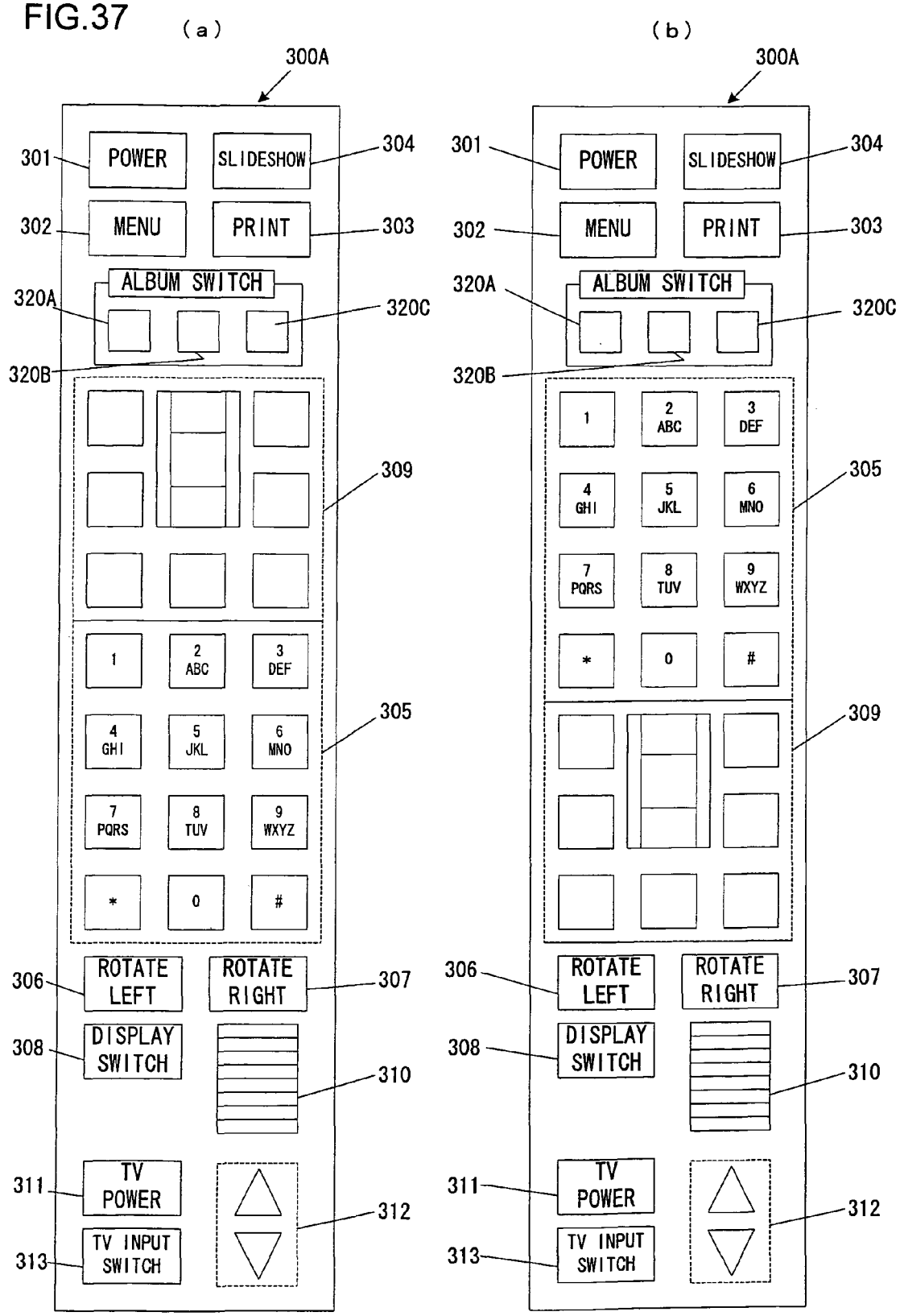

Accordingly, the remote control unit that outputs operation instruction signals to the image reproducing apparatus 100 may include an operation member through which a slideshow start instruction is issued, and an operation member through which an album switch instruction is issued so as to start a slideshow and switch albums more easily by dispensing with the complicated operations described above. FIGS. 37(*a*) and 37(*b*) each present an external view of a remote control unit 300A. The same reference numerals are assigned to buttons in FIGS. 37(*a*) and 37(*b*), which are identical to those in FIGS. 3(*a*) and 3(*b*). The remote control units in FIGS. 37(*a*) and 37(*b*) include numeric buttons 305 and operation buttons 309 disposed in different positional arrangements.

As shown in FIGS. 37(*a*) and 37(*b*), the remote control units 300A each include a slideshow button 304 via which operation instructions related to slideshow display alone are output and album switch buttons 320A, 320B and 320C via which an album switch instruction is output while a slideshow display is in progress. A specific album can be assigned by the user to each of the three album switch buttons 320A~320C. For instance, the user may select the option "Setting" in the main menu screen in FIG. 5 and then shift into album assignment processing from the setting screen brought up on display. It is obvious that desired albums may be first selected in the album selection screen and then each selected album may be assigned to one of the album switch buttons 320A~320C, instead.

Figure 38:
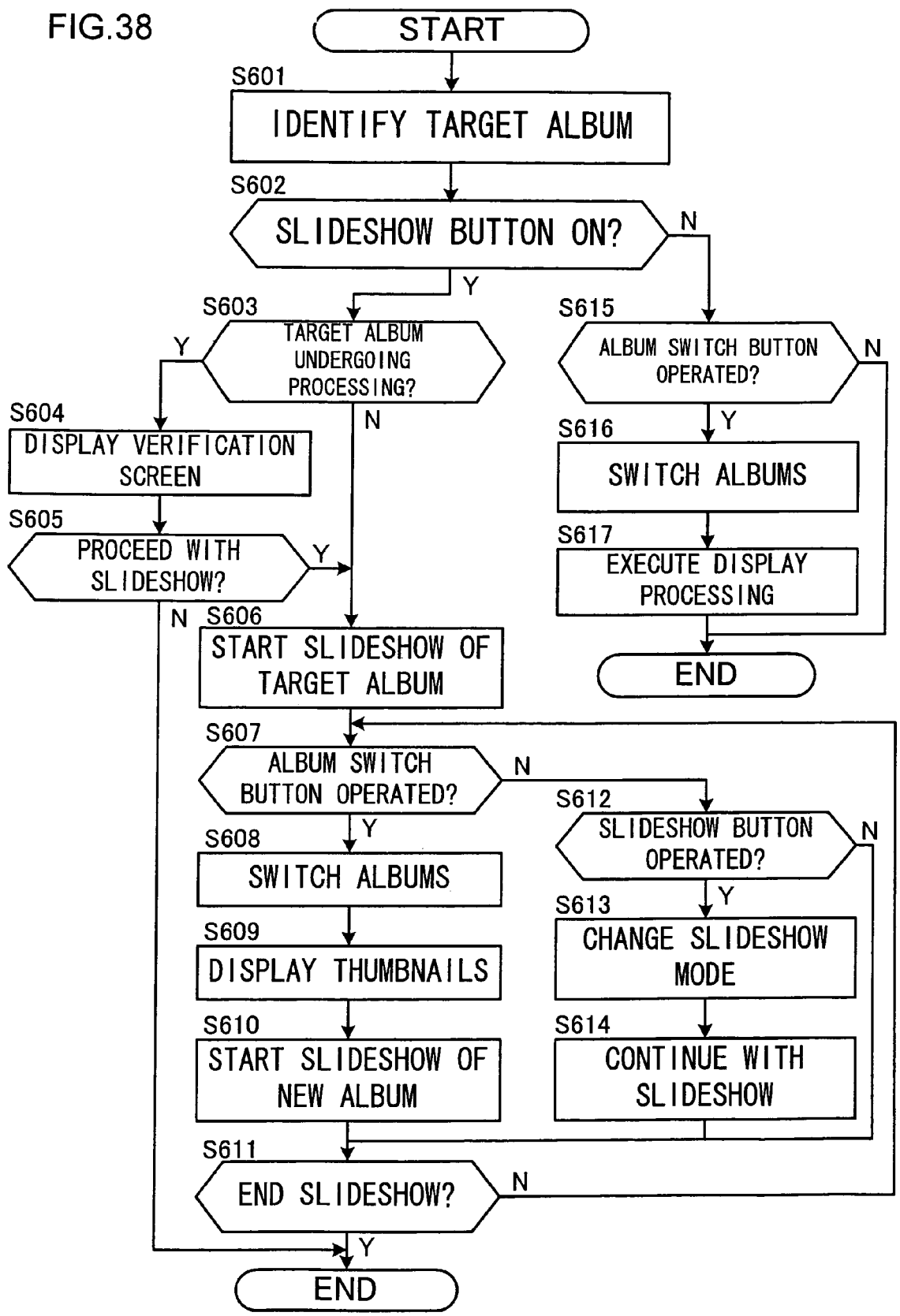
Figure 39:
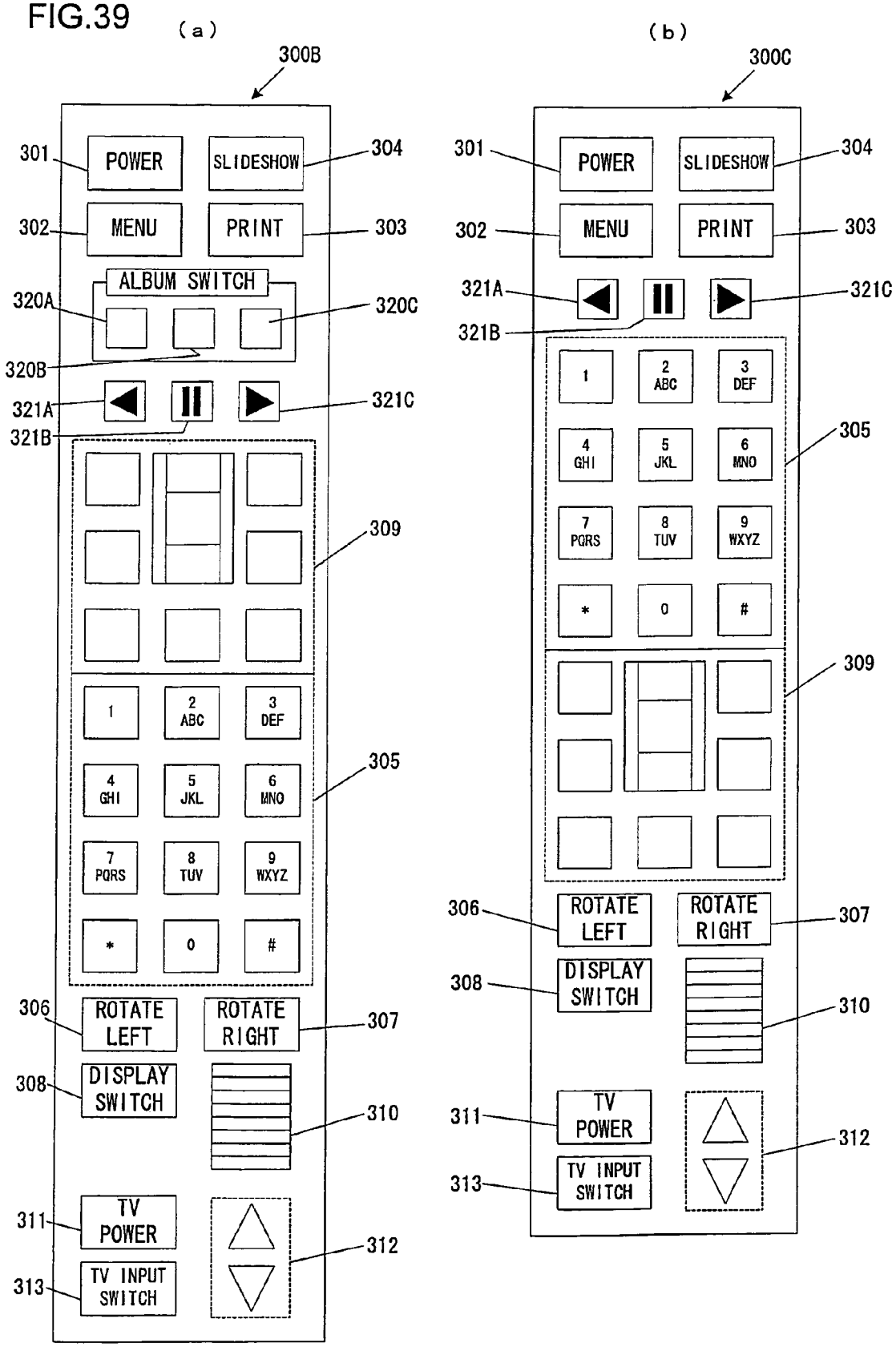

The following is an explanation of the operation executed to provide a slideshow display by using the slideshow button 304 and the album switch buttons 320A~320C, given in reference to the flowchart presented in FIG. 38. This processing starts as the power to the image reproducing apparatus 100 is turned on.

As the power to the image reproducing apparatus 100 is turned on, the target album that was selected when the power to the image reproducing apparatus 100 was last turned off is determined in step S601. More specifically, as has been explained in reference to the flowchart presented in FIG. 10, information that enables identification of an album selected as a slideshow reproduction target is recorded. As the power to the image reproducing apparatus in an OFF state, is turned on again, the most recent reproduction target album is read out based upon the album identification information having been recorded.

In step S602, a decision is made as to whether or not an ON operation has been performed at the slideshow button 304 of the remote control unit 300A. If an affirmative decision is made in step S602, the operation proceeds to step S603. In step S603, a decision is made as to whether or not processing such as text input is being executed for the reproduction target program having been identified in step S601. If processing for, for instance, modifying the album title is being executed, the operation proceeds to step S604, whereas if no processing is currently being executed in relation to the reproduction target album, the operation proceeds to step S606.

If the slideshow starts while processing such as text input is in progress, the text being input cannot be saved. Accordingly, an inquiry screen asking the user whether or not to continue with the slideshow display processing is brought up on display at the monitor of the television image receiver 200 in step S604. An affirmative decision is made in step S605 if the user issues an instruction indicating that the slideshow display processing is to continue by operating an operation button 309 at the remote control unit 300A and, in this case, the operation proceeds to step S606. If, on the other hand, the user issues an instruction indicating that the slideshow display processing is to be canceled, the processing ends.

In step S606, a slideshow display for automatically displaying the images in the reproduction target album in sequence at the monitor of the television image receiver 200 starts. At this time, the slideshow display may start with the first image in the reproduction target album or it may start with the image that was on display when the power was last turned off.

In the following step S607, a decision is made as to whether or not any of the album switch buttons 320A~320C has been operated at the remote control unit 300A. If an ON operation has been performed at one of the album switch buttons 320A~320C, the operation proceeds to step S608 to select a new album corresponding to the button having been operated at the remote control unit as the reproduction target album. In step S609, the images in the new reproduction target album having been selected in step S608 are read out and thumbnails of the images having been read out are brought up in an at-a-glance display together with the album title at the monitor of the television image receiver 200. Once a predetermined length of time (e.g., 5 sec), set as the period during which the user is able to check the specific images contained in the newly selected reproduction target album elapses, the operation proceeds to step S610 to shift from the thumbnail at-a-glance display to a slideshow display.

In step S611, a decision is made as to whether or not the slideshow of the reproduction target album has ended. If all the images in the reproduction target album have been displayed in the slideshow, the power has been turned off or a slideshow stop instruction has been issued, an affirmative decision is made in step S611, and the processing ends. If, on the other hand, a negative decision is made in step S611, the operation returns to step S607 to continue with the processing until the slideshow ends.

If it is decided in step S607 that no ON operation has been performed at any of the album switch buttons 320A~320C, the operation proceeds to step S612. In step S612, a decision is made as to whether or not an ON operation has been performed again at the slideshow button 304. If an affirmative decision is made in step S612, the operation proceeds to step S613, whereas if a negative decision is made in step S612, the operation proceeds to step S611.

In step S613, the method adopted in the current slideshow display is adjusted in response to the operation of the slideshow button 304. For instance, the slideshow display method may be adjusted as described below.

Start the slideshow display again, by first bringing up the first image in the reproduction target album.

Display text information indicating the album title of the reproduction target album, the image filenames and the like.

Adjust the slideshow display effects including the image changeover effect, the number of images to be brought up on display in a single screen and the BGM in correspondence to the number of times the slideshow button 304 is operated.

The specific mode to which the slideshow display is adjusted in response to the ON operation of the slideshow button 304 may be preselected by the user or the slideshow display mode may be adjusted to a fixed mode selected by the system.

In step S614, the slideshow display is resumed in the mode having been adjusted in step S613.

If, on the other hand, it is decided in step S602 that an ON operation has not been performed at the slideshow button 304, the operation proceeds to step S615. In step S615, a decision is made as to whether or not an ON operation has been performed at any of the album switch buttons 320A~320C at the remote control unit 300A. The operation proceeds to step S616 if one of the album switch buttons 320A~320C has been turned on, whereas the processing ends if none of the album switch buttons has been turned on.

In step S616, the album corresponding to the album switch button having been turned on is selected as the new target album. In step S617, the images in the new reproduction target album having been selected in step S608 are read out and thumbnails of the images having been read out are brought up in an at-a-glance display at the monitor of the television image receiver 200. When the thumbnail at-a-glance display has been up on display for the predetermined length of time (e.g., 5 sec), the processing ends.

In the processing executed in step S601, the slideshow reproduction target album that was selected at the slideshow reproduction target when the power was last turned off is identified and read out in the description provided above. However, the present invention is not limited to this example and, for instance, an album that was selected for, for instance, image file copying or the like when the power was last turned off, instead of the slideshow reproduction target album, may be read out. In addition, if a new album is selected after the power to the image reproducing apparatus 100 is turned on, the newly selected album will be read out.

Furthermore, the processing described above may be executed when a slideshow display has been interrupted in response to an operation of the operation button 103 or the like, instead of when the power to the image reproducing apparatus, having been turned off, is turned back on. More specifically, the processing in step S602 and subsequent steps in the flow chart presented in FIG. 38 may be executed in response to an ON operation of the slideshow button 304 following an interruption of a slideshow display.

Since a slideshow start instruction can be issued simply by performing an ON operation at the slideshow button 304, the slideshow display can be started very easily. In addition, the slideshow display mode can be adjusted by operating the slideshow button 304 again while the slideshow display is in progress. Thus, the user is able to customize the slideshow to his preference. Since a new reproduction target album can be selected during the slideshow simply by performing an ON operation at one of the album switch buttons 320A~320C at the remote control unit 300A, a slideshow of a desired album can be started with ease.

A remote control unit 300B may include operation buttons 321A, 321B and 321C operated to issue a slideshow reproduction instruction, a slideshow stop construction and the like, as shown in FIG. 39(a). The user wishing to pause the slideshow performs an ON operation at the operation button 321B. He then operates the operation button 321B again to resume the slideshow display, starting with the image that was on display when the slideshow was paused. It is to be noted that a button to be operated to stop the slideshow display may be provided at the remote control unit.

The numeric buttons 305 at the remote control unit may also be used as album switch buttons. An external view of a remote control unit 300C that allows its numeric buttons to be used as album switch buttons is provided in FIG. 39(b). The remote control unit 300C does not have the album selection buttons 320A~320C. However, the user is able to start album assignment processing from, for instance, the setting screen to a sign desired albums to the numeric buttons 305 each corresponding to one of the numerals "0"~"1" at the remote control unit 300C. If the user wishes to assign fewer than 10 albums to the numeric buttons, some numeric buttons 305 may remain unassigned. In addition, if the user wishes to assign more than 10 albums, some albums may be assigned with two-digit numbers selected by two operations of numeric buttons 305.

The numeric buttons 305 assigned with specific albums to function as alternative album switch buttons, too, can be used in a manner similar to that with which the album switch buttons 320A~320C are used as described above. It is to be noted that the numeric buttons 305 assigned with albums function as buttons in a keypad used for regular text input and the like, except for when an album switchover is enabled during, for instance, a slideshow display.

Figure 40:
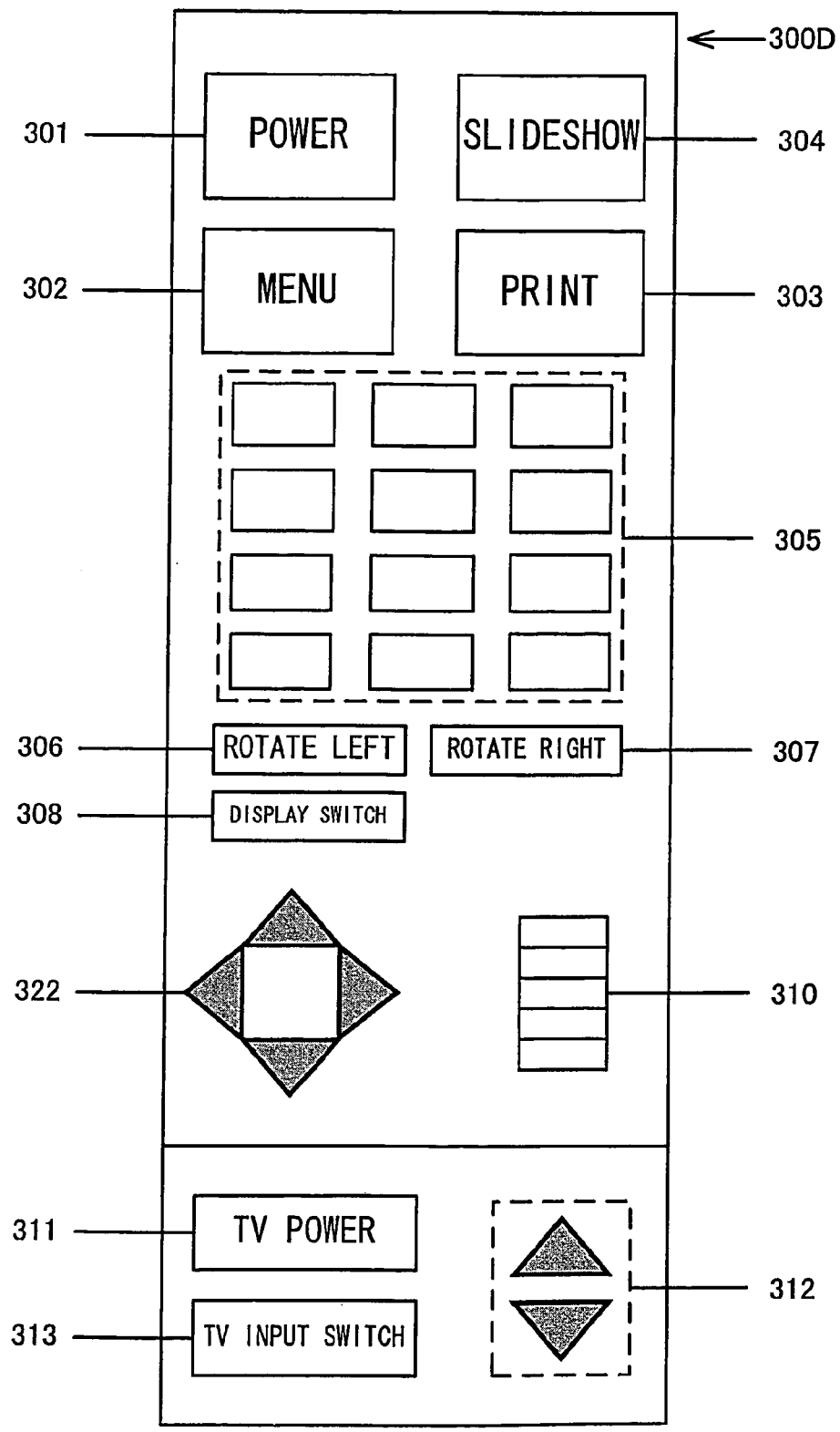

In addition, different albums may be selected as the slideshow reproduction target album by operating the scroll wheel 310 provided at remote control units 300A~300C or by operating a directional button 322 at a remote control unit 300D shown in FIG. 40. In such a case, the albums saved in the storage unit 101b are selected in sequence, one at a time, in correspondence to the number of times the scroll wheel 310 or the directional button 322 is operated in succession. Each time a new album is selected, the images included in the selected album are displayed as thumbnails. As the scroll wheel 310 or the directional button 322 is operated during a slideshow, the images in the newly selected album are displayed as thumbnails and then a slideshow display of the images in the new album starts.

It is to be noted that if albums are to be selected via the scroll wheel 310 or the directional button 322, the user does not need to assign albums to specific buttons. However, it would take a considerable length of time to select all the albums saved in the storage unit 101b, one at a time, in response to the operation of the scroll wheel 310 or the directional button 322 and, for this reason, the slideshow reproduction target album may be sequentially selected from a plurality of preselected albums.

An explanation is given above on examples in which the slideshow button 304 and the album switch buttons 320A~320C or buttons that can be used as alternative album switch buttons are provided at the remote control units 300A~300D. However, the present invention is not limited to these examples and the buttons may be located at the image reproducing apparatus 100 itself. In addition, the buttons may be disposed both at the remote control units 300A~300D and the image reproducing apparatus 100.

Figure 41:
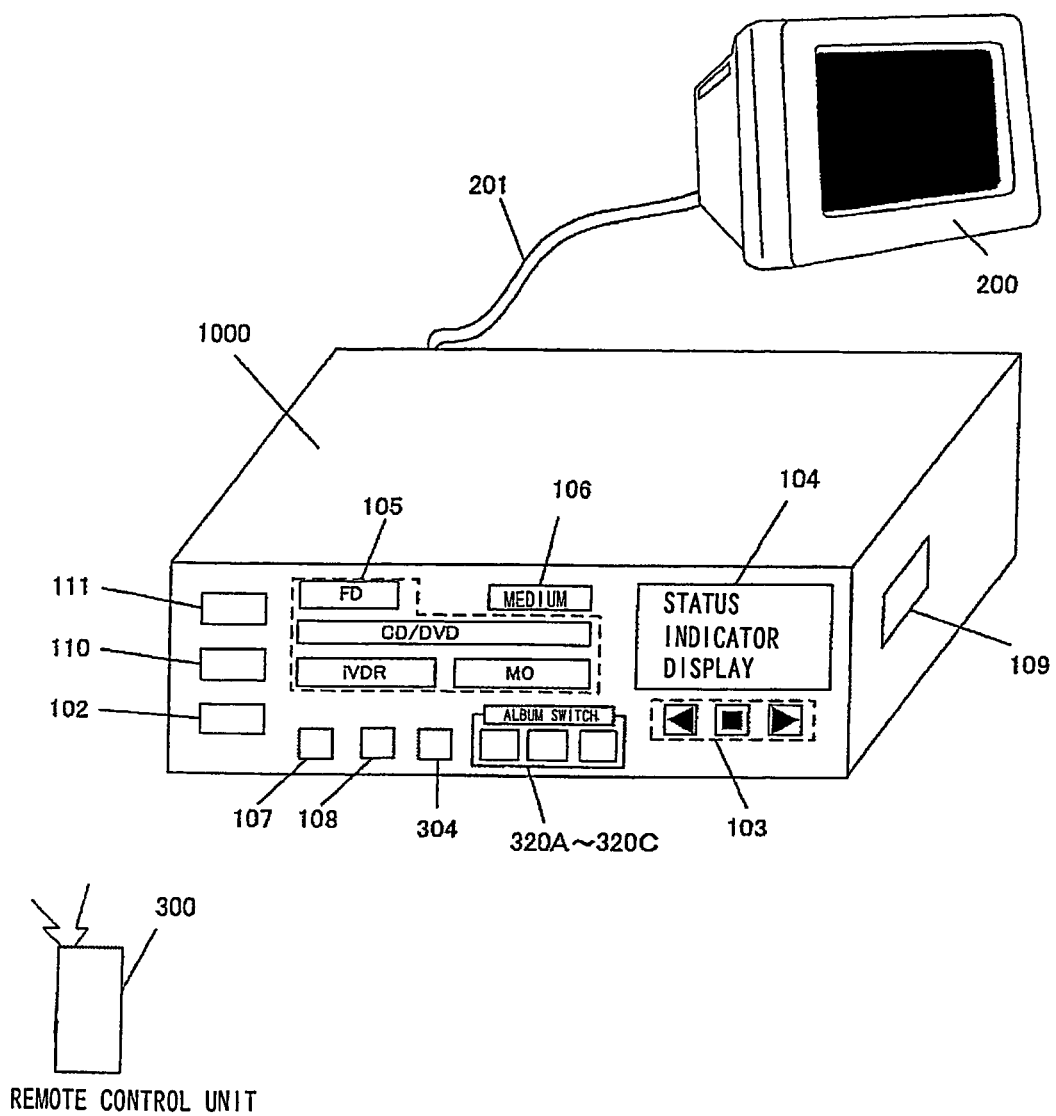

FIG. 41 is an external view of an image reproducing apparatus 1000 that further includes a slideshow button 304 and album switch buttons 320A~320C. The slideshow display processing and the album switch processing should be executed as explained earlier in conjunction with the image reproducing apparatus 1000 that includes the slideshow button 304 and the album switch buttons 320A~320C.

As has been explained in reference to the flowchart provided in FIG. 38, the album switch buttons 320A~320C may be operated when a slideshow display is not in progress, as well. For instance, one of the album switch buttons 320A~320C may be turned on while all the images in a given album are displayed as thumbnails so as to bring up a display of thumbnails of the images in the album corresponding to the album switch button having been operated. If an album switch button among the album switch buttons 320A~320C is operated while a single image in a given album is displayed in an enlarged single image display, the first image in the album corresponding to the album switch button is brought up on display in an enlarged single image display.

If the thumbnail images of all the images included in the newly selected album cannot be displayed in the thumbnail at-a-glance display in a single screen at the monitor of the television image receiver 200, the thumbnail display may be provided over a plurality of pages and the display page may be switched by operating the scroll wheel 310 or the like. Alternatively, since the thumbnail at-a-glance display is provided in this situation in order to enable the user to ascertain the types of images in the newly selected album, it may suffice to display as many thumbnail images as can be contained in a single screen.

By turning on the slideshow button 304 while a slideshow display is in progress, the user is able to adjust the display mode for the slideshow display in progress with ease.

However, the present invention is not limited to this example and the slideshow button 304 may be provided as an operation member exclusively operated to output a slideshow start construction. In this case, since a single operation member is used to output just one operation instruction, the user is never confused.

While the invention has been particularly shown and described with respect to a preferred embodiment and variations thereof by referring to the attached drawings, the present invention is not limited to these examples and it will be understood by those skilled in the art that various changes in form and detail may be made therein without departing from the spirit, scope and teaching of the invention.

The disclosures of the following priority applications are herein incorporated by reference:

Japanese Patent Application No. 2004-362430 filed Dec. 15, 2004

Japanese Patent Application No. 2004-362431 filed Dec. 15, 2004

Japanese Patent Application No. 2004-362441 filed Dec. 15, 2004

Japanese Patent Application No. 2004-362443 filed Dec. 15, 2004

The invention claimed is:

1. An image reproducing apparatus, comprising:
an image storage device that stores image data;
a reference date setting device that sets past reference dates over predetermined cycles in reference to a current date designated as a start point;
an image selection device that selects from the image data stored in the image storage device a plurality of sets of image data having been captured or read on dates matching the past reference dates and in a period of less than or equal to ten days preceding the past reference dates and a period of less than or equal to ten days succeeding the past reference dates;
a display priority level setting device that sets display priority levels for the plurality of sets of image data selected by the image selection device, based upon the current date and the past reference dates; and
a slideshow display control device that controls a display device based on the display priority levels set by the display priority level setting device such that the plurality of sets of image data are brought up in a slideshow display in an order with which an image with a higher display priority is displayed earlier, wherein
the image reproducing apparatus is configured to automatically set display priority levels according to a priority level setting criteria without a manual setting operation by an operator, and
the display priority level setting device sets a lower display priority for image data having been captured or read on a date set apart from the past reference date by a greater extent among images captured or read during the period.

2. An image reproducing apparatus according to claim 1, wherein:
the display priority level setting device sets a higher display priority for image data having been captured or read on a date matching one of the past reference dates than a display priority set for image data having been captured or read on a date that does not match a past reference date.

3. An image reproducing apparatus according to claim 1, wherein:
the display priority level setting device sets a higher display priority for image data having been captured or read on a date with a greater time difference relative to the current date.

4. An image reproducing apparatus according to claim 1, further comprising:
an anniversary registering device that registers an anniversary date for a user, wherein:
the slideshow display control device executes control so as to provide the slideshow display based upon the plurality of sets of image data having been selected by the image selection device only if the anniversary date registered at the anniversary registering device matches the current date.

5. An image reproducing apparatus according to claim 4, wherein:
the image selection device does not select image data having been captured or read on a date preceding a past date marking a start point for the anniversary date.

6. An image reproducing system, comprising:
an image reproducing apparatus according to claim 1;
the display device that is controlled by the slideshow display control device; and
a remote control unit that outputs a start instruction signal for starting the slideshow display to the image reproducing apparatus.

7. A computer-readable computer program product having stored therein an image reproducing program, the computer-readable program product is a non-transitory recording medium on which the image reproducing program is recorded, the computer-readable program product comprising:
reference date setting processing for setting past reference dates over predetermined cycles relative to a current date designated as a start point;
image selection processing for selecting a plurality of sets of image data having been captured or read on dates substantially matching the past reference dates and in a period of less than or equal to ten days preceding the past reference dates and a period of less than or equal to ten days succeeding the past reference dates;
a display priority level setting device that sets display priority levels for the plurality of sets of image data selected by the image selection device, based upon the current date and the past reference dates; and
slideshow display control processing for engaging a display device based on the display priority levels set by the display priority level setting device such that the image data are brought up in a slideshow display in an order with which an image with a higher display priority is displayed earlier, wherein the image reproducing program is configured to automatically set display priority levels according to a priority level setting criteria without a manual setting operation by an operator, and the display priority level setting device sets a lower display priority for image data having been captured or read on a date set apart from the past reference date by a greater extent among images captured or read during the period.

* * * * *